(12) United States Patent
Shirai et al.

(10) Patent No.: US 10,363,986 B2
(45) Date of Patent: Jul. 30, 2019

(54) ELECTRICAL BICYCLE OPERATING SYSTEM

(71) Applicant: SHIMANO INC., Sakai (JP)

(72) Inventors: Toyoto Shirai, Sakai (JP); Kentaro Kosaka, Sakai (JP); Takafumi Nishino, Sakai (JP); Takehiko Nakajima, Sakai (JP); Yuta Kurokawa, Sakai (JP)

(73) Assignee: SHIMANO INC., Sakai (JP)

( * ) Notice: Subject to any disclaimer, the term of this patent is extended or adjusted under 35 U.S.C. 154(b) by 80 days.

(21) Appl. No.: 15/646,006

(22) Filed: Jul. 10, 2017

(65) Prior Publication Data

US 2019/0009852 A1 Jan. 10, 2019

(51) Int. Cl.
| | |
|---|---|
| *B62J 99/00* | (2009.01) |
| *B62J 1/08* | (2006.01) |
| *B62K 23/02* | (2006.01) |
| *B62K 25/04* | (2006.01) |
| *B62M 9/132* | (2010.01) |
| *B62M 25/08* | (2006.01) |

(52) U.S. Cl.
CPC ............... *B62J 99/00* (2013.01); *B62J 1/08* (2013.01); *B62K 23/02* (2013.01); *B62K 25/04* (2013.01); *B62M 9/132* (2013.01); *B62M 25/08* (2013.01); *B62J 2001/085* (2013.01); *B62J 2099/0013* (2013.01); *B62K 2025/045* (2013.01); *B62K 2025/047* (2013.01); *B62K 2025/048* (2013.01)

(58) Field of Classification Search
CPC ...... B62J 99/00; B62J 1/08; B62J 2099/0013; B62J 2001/085; B62K 23/02; B62K 25/04; B62K 2025/045
See application file for complete search history.

(56) References Cited

U.S. PATENT DOCUMENTS

| | | | | |
|---|---|---|---|---|
| 2007/0137361 | A1* | 6/2007 | Fujii | B62K 23/06 74/473.13 |
| 2012/0086380 | A1* | 4/2012 | Krieger | H02P 7/06 318/497 |
| 2012/0253601 | A1 | 10/2012 | Ichida et al. | |
| 2012/0253606 | A1 | 10/2012 | Takamoto et al. | |
| 2013/0061705 | A1 | 3/2013 | Jordan | |

(Continued)

FOREIGN PATENT DOCUMENTS

CN 102730143 10/2012

OTHER PUBLICATIONS

Office Action with Form PTO-892 Notice of References Cited issued by the United States Patent and Trademark Office for the co-pending U.S. Appl. No. 14/996,274, dated Feb. 9, 2018.

*Primary Examiner* — Mussa A Shaawat

(74) *Attorney, Agent, or Firm* — Mori & Ward, LLP

(57) ABSTRACT

An electrical bicycle operating system comprises a first switch, a second switch, and a controller. The first switch is configured to generate a first signal. The second switch is configured to generate a second signal. The controller is configured to generate a third signal different from the first signal and the second signal in response to a concurrent operation of the first switch and the second switch. The controller is configured to generate a fourth signal different from the third signal in response to a release of the first switch in a state where the second switch is operated continuously after the concurrent operation.

20 Claims, 46 Drawing Sheets

(56) References Cited

U.S. PATENT DOCUMENTS

| | | | |
|---|---|---|---|
| 2014/0015659 A1* | 1/2014 | Tetsuka | B62K 23/02 |
| | | | 340/432 |
| 2014/0053675 A1* | 2/2014 | Tetsuka | B62M 25/08 |
| | | | 74/473.13 |
| 2014/0058578 A1* | 2/2014 | Tetsuka | B62L 3/02 |
| | | | 701/1 |
| 2015/0033896 A1 | 2/2015 | Jordan | |
| 2015/0137591 A1* | 5/2015 | Fusari | B62M 25/08 |
| | | | 307/9.1 |
| 2015/0203169 A1* | 7/2015 | Nishino | B62K 23/06 |
| | | | 74/491 |
| 2016/0152302 A1* | 6/2016 | Nishino | B62M 25/08 |
| | | | 701/2 |
| 2016/0185421 A1* | 6/2016 | Komatsu | B62M 25/08 |
| | | | 701/2 |
| 2016/0244120 A1* | 8/2016 | Gerencser | B62K 15/008 |
| 2016/0257269 A1* | 9/2016 | Watarai | B62J 99/00 |
| 2016/0311491 A1* | 10/2016 | Watarai | B60L 15/20 |
| 2016/0318583 A1* | 11/2016 | Watarai | B62M 25/08 |
| 2016/0362154 A1* | 12/2016 | Poole | B62J 6/003 |
| 2017/0158281 A1* | 6/2017 | Hara | B62J 1/08 |
| 2017/0203814 A1* | 7/2017 | Kurokawa | B62K 23/00 |
| 2018/0118305 A1* | 5/2018 | Tsuchizawa | B62M 9/122 |
| 2018/0178870 A1* | 6/2018 | Takeshita | B62M 6/55 |
| 2018/0183255 A1* | 6/2018 | Shahana | H02J 1/14 |
| 2018/0257736 A1* | 9/2018 | Komatsu | B62K 23/02 |

\* cited by examiner

| SHIFT-MAP INFORMATION | | FRONT SPROCKET | |
|---|---|---|---|
| | | 39 | 53 |
| | | LOW | TOP |
| REAR SPROCKET | 28  1st | 1.39 | 1.89 |
| | 25  2nd | 1.56 | 2.12 |
| | 23  3rd | 1.70 | 2.30 |
| | 21  4th | 1.86 | 2.52 |
| | 19  5th | 2.05 | 2.79 |
| | 17  6th | 2.29 | 3.12 |
| | 15  7th | 2.60 | 3.53 |
| | 14  8th | 2.79 | 3.79 |
| | 13  9th | 3.00 | 4.08 |
| | 12  10th | 3.25 | 4.42 |
| | 11  11th | 3.55 | 4.82 |

ELECTRICAL BICYCLE OPERATING SYSTEM

BACKGROUND OF THE INVENTION

Field of the Invention

The present invention relates to an electrical bicycle operating system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating system.

SUMMARY OF THE INVENTION

In accordance with a first aspect of the present invention, an electrical bicycle operating system comprises a first switch, a second switch, and a controller. The first switch is configured to generate a first signal. The second switch is configured to generate a second signal. The controller is configured to generate a third signal different from the first signal and the second signal in response to a concurrent operation of the first switch and the second switch. The controller is configured to generate a fourth signal different from the third signal in response to a release of the first switch in a state where the second switch is operated continuously after the concurrent operation.

With the electrical bicycle operating system according to the first aspect, it is possible to generate at least three different signals using the first and second switches, reducing a total number of switches. This simplifies the structure of the electrical bicycle operating system and reduces cost of the electrical bicycle operating system.

In accordance with a second aspect of the present invention, the electrical bicycle operating system according to the first aspect is configured so that the first signal includes one of an upshift signal and a downshift signal. The second signal includes the other of the upshift signal and the downshift signal. The third signal is indicative of operating one of an electrical height adjustable seatpost and an electrical suspension.

With the electrical bicycle operating system according to the second aspect, it is possible to utilize the first switch and the second switch to operate the electrical height adjustable seatpost in addition to an electrical shifting device.

In accordance with a third aspect of the present invention, the electrical bicycle operating system according to the second aspect is configured so that the fourth signal is indicative of operating the other of the electrical height adjustable seatpost and the electrical suspension.

With the electrical bicycle operating system according to the third aspect, it is possible to quickly operate both the electrical height adjustable seatpost and the electrical suspension using the first switch and the second switch. This makes it possible to perform a control suitable for a running condition of a bicycle.

In accordance with a fourth aspect of the present invention, the electrical bicycle operating system according to the second or third aspect is configured so that the fourth signal is indicative of changing a state of the electrical suspension between a lockout state and an unlocked state.

With the electrical bicycle operating system according to the fourth aspect, it is possible to quickly operate both the electrical height adjustable seatpost and the electrical suspension using the first switch and the second switch. This makes it possible to perform a control suitable for a running condition of a bicycle.

In accordance with a fifth aspect of the present invention, the electrical bicycle operating system according to any one of the second to fourth aspects is configured so that the fourth signal is indicative of changing a state of the electrical suspension from an unlocked state to a lockout state for a lockout time.

With the electrical bicycle operating system according to the fifth aspect, it is possible to lock the electrical suspension for the lockout time in response to the fourth signal.

In accordance with a sixth aspect of the present invention, the electrical bicycle operating system according to any one of the second to fifth aspects is configured so that the fourth signal is indicative of changing a stroke of the electrical suspension.

With the electrical bicycle operating system according to the sixth aspect, it is possible to quickly operate both the electrical height adjustable seatpost and the electrical suspension using the first switch and the second switch. This makes it possible to perform a control suitable for a running condition of a bicycle.

In accordance with a seventh aspect of the present invention, the electrical bicycle operating system according to any one of the second to sixth aspects is configured so that the third signal is indicative of changing an overall length of the electrical height adjustable seatpost. The fourth signal is indicative of operating the electrical suspension based on a changed overall length of the electrical height adjustable seatpost in response to receipt of a seatpost length signal indicative of the changed overall length from the electrical height adjustable seatpost.

With the electrical bicycle operating system according to the seventh aspect, it is possible to control the electrical suspension in accordance with the height of the electrical height adjustable seatpost.

In accordance with an eighth aspect of the present invention, the electrical bicycle operating system according to any one of the second to seventh aspects is configured so that the third signal is indicative of operating the electrical suspension. The fourth signal is indicative of operating the electrical height adjustable seatpost.

With the electrical bicycle operating system according to the eighth aspect, it is possible to quickly operate both the electrical height adjustable seatpost and the electrical suspension using the first switch and the second switch. This makes it possible to perform a control suitable for a running condition of a bicycle.

In accordance with a ninth aspect of the present invention, the electrical bicycle operating system according to any one of the first to eighth aspects is configured so that the controller is configured to generate the fourth signal to operate the electrical height adjustable seatpost. The fourth signal has a pulse width relating to a time from a release of the first switch to a release of the second switch.

With the electrical bicycle operating system according to the ninth aspect, it is possible to easily adjust the height of the electrical height adjustable seatpost.

In accordance with a tenth aspect of the present invention, the electrical bicycle operating system according to any one of the first to eighth aspects is configured so that the fourth signal is indicative of operating the electrical height adjustable seatpost. The fourth signal has a predetermined pulse width regardless of a time from a release of the first switch to a release of the second switch.

With the electrical bicycle operating system according to the tenth aspect, it is possible to shorten an operation time of the second switch to generate the fourth signal.

In accordance with an eleventh aspect of the present invention, the electrical bicycle operating system according to any one of the first to tenth aspects is configured so that the first signal includes one of an upshift signal and a downshift signal. The second signal includes the other of the upshift signal and the downshift signal. The fourth signal includes the one of the upshift signal and the downshift signal.

With the electrical bicycle operating system according to the eleventh aspect, it is possible to quickly operate an electrical shifting device to change a speed stage after generating the third signal.

In accordance with a twelfth aspect of the present invention, the electrical bicycle operating system according to any one of the first to eleventh aspects is configured so that the controller is configured to generate a fifth signal in response to a release of the second switch in a state where the first switch is operated continuously after the concurrent operation. The fifth signal includes the other of the upshift signal and the downshift signal.

With the electrical bicycle operating system according to the twelfth aspect, it is possible to quickly select upshifting or downshifting in accordance with a running condition of a bicycle after generating the third signal.

In accordance with a thirteenth aspect of the present invention, the electrical bicycle operating system according to any one of the second to twelfth aspects is configured so that the controller is configured to generate a fifth signal in response to a release of the second switch in a state where the first switch is operated continuously after the concurrent operation. The fourth signal is indicative of one of a lock switch operation and a stroke adjustment operation of the electrical suspension. The fifth signal is indicative of the other of the lock switch operation and the stroke adjustment operation of the electrical suspension.

With the electrical bicycle operating system according to the thirteenth aspect, it is possible to quickly change the state of the electrical suspension in accordance with a running condition of a bicycle after generating the third signal.

In accordance with a fourteenth aspect of the present invention, the electrical bicycle operating system according to any one of the first to thirteenth aspects is configured so that the second switch is a separate unit from the first switch.

With the electrical bicycle operating system according to the fourteenth aspect, it is possible to simplify respective operating devices for the first switch and the second switch.

In accordance with a fifteenth aspect of the present invention, the electrical bicycle operating system according to any one of the first to thirteenth aspect is configured so that the first switch and the second switch are integrally provided as a single switch unit.

With the electrical bicycle operating system according to the fifteenth aspect, it is possible to assemble the first switch and the second switch as the single unit.

In accordance with a sixteenth aspect of the present invention, the electrical bicycle operating system according to any one of the first to fifteenth aspects is configured so that the first switch is disposed to receive a first user input from one of a thumb and an index finger of a user. The second switch is disposed to receive a second user input from the other of the thumb and the index finger of the user.

With the electrical bicycle operating system according to the sixteenth aspect, it is possible to easily operate the first switch and the second switch concurrently.

In accordance with a seventeenth aspect of the present invention, the electrical bicycle operating system according to any one of the first to sixteenth aspects is configured so that the first switch is disposed to receive a first user input in a first operation direction. The second switch is disposed to receive a second user input in a second operation direction opposite to the first operation direction.

With the electrical bicycle operating system according to the seventeenth aspect, it is possible to easily operate the first switch and the second switch concurrently.

In accordance with an eighteenth aspect of the present invention, the electrical bicycle operating system according to any one of the first to seventeenth aspects further comprises a wireless communicator configured to wirelessly transmit at least one of the first signal and the second signal.

With the electrical bicycle operating system according to the eighteenth aspect, it is possible to omit at least part of an electric cable.

In accordance with a nineteenth aspect of the present invention, an electrical bicycle operating system comprises a first switch, a second switch, and a controller. The first switch is configured to generate a first signal in response to a first user input. The first signal includes one of an upshift signal and a downshift signal. The second switch is configured to generate a second signal in response to a second user input. The second signal includes the other of the upshift signal and the downshift signal. The controller is configured to generate an operation signal to operate one of an electrical height adjustable seatpost and an electrical suspension in response to a concurrent operation of the first switch and the second switch. The controller is configured to restrict generating a shift command signal to continuously change a speed stage of an electrical shifting device by a plurality of speed stages within a predetermined time after the concurrent operation regardless of the upshift signal and the downshift signal.

With the electrical bicycle operating system according to the nineteenth aspect, it is possible to reduce the rider's confusion caused by concurrent motion of an electrical shifting device and one of the electrical height adjustable seatpost and the electrical suspension.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 38 shows shift-map information of the electrical bicycle operating system illustrated in FIG. 37.

DESCRIPTION OF THE EMBODIMENTS

Figure 1:
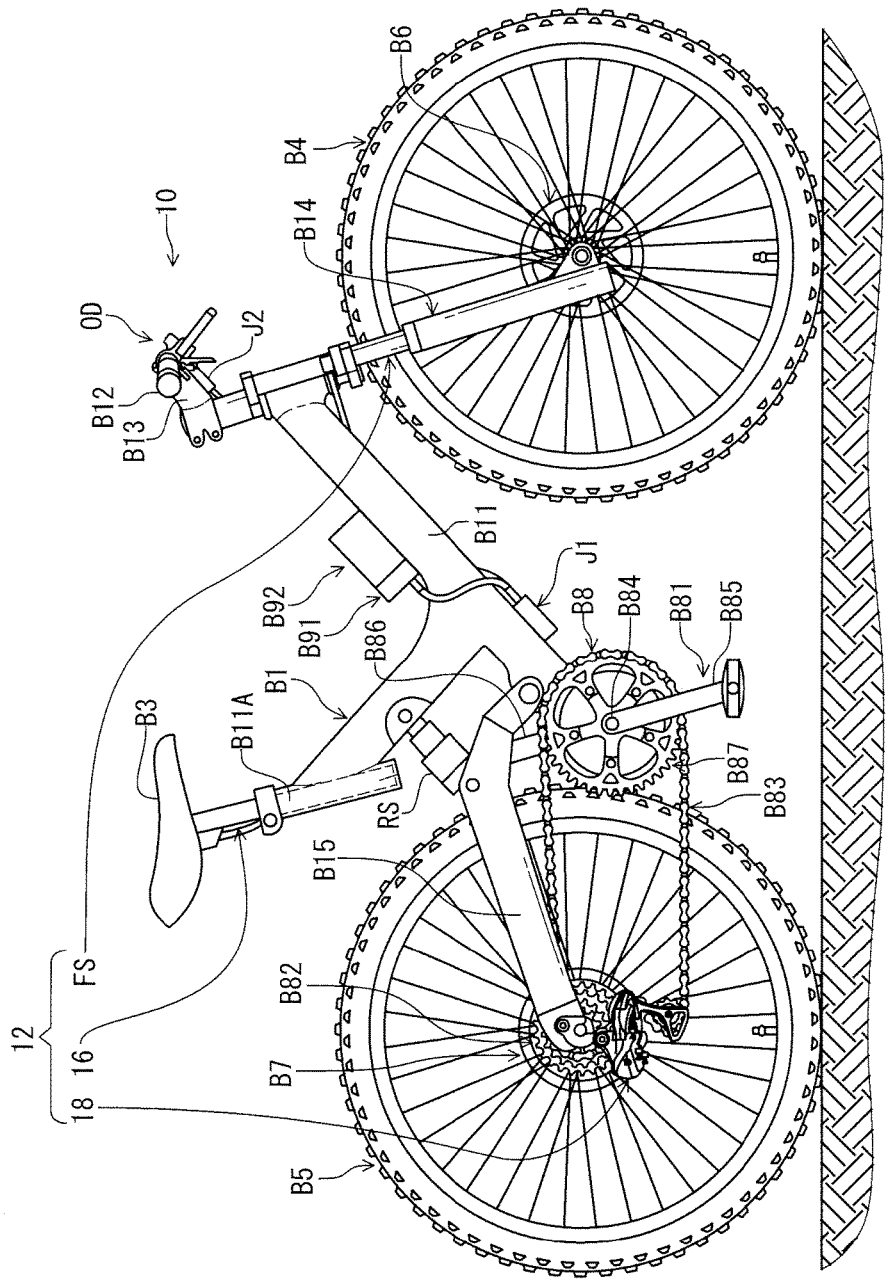
FIG. 1 is a side elevational view of a bicycle including an electrical bicycle operating system in accordance with a first embodiment.

The embodiment(s) will now be described with reference to the accompanying drawings, wherein like reference numerals designate corresponding or identical elements throughout the various drawings.

First Embodiment

Figure 2:
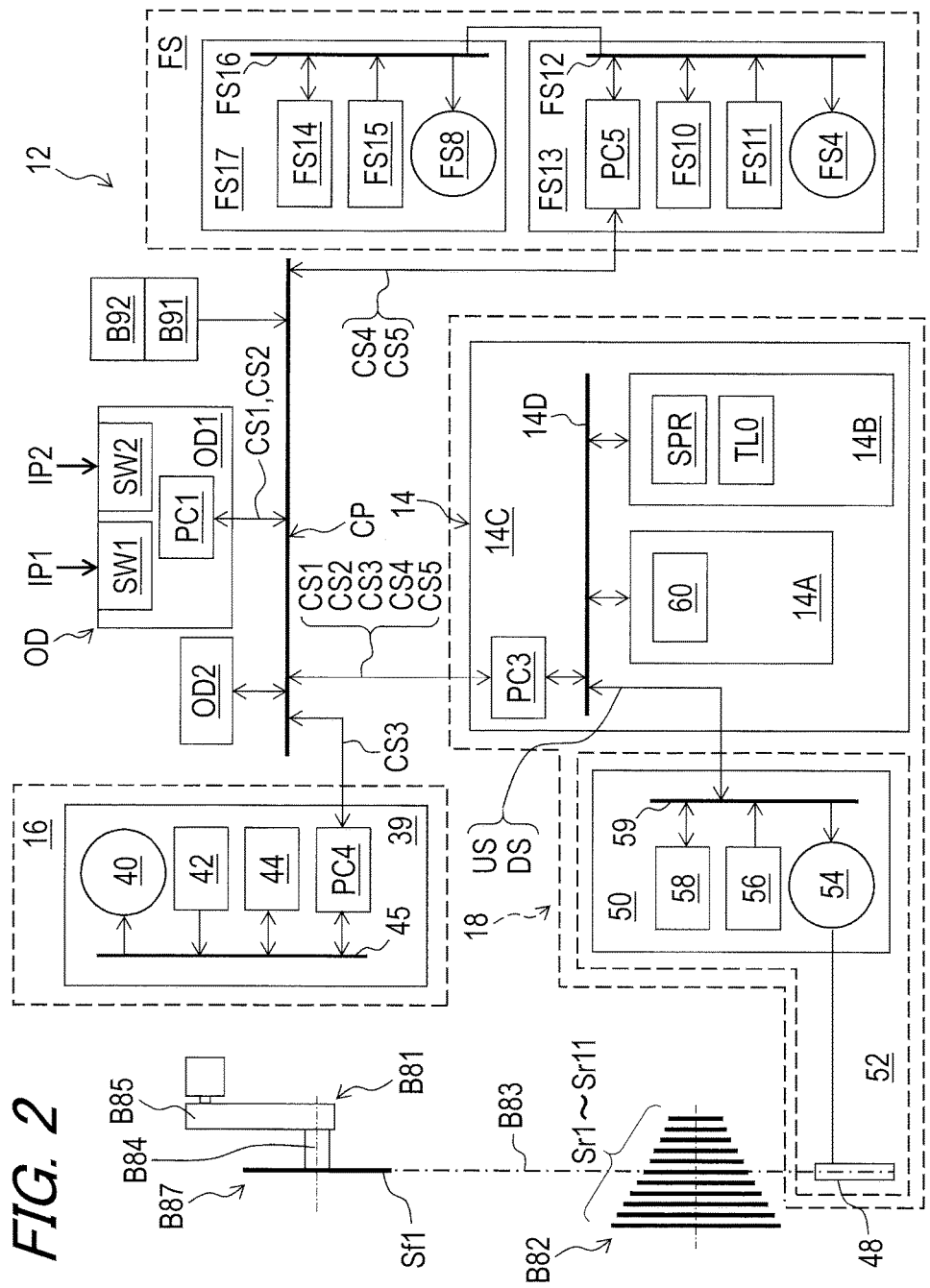
FIG. 2 is a block diagram of the electrical bicycle operating system illustrated in FIG. 1.

Referring initially to FIGS. 1 and 2, a bicycle 10 includes an electrical bicycle operating system 12 in accordance with a first embodiment. While the bicycle 10 is illustrated as a mountain bike, the electrical bicycle operating system 12 can be applied to a road bike or any type of bicycle.

As seen in FIG. 1, the bicycle 10 includes a bicycle body B1. The bicycle body B1 includes a bicycle frame B11, a handlebar B12, a stem B13, a front fork B14, and a rear swing arm B15. The handlebar B12 is coupled to the front fork B14 with the stem B13. The rear swing arm B15 is pivotally coupled to the bicycle frame B11.

The bicycle 10 includes a saddle B3, a front wheel B4, a rear wheel B5, a front brake B6, a rear brake B7, and a drive train B8. The drive train B8 converts the rider's pedaling force into a driving force. The bicycle frame B11, the handlebar B12, the saddle B3, the front wheel B4, the rear wheel B5, the front brake B6, and the rear brake B7 include structures which have been well known in the bicycle field. Thus, they will not be described/illustrated in detail here for the sake of brevity.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle B3 of the bicycle 10 with facing the handlebar B12. Accordingly, these terms, as utilized to describe the electrical bicycle operating system 12, should be interpreted relative to the bicycle 10 equipped with the electrical bicycle operating system 12 as used in an upright riding position on a horizontal surface.

The drive train B8 includes a bicycle crank B81, a rear sprocket B82, and a bicycle chain B83. The bicycle crank B81 is rotatably mounted on the bicycle frame B11. The bicycle crank B81 includes a crank axle B84, a right crank arm B85, a left crank arm B86, and a front sprocket B87. The right crank arm B85 and the left crank arm B86 are coupled to respective ends of the crank axle B84. The front sprocket B87 is coupled to the crank axle B84 via the right crank arm B85. The bicycle chain B83 is arranged on the front sprocket B87 and the rear sprocket B82 so as to extend therebetween.

As seen in FIG. 2, the front sprocket B87 includes a front sprocket wheel Sf1. The rear sprocket B82 includes first to eleventh rear sprocket wheels Sr1 to Sr11. A total number of teeth of the first rear sprocket wheel Sr1 is smaller than a total number of teeth of the eleventh rear sprocket wheel Sr11. The first rear sprocket wheel Sr1 corresponds to low gear. The eleventh rear sprocket wheel Sr11 corresponds to top gear. In this embodiment, each of the first to eleventh rear sprocket wheels Sr1 to Sr11 has a different total number of teeth. A total number of the rear sprocket wheels Sr1 to Sr11 are not limited to this embodiment. The rear sprocket B82 can include less than ten or more than twelve rear sprocket wheels. The front sprocket B87 can include a plurality of front sprocket wheels.

The electrical bicycle operating system 12 comprises a first switch SW1, a second switch SW2, and a controller 14. The first switch SW1 is configured to generate a first signal CS1. The second switch SW2 is configured to generate a second signal CS2. The first signal CS1 includes one of an upshift signal and a downshift signal. The second signal CS2 includes the other of the upshift signal and the downshift signal.

In this embodiment, the first signal CS1 includes the upshift signal. The second signal CS2 includes the downshift signal. However, the first signal CS1 can include the downshift signal, and the second signal CS2 can include the upshift signal. Furthermore, the first signal CS1 can include another signal to operate a device other than the electric shifting device. The second signal CS2 can include another signal to operate a device other than the electric shifting device.

Examples of the first switch SW1 and the second switch SW2 include a push-button switch having electric contacts. For example, each of the first signal CS1 and the second signal CS2 can include an on-off signal produced by the electric contacts.

Figure 3:
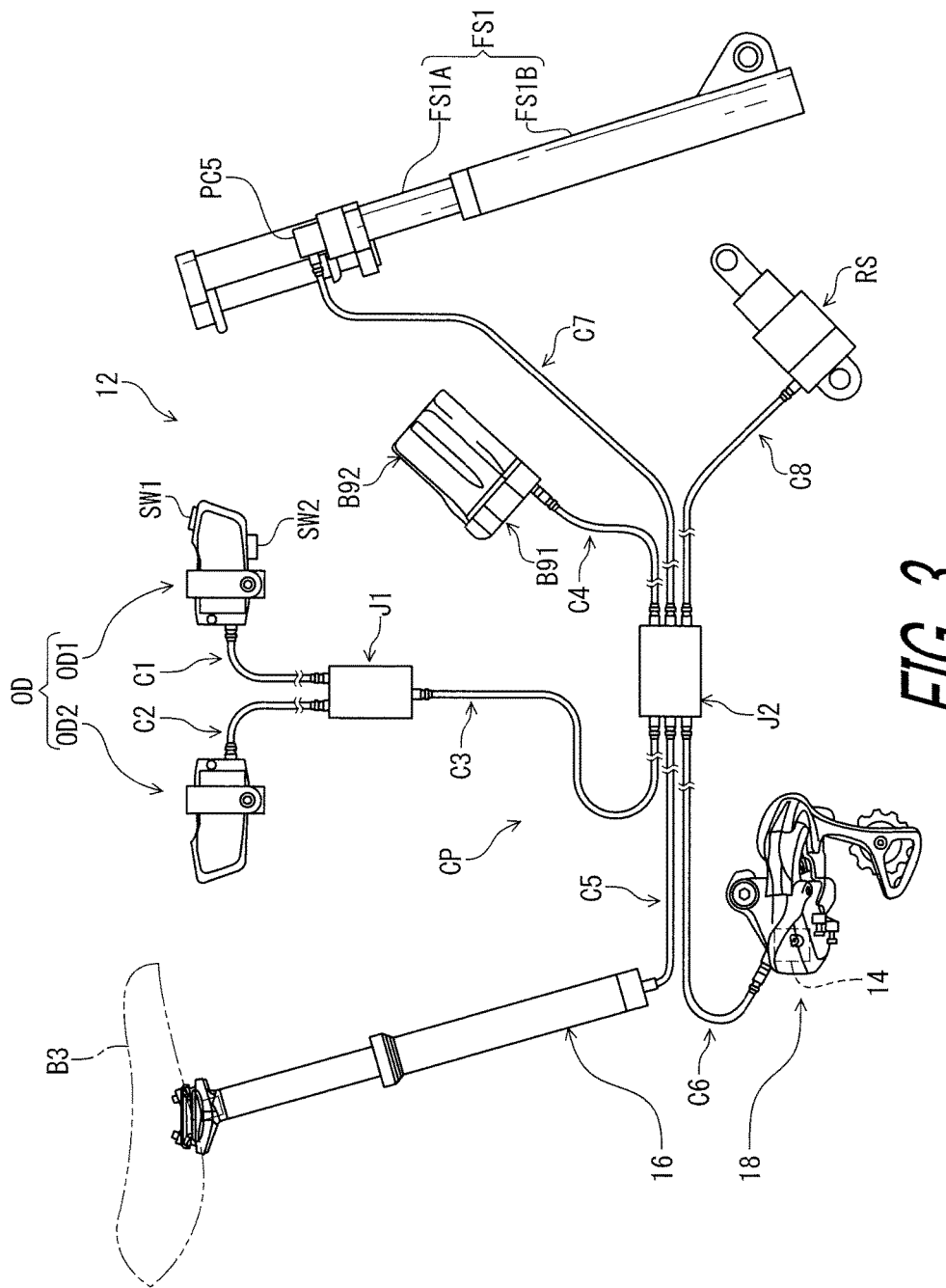
FIG. 3 is a schematic diagram showing one exemplary configuration of an electric communication path of the bicycle illustrated in FIG. 1.

In this embodiment, as seen in FIG. 3, the bicycle 10 includes an electrical height adjustable seatpost 16, an electrical suspension FS, an electrical suspension RS, and an electrical shifting device 18. As seen in FIG. 1, the electrical height adjustable seatpost 16 is mounted to a seat tube B11A of the bicycle frame B11. The saddle B3 is secured to an upper end of the electrical height adjustable seatpost 16. The electrical suspension FS is mounted to the front fork B14 to absorb shocks from rough terrain. The electrical suspension RS couples the rear swing arm B15 to the bicycle frame B11 to absorb shocks from rough terrain. As seen in FIG. 2, while the electrical shifting device 18 comprises the controller 14 in this embodiment, the controller 14 can be arranged to other positions.

As seen in FIG. 2, the controller 14 is constituted as a microcomputer and includes a processor 14A, a memory 14B, and a circuit board 14C. The processor 14A includes a central processing unit (CPU) and a memory controller. The memory 14B includes a read only memory (ROM) and a random-access memory (RAM). The memory 14B can be also referred to as the memory 14B. The ROM includes a non-transitory computer-readable storage medium. The RAM includes a transitory computer-readable storage medium. The memory 14B includes storage areas each having an address in the ROM and the RAM. The processor 14A controls the memory 14B to store data in the storage areas of the memory 14B and reads data from the storage areas of the memory 14B.

At least one program is stored in the memory 14B (e.g., the ROM). The at least one program is read into the processor 14A, and thereby functions of the controller 14 are performed. The processor 14A and the memory 14B are mounted on the circuit board 14C and are connected to each other with a bus 14D.

The first switch SW1 is configured to receive a first user input IP1 and is configured to generate the first signal CS1 in response to the first user input IP1. The second switch SW2 is configured to receive a second user input IP2 and is configured to generate the second signal CS2 in response to the second user input IP2. Examples of the first user input IP1 and the second user input IP2 include pushing a switch and operating a lever member.

In the illustrated embodiment, as seen in FIG. 3, the bicycle 10 includes an operating device OD. The operating device OD includes a first operating device OD1 and a second operating device OD2. The first operating device OD1 and the second operating device OD2 are mounted to the handlebar B12 (FIG. 1). In this embodiment, the first switch SW1 and the second switch SW2 are integrally provided as a single switch unit. The first operating device OD1 includes the first switch SW1 and the second switch SW2. The first operating device OD1 is provided separately from the second operating device OD2. However, the first operating device OD1 can be provided integrally with the second operating device OD2 as a single unit.

The first operating device OD1 is a right-side control device operated by a rider's right hand. The second operating device OD2 is a left-side operating device operated by a rider's left hand. However, the first operating device OD1 can be a left-side operating device, and the second operating device OD2 can be a right-side operating device.

Figure 4:
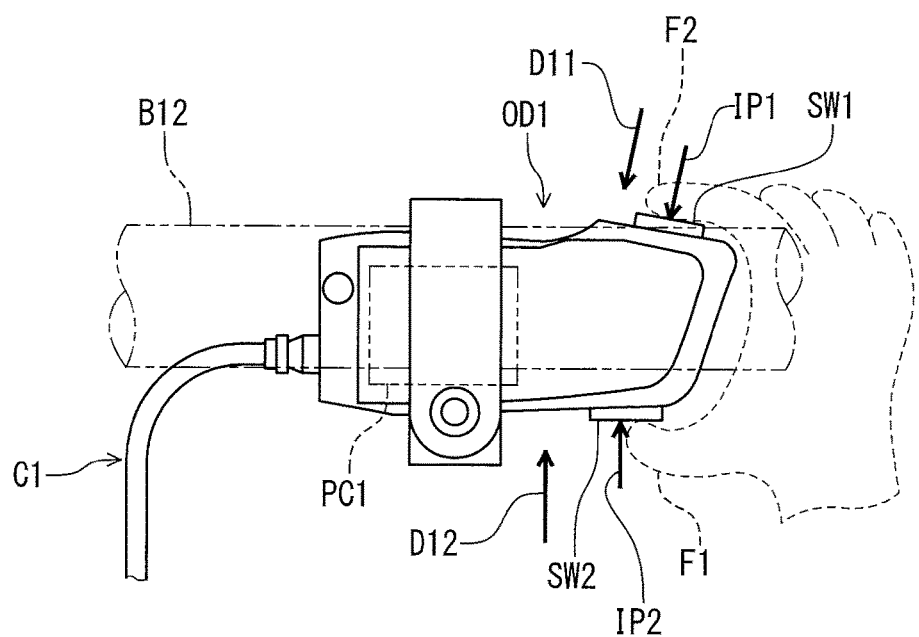
FIG. 4 is a plan view of a first operating device of the bicycle illustrated in FIG. 1.

As seen in FIG. 4, the first switch SW1 is disposed to receive the first user input IP1 from one of a thumb F1 and an index finger F2 of a user. The second switch SW2 is disposed to receive the second user input IP2 from the other of the thumb F1 and the index finger F2 of the user. In this embodiment, the first switch SW1 is disposed to receive the first user input IP1 from the index finger F2 of the user. The second switch SW2 is disposed to receive the second user input IP2 from the thumb F1 of the user. However, the first switch SW1 can be disposed to receive the first user input IP1 from the thumb F1 of the user. The second switch SW2 can be disposed to receive the second user input IP2 from the index finger F2 of the user.

The first switch SW1 is disposed to receive the first user input IP1 in a first operation direction D11. The second switch SW2 is disposed to receive the second user input IP2 in a second operation direction D12 opposite to the first operation direction D11. However, the first operation direction D11 and the second operation direction D12 are not limited to this embodiment.

As seen in FIG. 1, the bicycle 10 includes a battery holder B91 and a battery B92. The battery holder B91 is mounted to the bicycle frame B11 and is configured to detachably receive the battery B92. The battery B92 is electrically connected to the battery holder B91 in a state where the battery B92 is mounted to the battery holder B91. Examples of the battery B92 include a primary battery (e.g., a dry-cell battery) and a secondary battery (e.g., a rechargeable battery such as a rechargeable lithium-ion battery).

As seen in FIGS. 2 and 3, the bicycle 10 includes an electric communication path CP to establish communication among the electrical bicycle operating system 12, the electrical height adjustable seatpost 16, the electrical shifting device 18, and the battery holder B91 using power line communication technology.

Power line communication (PLC) carries data on a conductor that is also used simultaneously for electric power transmission or electric power distribution to electric components. In this embodiment, the electric power is supplied from the battery B92 to the electrical bicycle operating system 12, the electrical height adjustable seatpost 16, the electrical shifting device 18, the electrical suspension FS, and the electrical suspension RS via the battery holder B91 and the electric communication path CP. Furthermore, the electrical bicycle operating system 12, the electrical height adjustable seatpost 16, the electrical shifting device 18, the electrical suspension FS, and the electrical suspension RS send and receive control signals via the electric communication path CP using the PLC.

As seen in FIG. 3, the electric communication path CP includes a first junction J1, a second junction J2, and first to eighth cables C1 to C8. Each of the first to eighth cables C1 to C8 includes electric connectors at both ends thereof. The first switch SW1 is electrically connected to the first junction J1 with the first cable C1. The second switch SW2 is electrically connected to the first junction J1 with the first cable C1. The second operating device OD2 is electrically connected to the first junction J1 with the second cable C2. The first junction J1 is electrically connected to the second junction J2 with the third cable C3. The second junction J2 is electrically connected to the battery holder B91 with the fourth cable C4. The second junction J2 is electrically connected to the electrical height adjustable seatpost 16 with the fifth cable C5. The second junction J2 is electrically connected to the electrical shifting device 18 with the sixth cable C6. The second junction J2 is electrically connected to the electrical suspension FS with the seventh cable C7. The second junction J2 is electrically connected to the electrical suspension RS with the eighth cable C8.

Each of the first to eighth cables C1 to C8 includes a ground line and a voltage line that are detachably connected to a serial bus that is formed by communication interfaces and the first and second junctions J1 and J2. Electricity is supplied from the battery B92 to the electrical bicycle operating system 12, the electrical height adjustable seatpost 16, the electrical shifting device 18, the electrical suspension FS, and the electrical suspension RS via the voltage line. In this embodiment, the electrical bicycle operating system 12, the electrical height adjustable seatpost 16, the electrical shifting device 18, the electrical suspension FS, and the electrical suspension RS can all communicate with each other through the voltage line using the power line communication technology.

The PLC uses unique identifying information such as a unique identifier that is assigned to each of the first switch SW1, the second switch SW2, the controller 14, the electrical height adjustable seatpost 16, the electrical shifting device 18, the electrical suspension FS, and the electrical suspension RS. Each of the controller 14, the first switch SW1, the second switch SW2, the electrical height adjustable seatpost 16, the electrical shifting device 18, the electrical suspension FS, and the electrical suspension RS includes a PLC controller in which the unique identifying information is stored. Based on the unique identifying information, each of the first switch SW1, the second switch SW2, the controller 14, the electrical height adjustable seatpost 16, the electrical shifting device 18, the electrical suspension FS, and the electrical suspension RS can recognize control signals which are necessary for itself among control signals transmitted via the electric communication path CP. For example, the controller 14 can recognize information signals transmitted from the first switch SW1, the second switch SW2, the electrical height adjustable seatpost 16, the electrical shifting device 18, the electrical suspension FS, and the electrical suspension RS via the electric communication path CP. Instead of using the PLC technology, however, separate signal wires can be provided for transmitting data in addition to the ground wire and the voltage wire if needed and/or desired. Furthermore, wireless technology can be used to transmit control signals between these electric components. The configuration of the electric communication path CP is not limited to the above configuration illustrated in FIG. 3. The electric communication path CP can include a wireless communication path.

As seen in FIG. 2, the first switch SW1 includes a first PLC controller PC1 connected to the processor 14A and the memory 14B with the bus 14D. For example, the first PLC controller PC includes a filter circuit and a voltage regulator circuit. The first PLC controller PC1 is configured to separate input signals to a power source voltage and control signals. The first PLC controller PC1 is configured to regulate the power source voltage to a level at which the first switch SW1 can properly operate. The first PLC controller PC1 is further configured to superimpose the first signal CS1 on the power source voltage applied to the electric communication path CP from the battery B92.

The controller 14 includes a third PLC controller PC3. The third PLC controller PC3 has substantially the same configuration as that of the first PLC controller PC1. Specifically, the third PLC controller PC3 is configured to separate input signals to the power source voltage, the first signal CS1, and the second signal CS2. The third PLC controller PC3 is configured to regulate the power source voltage to a level at which the processor 14A and the memory 14B can properly operate. The third PLC controller PC3 is further configured to superimpose a third signal CS3 (described later) on the power source voltage. The third PLC controller PC3 is further configured to superimpose a fourth signal CS4 (described later) on the power source voltage. The third PLC controller PC3 is further configured to superimpose a fifth signal CS5 (described later) on the power source voltage.

The electrical height adjustable seatpost 16 includes a fourth PLC controller PC4. The fourth PLC controller PC4 has substantially the same configuration as that of the first PLC controller PC1. The fourth PLC controller PC4 is configured to separate input signals to the power source voltage and the third signal CS3. The fourth PLC controller PC4 is configured to regulate the power source voltage to a level at which electric components of the electrical height adjustable seatpost 16 can properly operate. The fourth PLC controller PC4 is further configured to superimpose control signals on the power source voltage.

The electrical suspension FS includes a fifth PLC controller PC5. The fifth PLC controller PC5 has substantially the same configuration as that of the first PLC controller PC1. The fifth PLC controller PC5 is configured to separate input signals to the power source voltage, the fourth signal CS4, and the fifth signal CS5. The fifth PLC controller PC5 is configured to regulate the power source voltage to a level at which electric components of the electrical suspension FS can properly operate. The fifth PLC controller PC5 is further configured to superimpose control signals on the power source voltage.

Figure 5:
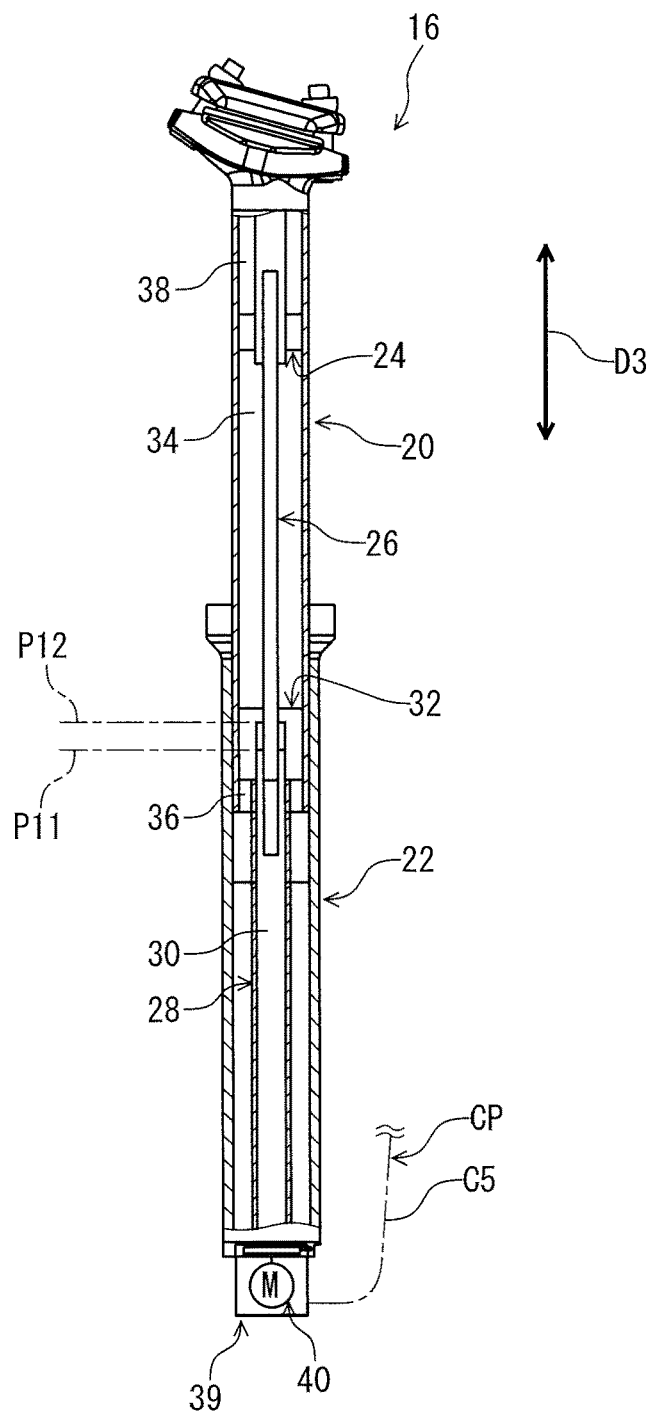
FIG. 5 is a cross-sectional view of an electrical height adjustable seatpost of the bicycle illustrated in FIG. 1.

As seen in FIG. 5, the electrical height adjustable seatpost 16 includes a first tube 20, a second tube 22, a floating piston 24, a rod 26, a guide member 28, a flow control part 30, and a valve unit 32. The first tube 20 and the second tube 22 are telescopically arranged, with the amount of insertion of the first tube 20 into the second tube 22 being adjustable. The second tube 22 is secured to the seat tube B11A (FIG. 1) by a conventional clamping arrangement (not shown) provided on an upper end of the seat tube B11A.

The electrical height adjustable seatpost 16 has a positioning state and an adjustable state. In the positioning state, the first tube 20 and the second tube 22 are positioned to not move relative to each other. In the adjustable state, the first tube 20 and the second tube 22 are movable relative to each other to change the position of the saddle B3 in a longitudinal direction of the electrical height adjustable seatpost 16.

The valve unit 32 divides an interior bore of the first tube 20 into a first fluid chamber 34 and a second fluid chamber 36. The flow control part 30 is provided in the guide member 28 to move relative to the valve unit 32 between a closed position P11 and an open position P12 in a telescopic direction D3. The flow control part 30 is biased by a biasing element (not shown) toward the closed position P11. The closed position P11 corresponds to the positioning state. The open position P12 corresponds to the adjustable state.

The valve unit 32 is closed when the flow control part 30 is positioned at the closed position P11. The valve unit 32 is open when the flow control part 30 is positioned at the open position P12. The valve unit 32 is coupled to the second tube 22 via the guide member 28 to move together relative to the first tube 20. The first fluid chamber 34 is disposed between the valve unit 32 and the floating piston 24. The second fluid chamber 36 is disposed between the valve unit 32 and a lower end of the first tube 20. The flow control part 30 cooperates with the guide member 28 and the valve unit 32 to control flow of fluid between the first fluid chamber 34 and the second fluid chamber 36 to change a position of the first tube 20 relative to the second tube 22.

When the valve unit 32 is closed, the first tube 20 is positioned relative to the second tube 22 in the telescopic direction D3. When the valve unit 32 is open, the first tube 20 is movable relative to the second tube 22 in the telescopic direction D3. The floating piston 24 is disposed in the interior bore of the first tube 20 and forms a gas chamber 38 disposed between the floating piston 24 and an upper end of the first tube 20. The shorter total length of the electrical height adjustable seatpost 16 increases an inner pressure of the gas chamber 38. The electrical height adjustable seatpost 16 includes structures which have been known in the bicycle field, they will not be described and/or illustrated in detail here for the sake of brevity.

As seen in FIG. 5, the electrical height adjustable seatpost 16 comprises the electrical actuation unit 39. The electrical actuation unit 39 is connected to the controller 14 via the electric communication path CP. The electrical actuation unit 39 moves the flow control part 30 from the closed position P11 to the open position P12 in response to the third signal CS3 transmitted from the controller 14. The electrical actuation unit 39 keeps the flow control part 30 at the open position P12 while receiving the third signal CS3 from the controller 14. The electrical actuation unit 39 keeps the flow control part 30 at the closed position P11 when the electrical actuation unit 39 does not receive the third signal CS3 from the controller 14.

The electrical actuation unit 39 includes a valve actuator 40, a valve position sensor 42, and an actuator driver 44. The valve actuator 40, the valve position sensor 42, the actuator driver 44, and the fourth PLC controller PC4 are connected to each other with a bus 45. The valve actuator 40 is mechanically coupled to the flow control part 30 to move the flow control part 30 between the closed position P11 and the open position P12. In this embodiment, the valve actuator 40 includes a direct current (DC) motor. The valve actuator 40 includes a rotational shaft (not shown) to output a rotational force. The rotational shaft is coupled to the flow control part 30 via a gear reducer (not shown). Other examples of the valve actuator 40 include a stepper motor, an alternating current (AC) motor, and an electromagnetic solenoid.

The valve position sensor 42 is configured to sense a valve position of the flow control part 30 via the valve actuator 40. In this embodiment, the valve position sensor 42 is a contact rotational position sensor such as a potentiometer. The valve position sensor 42 is configured to sense an absolute rotational position of the rotational shaft of the valve actuator 40 as the valve position of the flow control part 30. Other examples of the valve position sensor 42 include a non-contact rotational position sensor such as an optical sensor (e.g., a rotary encoder) and a magnetic sensor (e.g., a hall sensor).

The valve position sensor 42 is electrically connected to the actuator driver 44. The actuator driver 44 is configured to control the valve actuator 40 based on the third signal CS3 and the position sensed by the valve position sensor 42. Specifically, the actuator driver 44 is electrically connected to the valve actuator 40. The actuator driver 44 is configured to control a rotational direction and a rotational speed of the rotational shaft based on the valve position and the third signal CS3 transmitted from the controller 14. Furthermore, the actuator driver 44 is configured to stop rotation of the rotational shaft to position the flow control part 30 at one of the closed position P11 and the open position P12 based on the valve position and the third signal CS3 transmitted from the controller 14.

The actuator driver 44 controls the valve actuator 40 to keep the flow control part 30 at the closed position P11 while the actuator driver 44 does not receive the third signal CS3. The actuator driver 44 controls the valve actuator 40 to move the flow control part 30 (FIG. 5) from the closed position P11 to the open position P12 when the actuator driver 44 receives the third signal CS3. The actuator driver 44 controls the valve actuator 40 to keep the flow control part 30 at the open position P12 while the actuator driver 44 keeps receiving the third signal CS3. The actuator driver 44 controls the valve actuator 40 to return the flow control part 30 from the open position P12 to the closed position P11 when the actuator driver 44 detects an end of the third signal CS3. For example, the actuator driver 44 includes an electric circuit configured to perform the above functions of the actuator driver 44.

Figure 6:
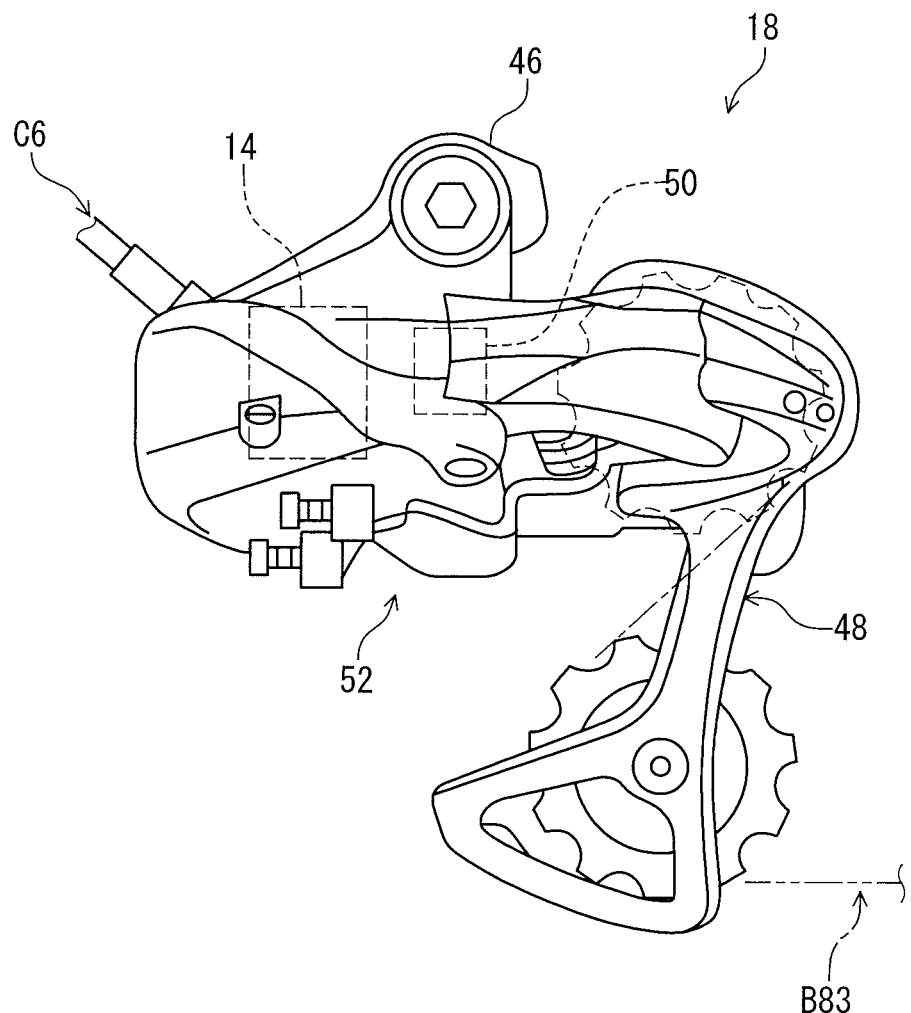
FIG. 6 is a side elevational view of an electrical shifting device of the bicycle illustrated in FIG. 1.

As seen in FIG. 6, the electrical shifting device 18 comprises a base 46, a chain guide 48, and a motor unit 50. The motor unit 50 moves the chain guide 48 relative to the base 46. The controller 14 is operatively connected to the motor unit 50. In the illustrated embodiment, the electrical shifting device 18 includes an electrical rear derailleur 52 and the controller 14. However, the electrical shifting device 18 can include an electrical front derailleur and the controller 14. In this embodiment, the electrical rear derailleur 52 includes the base 46, the chain guide 48, and the motor unit 50.

As seen in FIG. 2, the chain guide 48 guides the bicycle chain B83 in a transverse direction D2 of the bicycle 10 between the low to top gear positions of the rear sprocket B88. The position of the chain guide 48 corresponds to the shift position of the electrical rear derailleur 52.

The motor unit 50 includes a motor 54, a shift position sensor 56, and a motor driver 58. The motor 54, the shift position sensor 56, the motor driver 58, and the fifth PLC controller PC5 are connected to each other with a bus 59. The motor 54 is mechanically coupled to the chain guide 48. The motor 54 is configured to move the chain guide 48 to shift the bicycle chain B83 relative to the rear sprocket B82. In this embodiment, the motor 54 includes a DC motor. The motor 54 includes a rotational shaft (not shown) to output a rotational force. The rotational shaft is coupled to the chain guide 48 via a gear reducer (not shown). Other examples of the motor 54 include a stepper motor and an AC motor.

The electrical shifting device 18 has a plurality of available shift positions as the shift position of the electrical rear derailleur 52. In this embodiment, the electrical shifting device 18 has eleven available shift positions respectively corresponding to the first to eleventh rear sprocket wheels Sr1 to Sr11.

The shift position sensor 56 is configured to sense a position of the motor 54 as the shift position of the electrical shifting device 18. In this embodiment, the shift position sensor 56 is a contact rotational position sensor such as a potentiometer. The shift position sensor 56 is configured to sense an absolute rotational position of the rotational shaft of the motor 54 as the shift position of the electrical shifting device 18. Other examples of the shift position sensor 56 include a non-contact rotational position sensor such as an optical sensor (e.g., a rotary encoder) and a magnetic sensor (e.g., a hall sensor).

The shift position sensor 56 is electrically connected to the motor driver 58. The motor driver 58 is configured to control the motor 54 based on the front shift position sensed by the shift position sensor 56. Specifically, the motor driver 58 is electrically connected to the motor 54. The motor driver 58 is configured to control a rotational direction and a rotational speed of the rotational shaft based on the shift position and each of the first and second signals CS1 and CS2. Furthermore, the motor driver 58 is configured to stop rotation of the rotational shaft to position the chain guide 48 at one of the low to top gear positions based on the shift position and each of the first and second signals CS1 and CS2. The motor driver 58 transmits the shift position sensed by the shift position sensor 56 to the controller 14. The controller 14 stores the shift position transmitted from the motor driver 58 as a latest rear shift position SPR. For example, the motor driver 58 includes an electric circuit configured to perform the above functions of the motor driver 58.

In this embodiment, as seen in FIG. 6, the controller 14 is integrally provided with the electrical rear derailleur 52 as a single unit. Specifically, the controller 14 is provided to one of the motor unit 50 and the base 46. The controller 14 is provided to the base 46. The base 46 includes an internal space. The motor unit 50 and the controller 14 are provided in the internal space of the base 46. However, the controller 14 can be provided to the motor unit 50 as a single unit. As seen in FIG. 2, the bus 14D of the controller 14 is connected to the bus 59 of the motor unit 50 of the electrical rear derailleur 52.

As seen in FIG. 2, the controller 14 is configured to operate the electrical rear derailleur 52 provided as the electrical bicycle shifting device in response to one of the first signal CS1 and the second signal CS2. The controller 14 is configured to operate the electrical rear derailleur 52 to upshift in response to the first signal CS1. The controller 14 is configured to operate the electrical rear derailleur 52 to downshift in response to the second signal CS2.

The controller 14 is configured to control the motor unit 50 to move the chain guide 48 relative to the base 46 in an upshift direction in response to the first signal CS1. The controller 14 is configured to control the motor unit 50 to move the chain guide 48 relative to the base 46 in a downshift direction in response to the second signal CS2.

In the present application, upshifting of the electrical shifting device 18 occurs when the bicycle chain B83 is shifted by the electrical shifting device 18 from a larger sprocket to a neighboring smaller sprocket. Downshifting of the electrical shifting device 18 occurs when the bicycle chain B83 is shifted by the electrical shifting device 18 from a smaller sprocket to a neighboring larger sprocket.

Figure 7:
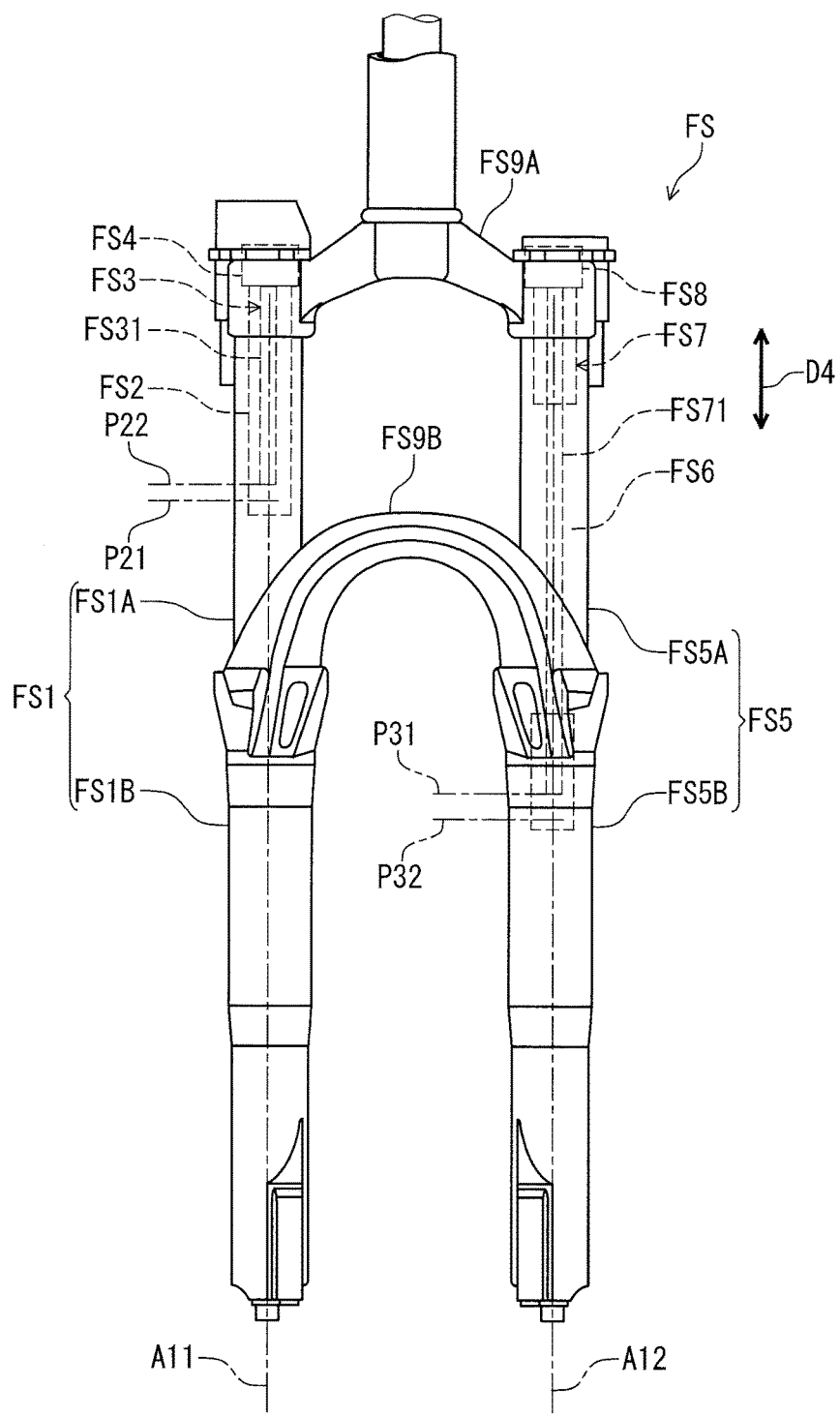
FIG. 7 is a front view of an electrical suspension of the bicycle illustrated in FIG. 1.

As seen in FIG. 7, the electrical suspension FS comprises a first suspension tube FS1A, a second suspension tube FS1B, a damper structure FS2, a lock structure FS3, and a lock actuator FS4. The first suspension tube FS1A has a center axis A11. The second suspension tube FS1B is telescopically received in the first suspension tube FS1A. The first suspension tube FS1A and the second suspension tube FS1B constitute a first suspension fork FS1. The damper structure FS2 is provided in the first and second suspension tubes FS1A and FS1B to provide a damping force, which resists both compression and rebound motion, to slow the motion of the first suspension fork FS1 in either direction.

In this embodiment, the electrical suspension FS has an unlocked state and a lockout state. In the unlocked state, the first suspension tube FS1A and the second suspension tube FS1B are movable relative to each other in a telescopic direction D4 to absorb shocks from rough terrain. In the lockout state, the first suspension tube FS1A is locked relative to the second suspension tube FS1B in the telescopic direction D4.

The lock structure FS3 is provided in the first suspension fork FS1 to change the state of the electrical suspension FS between the unlocked state and the lockout state. The lock actuator FS4 is coupled to the lock structure FS3 to actuate the lock structure FS3 to change the state of the electrical suspension FS between the unlocked state and the lockout state. The lock actuator FS4 is mounted on an upper end of the second suspension tube FS1B. However, the lock actuator FS4 can be provided at other positions.

The lock structure FS3 includes a lock valve member FS31 movable relative to the first suspension tube FS1A between a lock position P21 and an unlock position P22. For example, a fluid passageway (not shown) of the damper structure FS2 is closed by the lock valve member FS31 in the lockout state. The fluid passageway (not shown) of the damper structure FS2 is released by the lock valve member FS31 of the lock structure FS3 in the locked state. Lockout structures for bicycle suspensions are well known in the bicycle field. Thus, the lock structure FS3 can be any type of suitable lockout device as needed and/or desired.

Similarly, the electrical suspension FS comprises a third suspension tube FS5A, a fourth suspension tube FS5B, an air-spring chamber FS6, a stroke adjustment structure FS7, and a stroke actuator FS8. The third suspension tube FS5A has a center axis A12. The fourth suspension tube FS5B is telescopically received in the third suspension tube FS5A. The third suspension tube FS5A and the fourth suspension tube FS5B constitute a second suspension fork FS5. The air-spring chamber FS6 provides resistance to compression of the second suspension fork FS5 and releases energy stored during compression to cause the second suspension fork FS5 to extend or rebound.

In this embodiment, the electrical suspension FS has a long-stroke state and a short-stroke state. The long-stroke state provides a longer overall length of the second suspension fork FS5. The short-stroke state provides a shorter overall length of the second suspension fork FS5.

The stroke adjustment structure FS7 is provided in the second suspension fork FS5 to change the state of the electrical suspension FS between the long-stroke state and the short-stroke state. The stroke actuator FS8 is coupled to the stroke adjustment structure FS7 to actuate the stroke adjustment structure FS7 to change the state of the electrical suspension FS between the long-stroke state and the short-stroke state. The stroke actuator FS8 is mounted on an upper end of the fourth suspension tube FS5B. However, the stroke actuator FS8 can be provided at other positions.

The stroke adjustment structure FS7 includes a stroke valve member FS71 movable relative to the third suspension tube FS5A between a long-stroke position P31 and a short-stroke position P32. The stroke actuator FS8 moves the stroke valve member FS71 between the long-stroke position P31 and the short-stroke position P32. The second suspension fork FS5 is in the long-stroke position in a state where the stroke valve member FS71 is at the long-stroke position P31. The second suspension fork F5 is in the short-stroke position in a state where the stroke valve member FS71 is at the long-stroke position. Lockout structures for bicycle suspensions are well known in the bicycle field. Thus, the stroke adjustment structure FS7 can be any type of suitable lockout device as needed and/or desired.

The second and fourth suspension tubes FS1B and FS5B are coupled to a crown FS9A. The first suspension tube FS1A is coupled to the third suspension tube FS5A with a coupling arm FS9B. The first and third suspension tubes FS1A and FS5A are integrally movable relative to the second and fourth suspension tubes FS1B and FS5B to absorb shocks. In the unlocked state of the lock structure FS3, the first suspension tube FS1A and the third suspension tube FS5A are respectively movable relative to the second suspension tube FS1B and the fourth suspension tube FS5B in the telescopic direction D4 to absorb shocks from rough terrain.

As seen in FIG. 2, the electrical suspension FS further comprises a lock position sensor FS10 and a lock actuator driver FS11. The lock actuator FS4, the lock position sensor FS10, and the lock actuator driver FS11 are connected to each other with a bus FS12. The lock actuator FS4, the lock position sensor FS10, and the lock actuator driver FS11 constitute a suspension motor unit FS13.

The lock actuator FS4 is mechanically coupled to the lock valve member FS31 to move the lock valve member FS31 between the lock position P21 (FIG. 7) and the unlock position P22 (FIG. 7). In this embodiment, the lock actuator FS4 includes a direct current (DC) motor. The lock actuator FS4 includes a rotational shaft (not shown) to output a rotational force. The rotational shaft is coupled to the lock valve member FS31 via a gear reducer (not shown). Other examples of the lock actuator FS4 include a stepper motor, an alternating current (AC) motor, and an electromagnetic solenoid.

The lock position sensor FS10 is configured to sense a valve position of the lock valve member FS31 via the lock actuator FS4. In this embodiment, the lock position sensor FS10 is a contact rotational position sensor such as a potentiometer. The lock position sensor FS10 is configured to sense an absolute rotational position of the rotational shaft of the lock actuator FS4 as the valve position of the lock valve member FS31. Other examples of the lock position sensor FS10 include a non-contact rotational position sensor such as an optical sensor (e.g., a rotary encoder) and a magnetic sensor (e.g., a hall sensor).

The lock position sensor FS10 is electrically connected to the lock actuator driver FS11. The lock actuator driver FS11 is configured to control the lock actuator FS4 based on the fourth signal CS4 and the position sensed by the lock position sensor FS10. Specifically, the lock actuator driver FS11 is electrically connected to the lock actuator FS4. The lock actuator driver FS11 is configured to control a rotational direction and a rotational speed of the rotational shaft based on the valve position and the fourth signal CS4 transmitted from the controller 14. Furthermore, the lock actuator driver FS11 is configured to stop rotation of the rotational shaft to position the lock valve member FS31 at one of the lock position P21 and the unlock position P22 based on the valve position and the fourth signal CS4 transmitted from the controller 14.

The lock actuator driver FS11 controls the lock actuator FS4 to alternately switch the lock position P21 (FIG. 7) and the unlock position P22 (FIG. 7) of the lock valve member FS31 in response to the fourth signal CS4. For example, the lock actuator driver FS11 includes an electric circuit configured to perform the above functions of the lock actuator driver FS11.

As seen in FIG. 7, the electrical suspension FS further comprises a stroke position sensor FS14 and a stroke actuator driver FS15. The stroke actuator FS8, the stroke position sensor FS14, and the stroke actuator driver FS15 are connected to each other with the bus FS16. The stroke actuator FS8, the stroke position sensor FS14, and the stroke actuator driver FS15 constitute a suspension motor unit FS17.

The stroke actuator FS8 is mechanically coupled to the stroke valve member FS71 to move the stroke valve member FS71 between the long-stroke position P31 and the short-stroke position P32. In this embodiment, the stroke actuator FS8 includes a direct current (DC) motor. The stroke actuator FS8 includes a rotational shaft (not shown) to output a rotational force. The rotational shaft is coupled to the stroke valve member FS71 via a gear reducer (not shown). Other examples of the stroke actuator FS8 include a stepper motor, an alternating current (AC) motor, and an electromagnetic solenoid.

The stroke position sensor FS14 is configured to sense a valve position of the stroke valve member FS71 via the stroke actuator FS8. In this embodiment, the stroke position sensor FS14 is a contact rotational position sensor such as a potentiometer. The stroke position sensor FS14 is configured to sense an absolute rotational position of the rotational shaft of the stroke actuator FS8 as the valve position of the stroke valve member F7. Other examples of the stroke position sensor FS14 include a non-contact rotational position sensor such as an optical sensor (e.g., a rotary encoder) and a magnetic sensor (e.g., a hall sensor).

The stroke position sensor FS14 is electrically connected to the stroke actuator driver FS15. The stroke actuator driver FS15 is configured to control the stroke actuator FS8 based on the fifth signal CS5 and the position sensed by the stroke position sensor FS14. Specifically, the stroke actuator driver FS15 is electrically connected to the stroke actuator FS8. The stroke actuator driver FS15 is configured to control a rotational direction and a rotational speed of the rotational shaft based on the valve position and the fifth signal CS5 transmitted from the controller 14. Furthermore, the stroke actuator driver FS15 is configured to stop rotation of the rotational shaft to position the stroke valve member FS71 at one of the long-stroke position P31 and the short-stroke position P32 based on the valve position and the fifth signal CS5 transmitted from the controller 14.

The stroke actuator driver FS15 controls the stroke actuator FS8 to alternately switch the long-stroke position P31 (FIG. 7) and the short-stroke position P32 (FIG. 7) of the stroke valve member FS71 in response to the fifth signal CS5. For example, the stroke actuator driver FS15 includes an electric circuit configured to perform the above functions of the stroke actuator driver FS15.

The electrical suspension RS has substantially the same structure and/or configuration as those of the electrical suspension FS. For example, the electrical suspension RS has an unlocked state and a lockout state. Thus, it will not be described in detail here for the sake of brevity.

Figure 8:
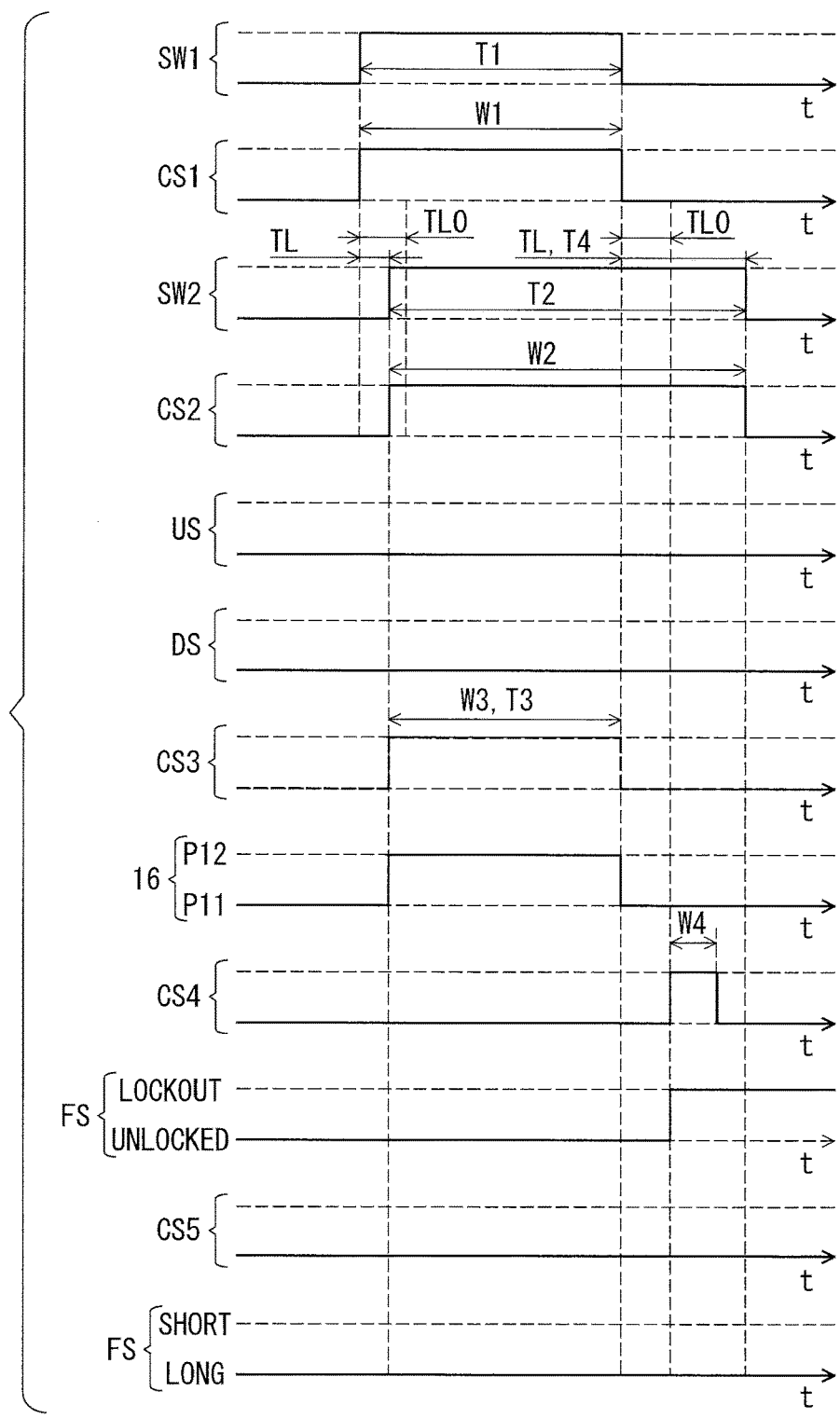
FIGS. 8 to 17 are timing charts of the electrical bicycle operating system illustrated in FIG. 2.
Figure 9:
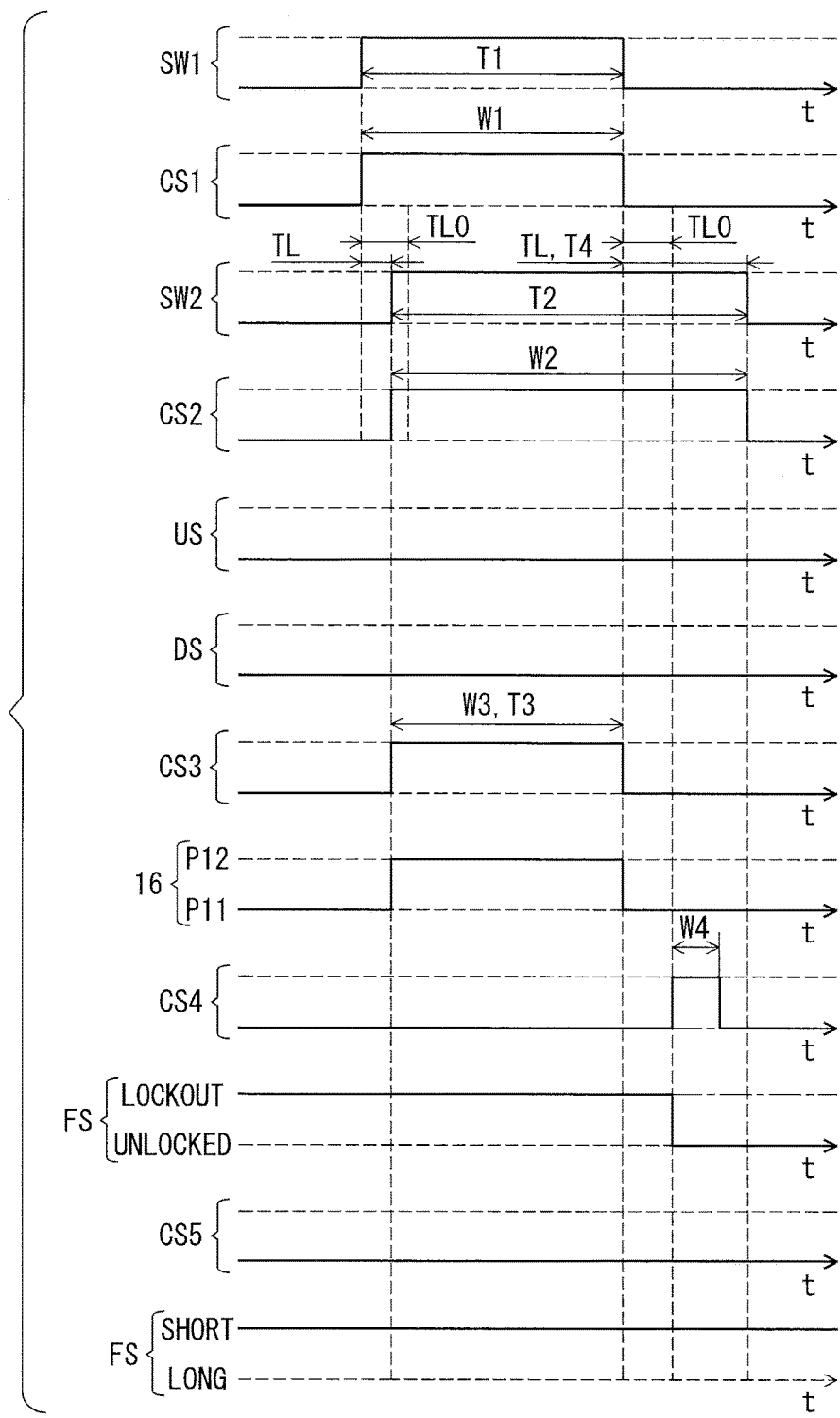

As seen in FIGS. 8 and 9, the controller 14 is configured to generate the third signal CS3 different from the first signal CS1 and the second signal CS2 in response to a concurrent operation of the first switch SW1 and the second switch SW2. The third signal CS3 can also be referred to as the operation signal CS3. The concurrent operation of the first switch SW1 and the second switch SW2 includes an operation including a delay time between a first operation of the first switch SW1 and a second operation of the second switch SW2. For example, the delay time ranges from 0 sec to 0.5 sec. The controller 14 is configured to generate a fourth signal CS4 different from the third signal CS3 in response to a release of the first switch SW1 in a state where the second switch SW2 is operated continuously after the concurrent operation. The fourth signal CS4 is different from the first signal CS1 and the second signal CS2. However, the fourth signal CS4 can be a same signal as one of the first signal CS1 and the second signal CS2.

Figure 10:
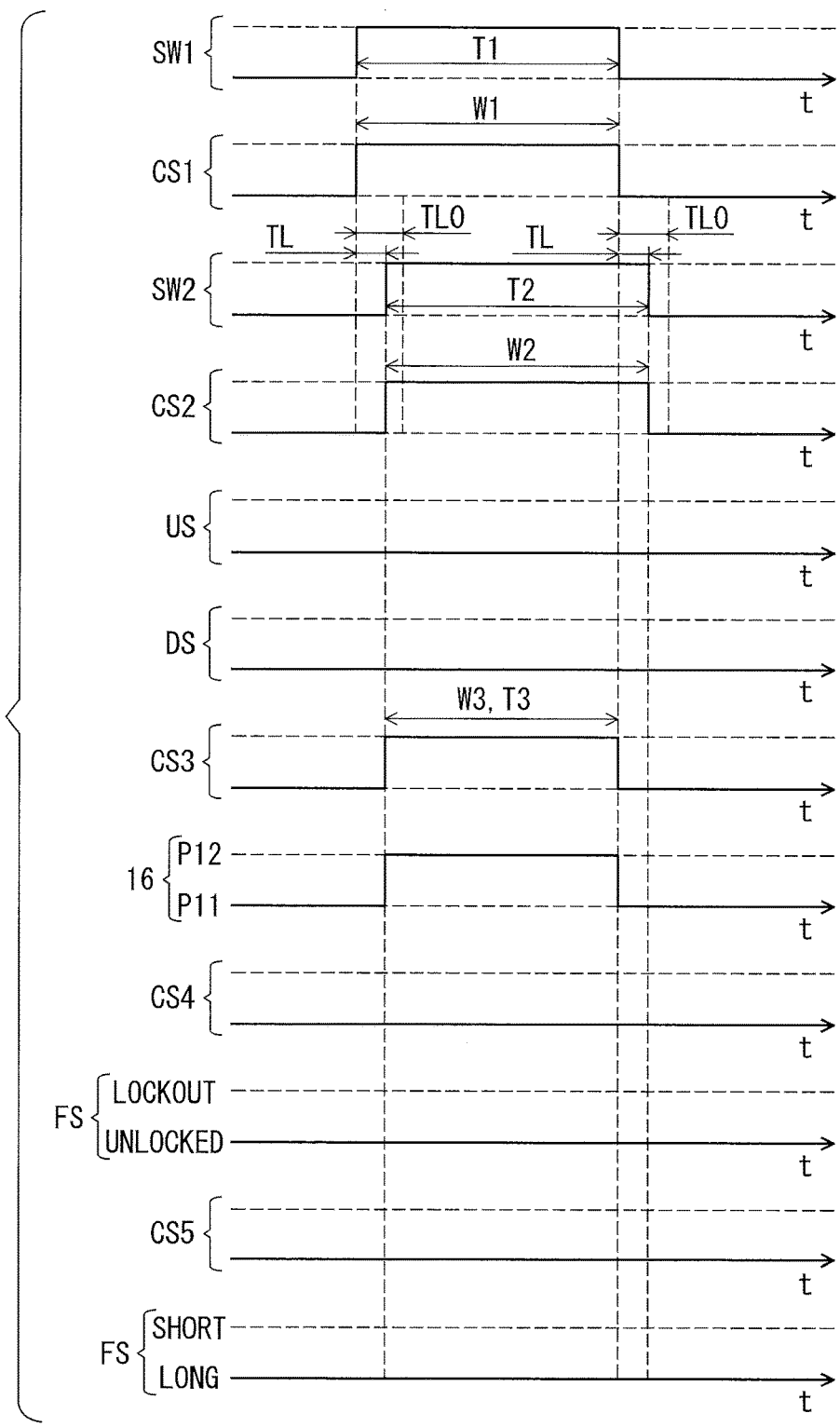
Figure 11:
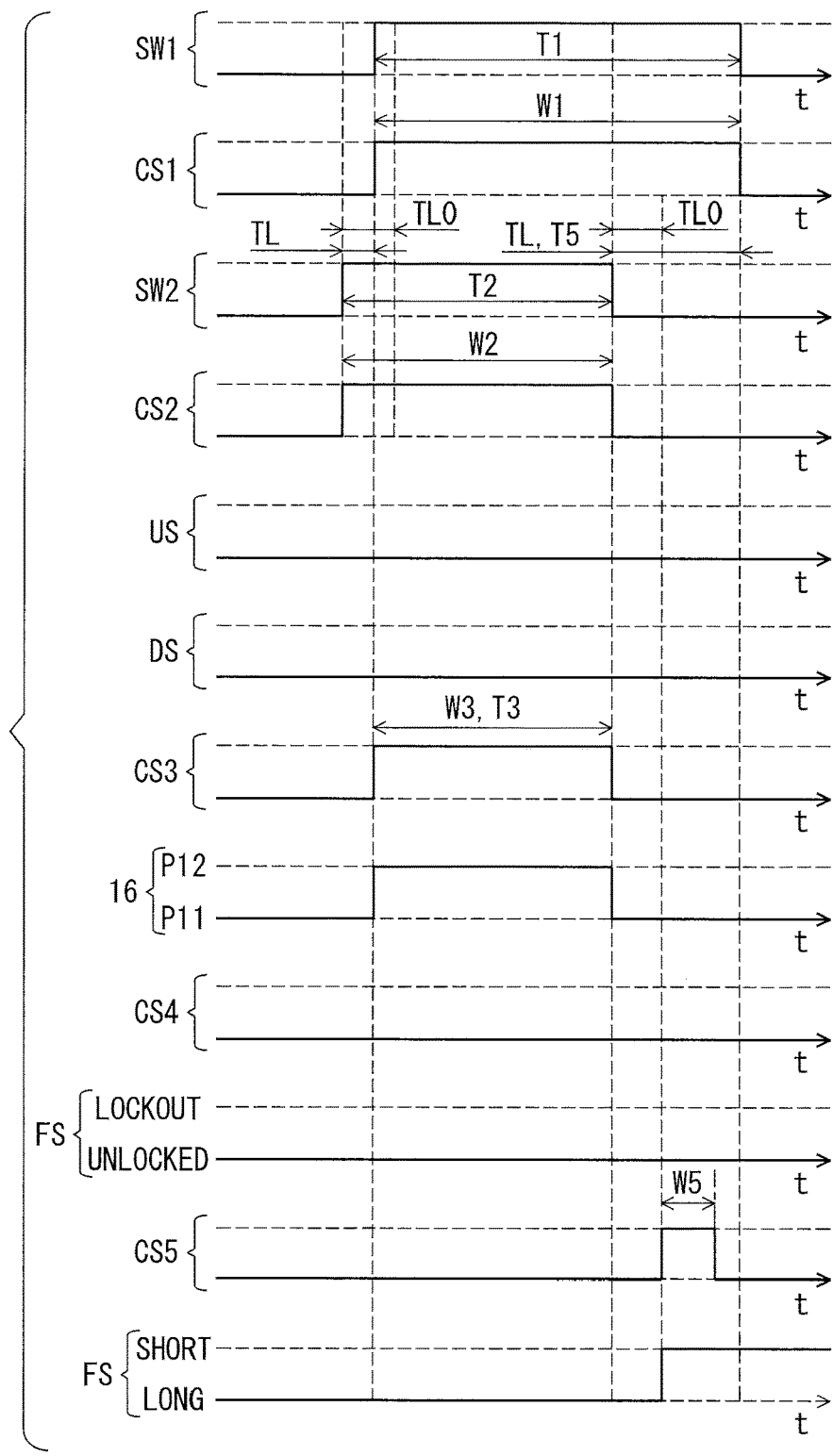

As seen in FIGS. 10 and 11, the controller 14 is configured to generate the fifth signal CS5 in response to a release of the second switch SW2 in a state where the first switch SW1 is operated continuously after the concurrent operation. The fifth signal CS5 is different from the first signal CS1, the second signal CS2, the third signal CS3, and the fourth signal CS4. However, the fifth signal CS5 can be a same signal as one of the first signal CS1, the second signal CS2 and the fourth signal CS4.

The third signal CS3 is indicative of operating one of the electrical height adjustable seatpost 16 and the electrical suspension FS. The fourth signal CS4 is indicative of operating the other of the electrical height adjustable seatpost 16 and the electrical suspension FS. The fourth signal CS4 is indicative of one of a lock switch operation and a stroke adjustment operation of the electrical suspension FS. The fifth signal CS5 includes indicative of the other of the lock switch operation and the stroke adjustment operation of the electrical suspension FS.

In this embodiment, the third signal CS3 is indicative of operating the electrical height adjustable seatpost 16. The third signal CS3 is indicative of changing an overall length of the electrical height adjustable seatpost 16. The third signal CS3 is indicative of opening and/or closing the valve unit 32 of the electrical height adjustable seatpost 16 to change the overall length of the electrical height adjustable seatpost 16.

The fourth signal CS4 is indicative of operating the electrical suspension FS. The fourth signal CS4 is indicative of the lock switch operation of the electrical suspension FS. The fifth signal CS5 is indicative of the stroke adjustment operation of the electrical suspension FS. The fourth signal CS4 is indicative of changing a state of the electrical suspension FS between a lockout state and an unlocked state. The fifth signal CS5 is indicative of changing a state of the electrical suspension FS between a long-stroke state and a short-stroke state.

However, the third signal CS3 can be indicative of operating the electrical suspension FS. The fourth signal CS4 can be indicative of operating the electrical height adjustable seatpost 16. The fifth signal CS5 can be indicative of operating the electrical height adjustable seatpost 16. The fourth signal CS4 can be indicative of the stroke adjustment operation of the electrical suspension FS. The fifth signal CS5 can be indicative of the lock switch operation of the electrical suspension FS. Furthermore, the third signal CS3 can include another signal to operate a device other than the electrical height adjustable seatpost 16 and the electrical suspension FS. The fourth signal CS4 can include another signal to operate a device other than the electrical height adjustable seatpost 16 and the electrical suspension FS. The fifth signal CS5 can include another signal to operate a device other than the electrical height adjustable seatpost 16 and the electrical suspension FS.

As seen in FIGS. 8 and 9, the controller 14 generates the third signal CS3 to operate at least one of the electrical height adjustable seatpost 16 and the electrical suspension FS when both the first switch SW1 and the second switch SW2 are operated concurrently. In this embodiment, the controller 14 generates the third signal CS3 to operate only the electrical height adjustable seatpost 16 when both the first switch SW1 and the second switch SW2 are operated concurrently. However, the controller 14 can be configured to generate the third signal CS3 to operate the electrical suspension FS or other components such as a driving unit when both the first switch SW1 and the second switch SW2 are operated concurrently instead of or in addition to the electrical height adjustable seatpost 16.

The controller 14 generates the third signal CS3 when the controller 14 receives both the first signal CS1 and the second signal CS2 concurrently. In this embodiment, the controller 14 generates the third signal CS3 when the controller 14 receives one of the first signal CS1 and the second signal CS2 within an operation time lag TL0 after receipt of the other of the first signal CS1 and the second signal CS2. Namely, the phrase "when the controller 14 receives both the first signal CS1 and the second signal CS2 concurrently" can include a case where a time lag occurs between receipt of the first signal CS1 and receipt of the second signal CS2 in addition to a case where no time lag occurs between receipt of the first signal CS1 and receipt of the second signal CS2. For example, one second may be admitted as the time lag. In a case where the operation time lag TL0 is zero, the controller 14 receives completely concurrently both the first signal CS1 and the second signal CS2. The controller 14 stores the operation time lag TL0 in the memory 14B.

As seen in FIGS. 8 and 9, the first switch SW1 generates the first signal CS1 having a first width W1 corresponding to a time T1 during which the first switch SW1 is operated. The second switch SW2 generates the second signal CS2 having a second width W2 corresponding to a time T2 during which the second switch SW2 is operated.

The controller 14 generates the third signal CS3 when the controller 14 receives the second signal CS2 within the operation time lag TL0 after receipt of the first signal CS1. The controller 14 stops generating the third signal CS3 when one of the first switch SW1 and the second switch SW2 is released in a state where the first switch SW1 and the second switch SW2 are operated.

The controller 14 generates the fourth signal CS4 after the operation time lag TL0 from release of the first switch SW1 (the end of the first signal CS1) in a case where the second switch SW2 is operated continuously until the operation time lag TL0 elapses from the release of the first switch SW1.

As seen in FIG. 10, the controller 14 does not generate the fourth signal CS4 when the controller 14 detects release of the second switch SW2 (the end of the second signal CS2) before the operation time lag TL0 elapses from the release of the first switch SW1.

Figure 12:
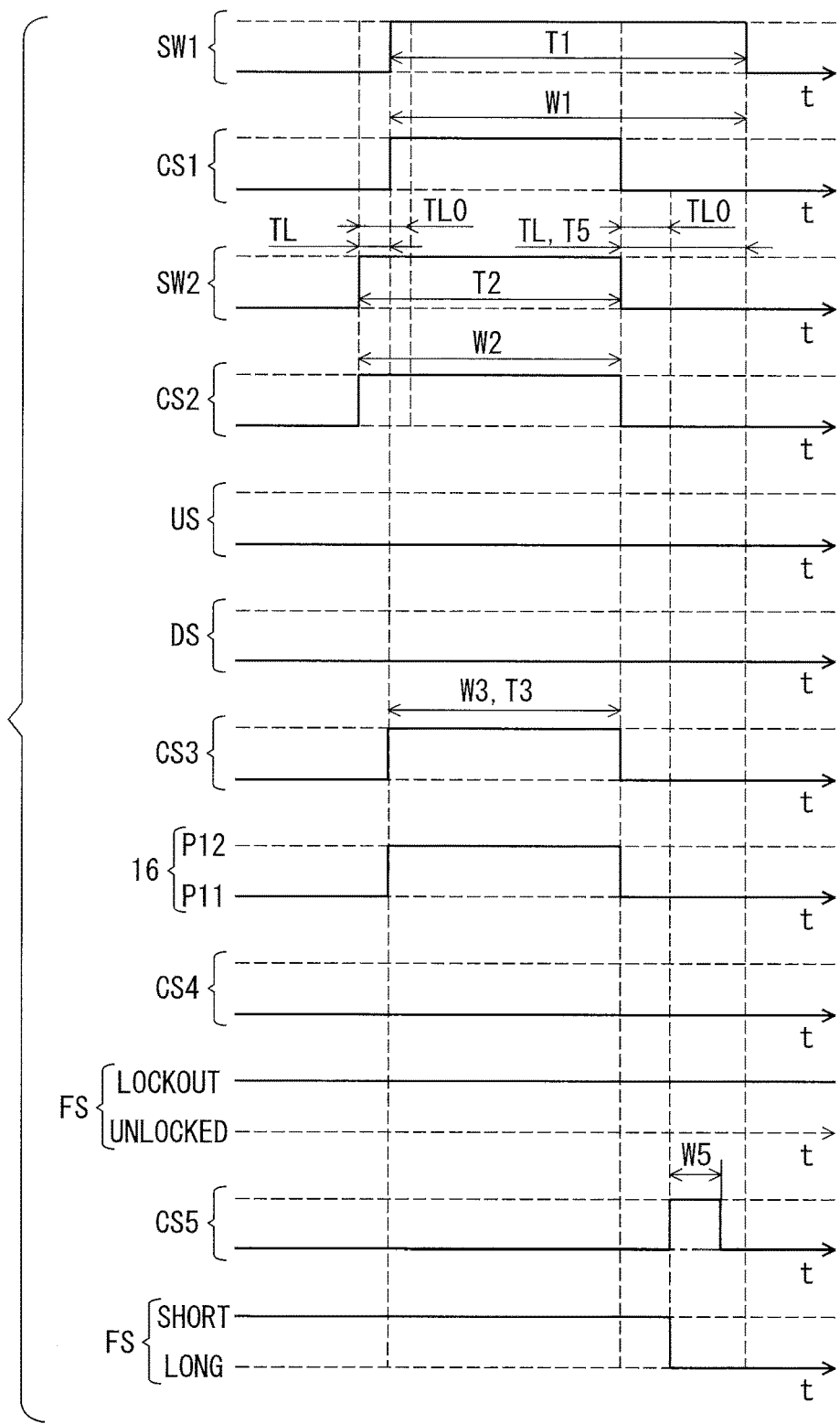

As seen in FIGS. 11 and 12, the controller 14 generates the third signal CS3 when the controller 14 detects the first operation (e.g., the first user input IP1) of the first switch SW1 within the operation time lag TL0 after a start of the second operation (e.g., the second user input IP2) of the second switch SW2. Specifically, the controller 14 generates the third signal CS3 when the controller 14 receives the first signal CS1 within the operation time lag TL0 after receipt of the second signal CS2. The controller 14 stops generating the third signal CS3 when one of the first switch SW1 and the second switch SW2 is released in a state where the first switch SW1 and the second switch SW2 are operated.

In this embodiment, the controller 14 is configured to determine the concurrent operation of the first switch SW1 and the second switch SW2 based on the first signal CS1 and the second signal CS2. However, the controller 14 can be configured to determine the concurrent operation of the first switch SW1 and the second switch SW2 based on the first operation of the first switch SW1 and the second operation of the second switch SW2 instead of the first and second signals CS1 and CS2. In such a configuration, it is possible not to generate the first and second signals CS1 and CS2 for generating the third signal CS3.

The controller 14 generates the fifth signal CS5 after the operation time lag TL0 from release of the second switch SW2 (the end of the second signal CS2) in a case where the first switch SW1 is operated continuously until the operation time lag TL0 elapses from the release of the second switch SW2.

Figure 13:
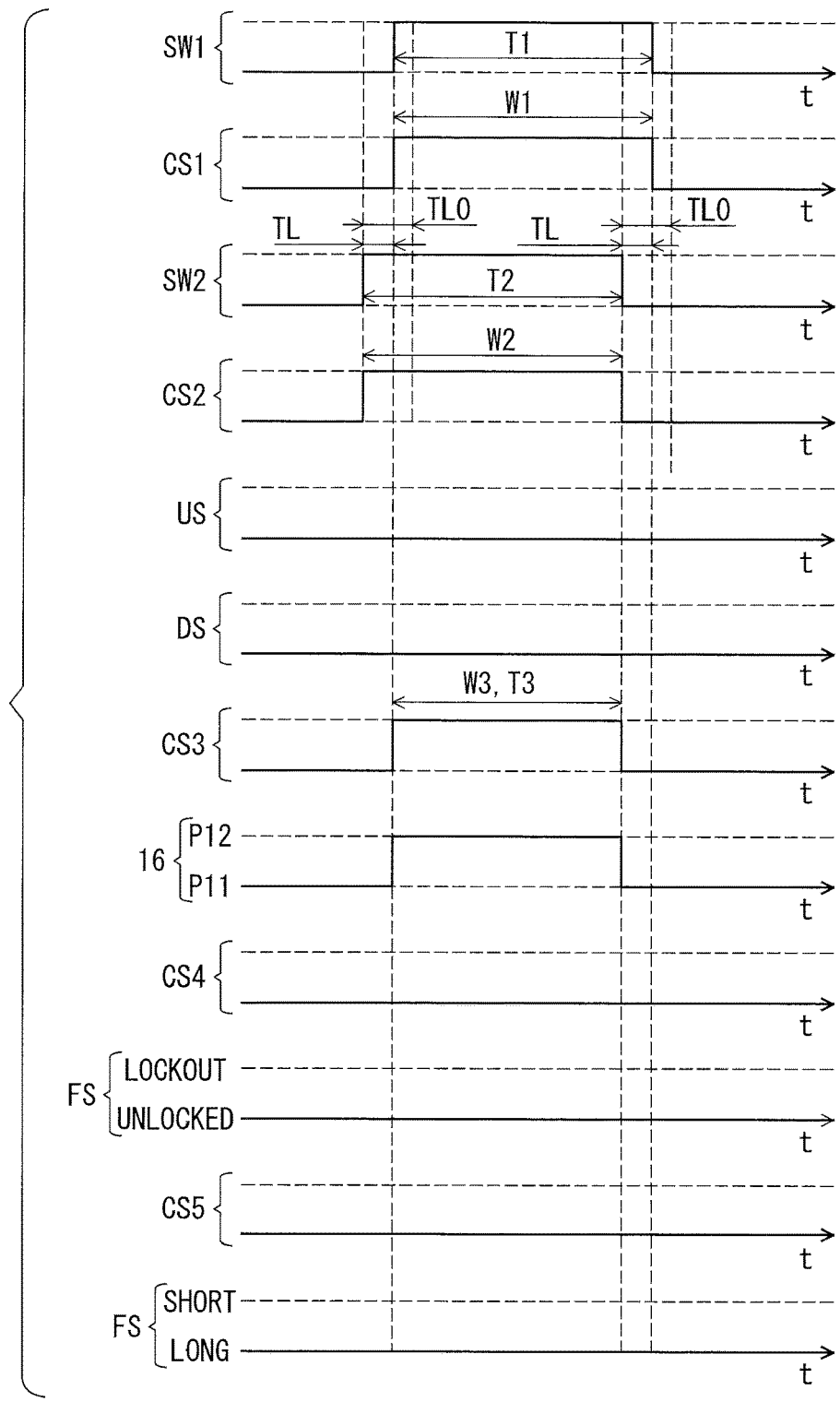

As seen in FIG. 13, the controller 14 does not generate the fifth signal CS5 when the controller 14 detects release of the first switch SW1 (the end of the first signal CS1) before the operation time lag TL0 elapses from the release of the second switch SW2.

Figure 14:
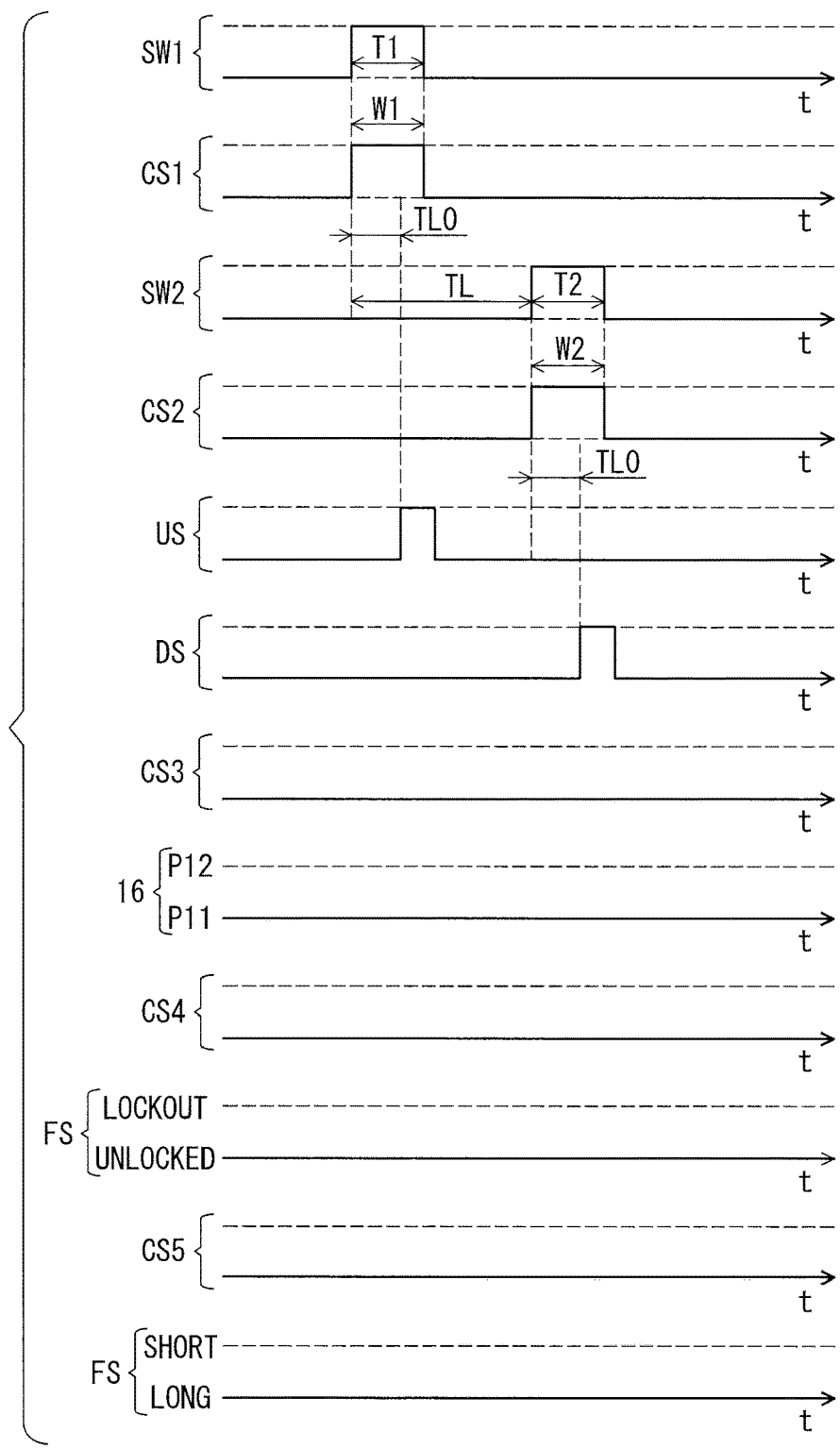

As seen in FIG. 14, the controller 14 does not generate the third signal CS3 when the controller 14 does not receive the second signal CS2 within the operation time lag TL0 after receipt of the first signal CS1. The controller 14 is configured to operate the electrical rear derailleur 52 to perform one of upshifting and downshifting in response to the first signal CS1 when the controller 14 does not receive the second signal CS2 within the operation time lag TL0 after receipt of the first signal CS1.

In this embodiment, the controller 14 generates an upshift command signal US to perform upshifting in the electrical rear derailleur 52 when the controller 14 does not receive the second signal CS2 within the operation time lag TL0 after receipt of the first signal CS1. The electrical rear derailleur 52 upshifts in response to the upshift command signal US.

Figure 15:
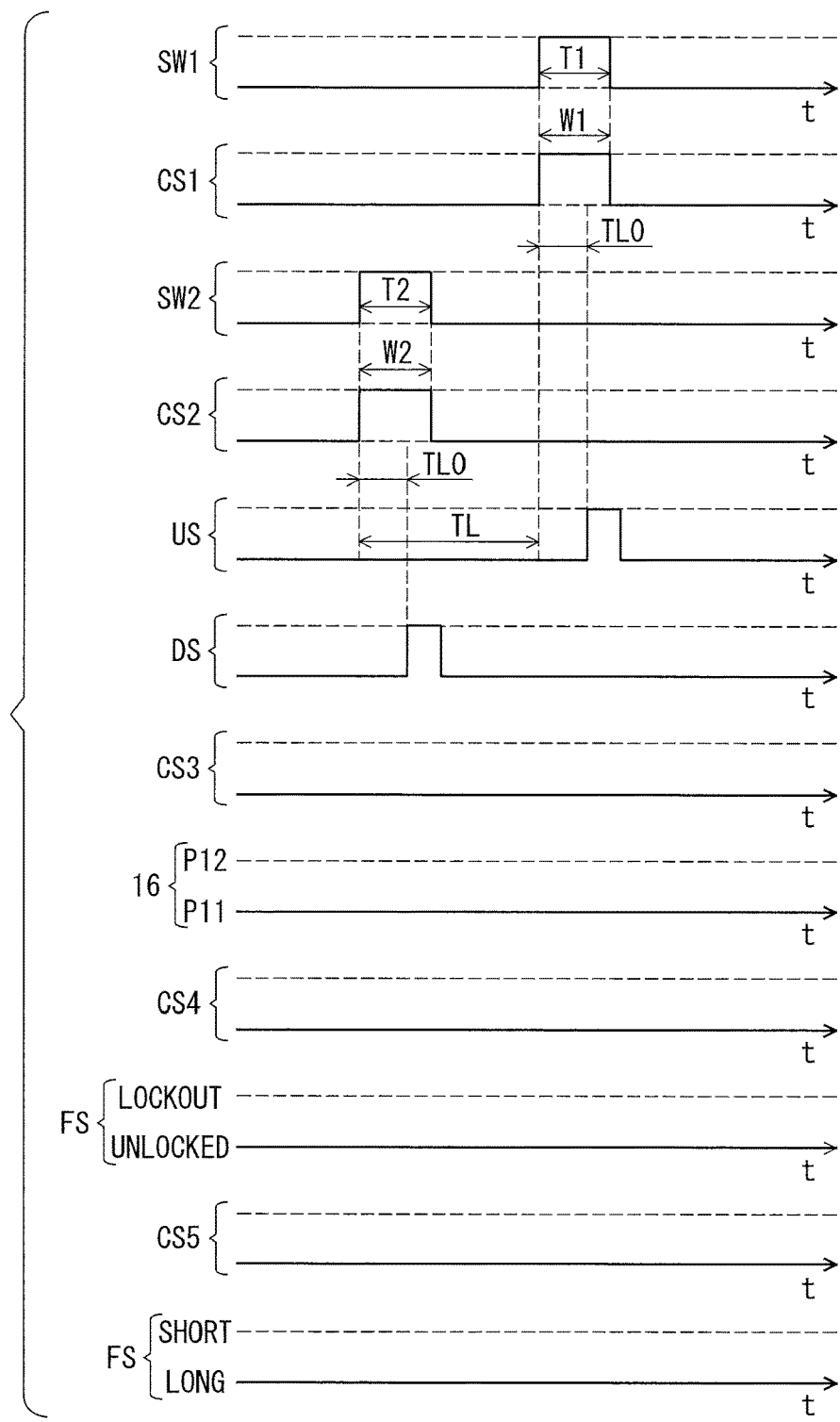

As seen in FIG. 15, the controller 14 does not generate the third signal CS3 when the controller 14 does not receive the first signal CS1 within the operation time lag TL0 after receipt of the second signal CS2. The controller 14 is configured to operate the electrical rear derailleur 52 to perform the other of upshifting and downshifting in response to the second signal CS2 when the controller 14 does not receive the first signal CS1 within the operation time lag TL0 after receipt of the second signal CS2.

In this embodiment, the controller 14 generates a downshift command signal DS to perform downshifting in the electrical rear derailleur 52 when the controller 14 does not receive the first signal CS1 within the operation time lag TL0 after receipt of the second signal CS2. The electrical rear derailleur 52 downshifts in response to the downshift command signal DS. In a case where the controller 14 is integrally provided with the motor unit 50 as a single unit, the upshift command signal US and the downshift command signal DS can be omitted. In such an embodiment, for example, the controller 14 has a function of the motor unit 50.

As seen in FIGS. 8 to 13, the controller 14 is configured to keep the shift position of the electrical rear derailleur 52 when the controller 14 receives one of the first signal CS1 and the second signal CS2 within the operation time lag TL0 after receipt of the other of the first signal CS1 and the second signal CS2. Namely, the controller 14 keeps the shift position of the electrical shifting device 18 when the controller 14 receives both the upshift signal CS1 and the downshift signal CS2 concurrently. In this embodiment, the controller 14 generates neither the upshift command signal US nor the downshift command signal DS when the controller 14 receives both the upshift signal CS1 and the downshift signal CS2 concurrently.

The controller 14 is configured to measure a time lag elapsed from receipt of one of the first signal CS1 and the second signal CS2 to receipt of the other of the first signal CS1 and the second signal CS2. Namely, the controller 14 includes a timer 60 (FIG. 2) configured to measure a time lag elapsed from receipt of one of the first signal CS1 and the second signal CS2 to receipt of the other of the first signal CS1 and the second signal CS2.

As seen in FIGS. 8 to 13, the controller 14 generates the third signal CS3 having a third width W3 corresponding to a time T3 during which both the first switch SW1 and the second switch SW2 are operated concurrently. In this embodiment, the controller 14 generates the third signal CS3 having the third width W3 corresponding to the time T3 during which the controller 14 receives both the first signal CS1 and the second signal CS2. However, the third width W3 of the third signal CS3 can be constant regardless of the time T3.

As seen in FIGS. 8 and 9, the controller 14 generates the fourth signal CS4 having a fourth width W4 (a predetermined pulse width) which is constant regardless of a time T4 from a release of the first switch SW1 to a release of the second switch SW2. In this embodiment, the pulse width W41 corresponds to a time T41 from a timing at which the operation time lag TL0 elapses to the end of the second signal CS2. In a case where the operation time lag TL0 is zero, the time T41 is equal to the time T4.

As seen in FIGS. 11 and 12, the controller 14 generates the fifth signal CS5 having a fifth width W5 which is constant regardless of a time T5 from a timing at which the second switch SW2 is released in the state where the first switch SW1 is operated continuously after the concurrent operation to a timing at which the first switch SW1 is released after the second switch SW2 is released. In other words, the fifth signal CS5 has the fifth width W5 relating to the time T5 from a timing at which the controller 14 detects an end of the second signal CS2 to a timing at which the controller 14 detects an end of the first signal CS1. However, the fifth width W5 of the fifth signal CS5 can relate to the time T5.

As seen in FIGS. 14 and 15, the upshift command signal US has a constant width regardless of the time T1. The downshift command signal DS has a constant width regardless of the time T2. However, the upshift command signal US can have a pulse width corresponding to the time T1. The downshift command signal DS can have a pulse width corresponding to the time T2.

Figure 16:
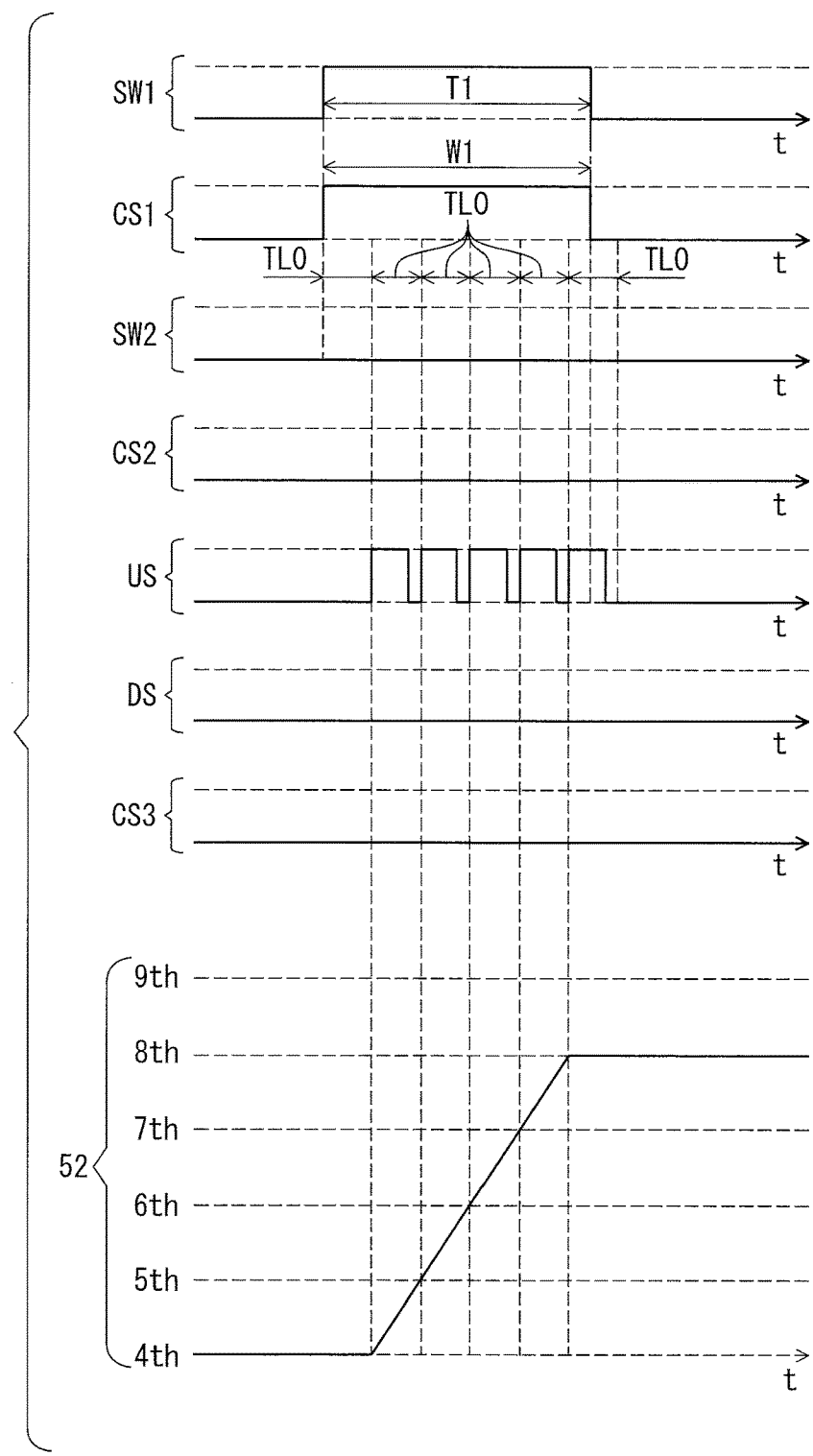

As seen in FIG. 16, the controller 14 continuously generates the upshift command signals US while the first switch SW1 is held down (i.e., long press). The controller 14 continuously generates the upshift command signals US in accordance with the time T1. The controller 14 generates the upshift command signal US each time the operation time lag TL0 elapses while the first switch SW1 is held down. The electrical rear derailleur 52 continuously upshifts in response to the upshift command signals US continuously transmitted from the controller 14.

Figure 17:
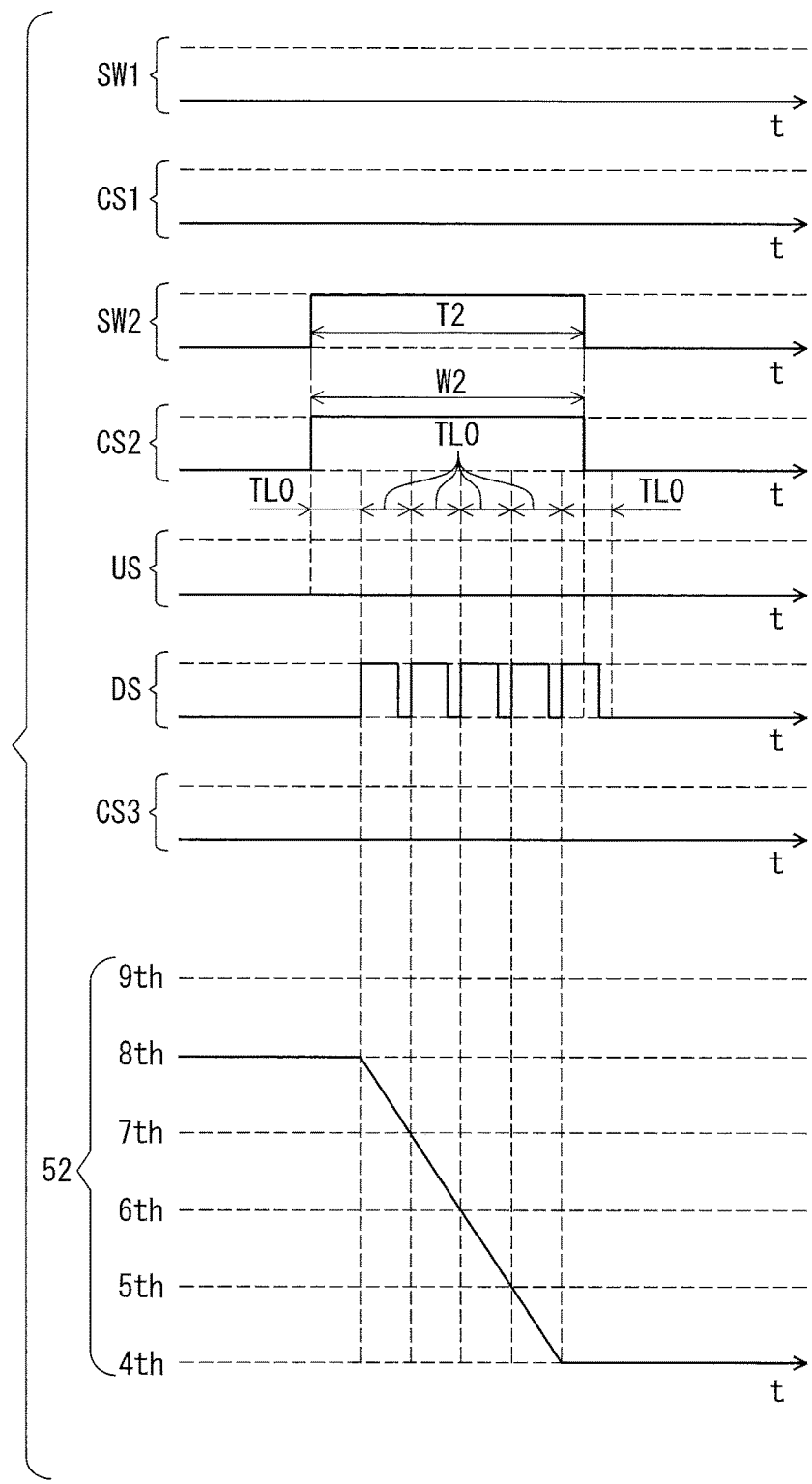

As seen in FIG. 17, the controller 14 continuously generates the downshift command signals DS while the second switch SW2 is held down (i.e., long press). The controller 14 continuously generates the downshift command signals DS in accordance with the time T2. The controller 14 generates the downshift command signal DS each time the operation time lag TL0 elapses while the second switch SW2 is held down. The electrical rear derailleur 52 continuously downshifts in response to the downshift command signals DS continuously transmitted from the controller 14.

The operation of the electrical bicycle operating system 12 will be described in detail below referring to FIGS. 18 to 21.

Figure 18:
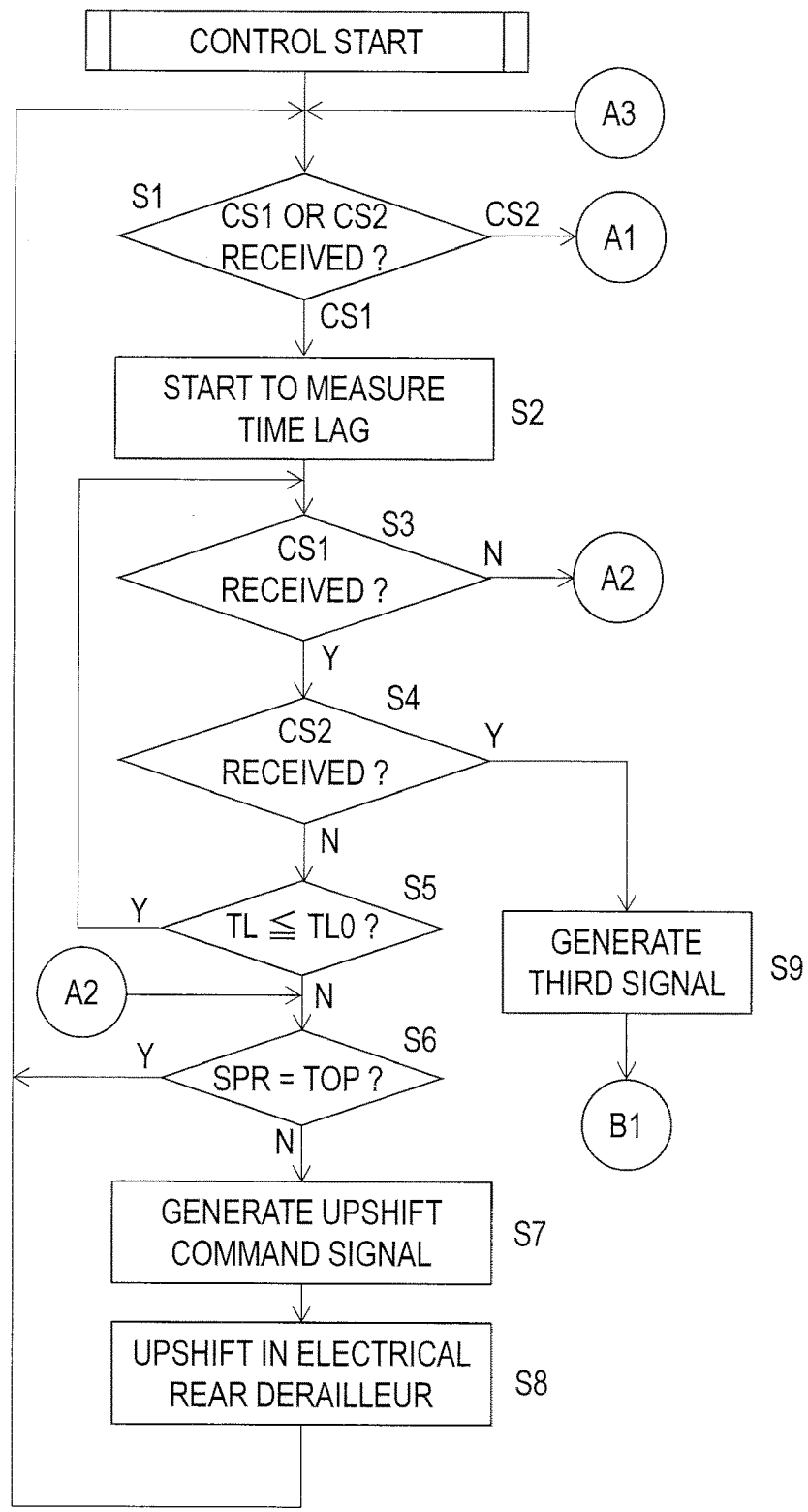
FIGS. 18 to 21 are flow charts of operation of the electrical bicycle operating system illustrated in FIG. 2.

As seen in FIG. 18, the controller 14 determines whether one of the first signal CS1 and the second signal CS2 is received by the controller 14 (step S1). When the controller 14 concludes that the first signal CS1 is received, the controller 14 (the timer 60) starts to measure the time lag TL occurring between receipt of the first signal CS1 and receipt of the second signal CS2 (steps S1 and S2).

Next, the controller 14 determines whether each of the first signal CS1 and the second signal CS2 is received by the controller 14 (steps S3 and S4). When the controller 14 concludes that the first signal CS1 has not been received by the controller 14, the controller 14 determines whether the shift position of the electrical rear derailleur 52 is the top gear position (steps S3 and S6).

The process returns to the step S1 when the controller 14 concludes that the shift position of the electrical rear derailleur 52 is the top gear position (step S6). The upshift command signal US is output from the controller 14 to the electrical rear derailleur 52 when the controller 14 concludes that the shift position is not the top gear position (steps S6 and S7). The electrical rear derailleur 52 upshifts in response to the upshift command signal US (step S8). The process returns to the step S1.

When the controller 14 concludes that the first signal CS1 is received by the controller 14, the controller 14 determines whether the second signal CS2 is received by the controller 14. When the controller 14 concludes that the second signal CS2 is not received by the controller 14, the controller 14 compares the time lag TL with the operation time lag TL0 (steps S4 and S5). When the time lag TL is equal to or shorter than the operation time lag TL0, the steps S3 and S4 are repeatedly executed.

When the time lag TL is longer than the operation time lag TL0, the controller 14 concludes that the second signal CS2 is not received by the controller 14 within the operation time lag TL0 from the receipt of the first signal CS1. Thus, the steps S6 to S8 are executed to perform upshifting in the electrical rear derailleur 52 (steps S6 to S8).

When the controller 14 concludes that the second signal CS2 is received by the controller 14 within the operation time lag TL0 from the receipt of the first signal CS1, the third signal CS3 is output from the controller 14 to the electrical height adjustable seatpost 16 (steps S4 and S9).

In this embodiment, as seen in FIGS. 8 and 9, the third signal CS3 has the third width W3 corresponding to the time T3 during which the controller 14 receives both the first signal CS1 and the second signal CS2. The electrical actuation unit 39 of the electrical height adjustable seatpost 16 moves the flow control part 30 relative to the second tube 22 from the closed position P11 to the open position P12 in response to the third signal CS3. The electrical actuation unit 39 keeps the flow control part 30 at the open position P12 while the electrical actuation unit 39 keeps receiving the third signal CS3 from the controller 14. Thus, the position of the saddle B3 can be changed using the electrical height adjustable seatpost 16 while receiving the third signal CS3 from the controller 14.

Figure 19:
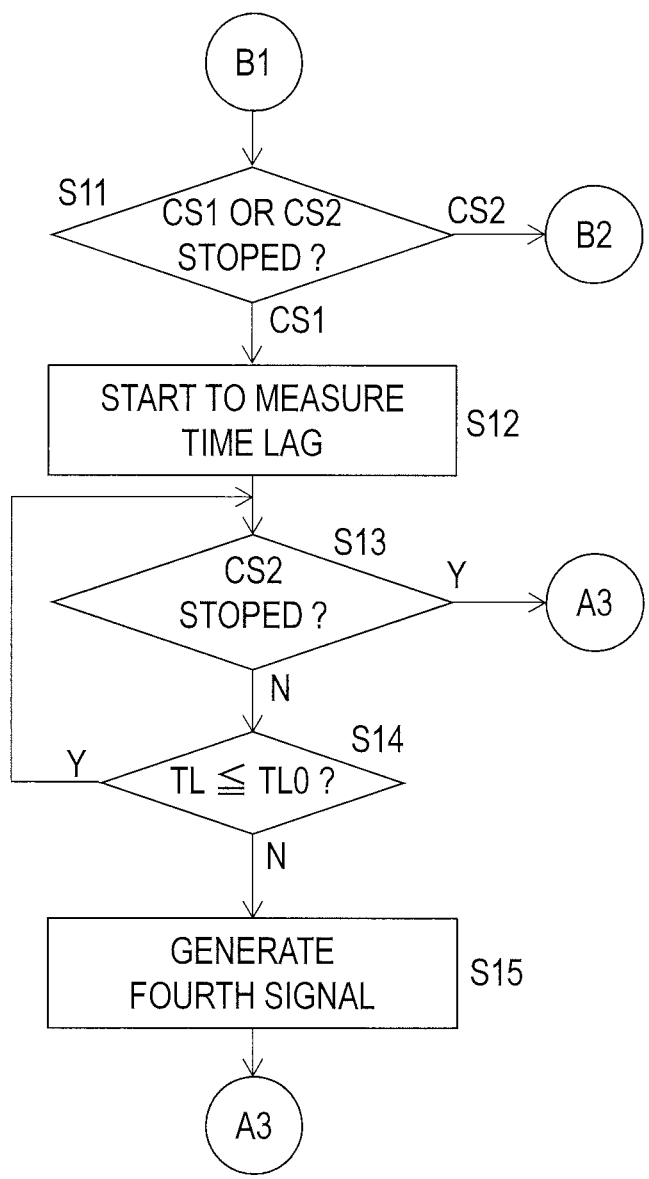

As seen in FIG. 19, after the step S9, the controller 14 determines whether one of the first signal CS1 and the second signal CS2 is stopped by the operating device OD after the controller 14 generates the third signal CS3 (step S11). When the controller 14 concludes that the first signal CS1 is stopped, the controller 14 (the timer 60) starts to measure the time lag TL occurring between an end of the first signal CS1 and an end of the second signal CS2 (steps S11 and S12). The controller 14 determines whether the second signal CS2 is stopped by the second switch SW2 after starting to measure the time lag TL (step S13). When the controller 14 concludes that the second signal CS2 has been stopped by the second switch SW2, the process returns to the step S1 because the first and second switches SW1 and SW2 are concurrently released within the operation time lag TL0.

When the controller 14 concludes that the second signal CS2 is not stopped by the second operating device OD2, the controller 14 compares the time lag TL with the operation time lag TL0 (steps S13 and S14). When the time lag TL is equal to or shorter than the operation time lag TL0, the steps S13 and S14 are repeatedly executed.

When the time lag TL is longer than the operation time lag TL0, the controller 14 concludes that the second signal CS2 is not stopped by the second operating device OD2 within the operation time lag TL0 from the end of the first signal CS1 (steps S14 and S15). Thus, the controller 14 generates the fourth signal CS4 to change the state of the electrical suspension FS between the lockout state and the unlocked state (FIGS. 6 and 7). The process returns to the step S1.

Figure 20:
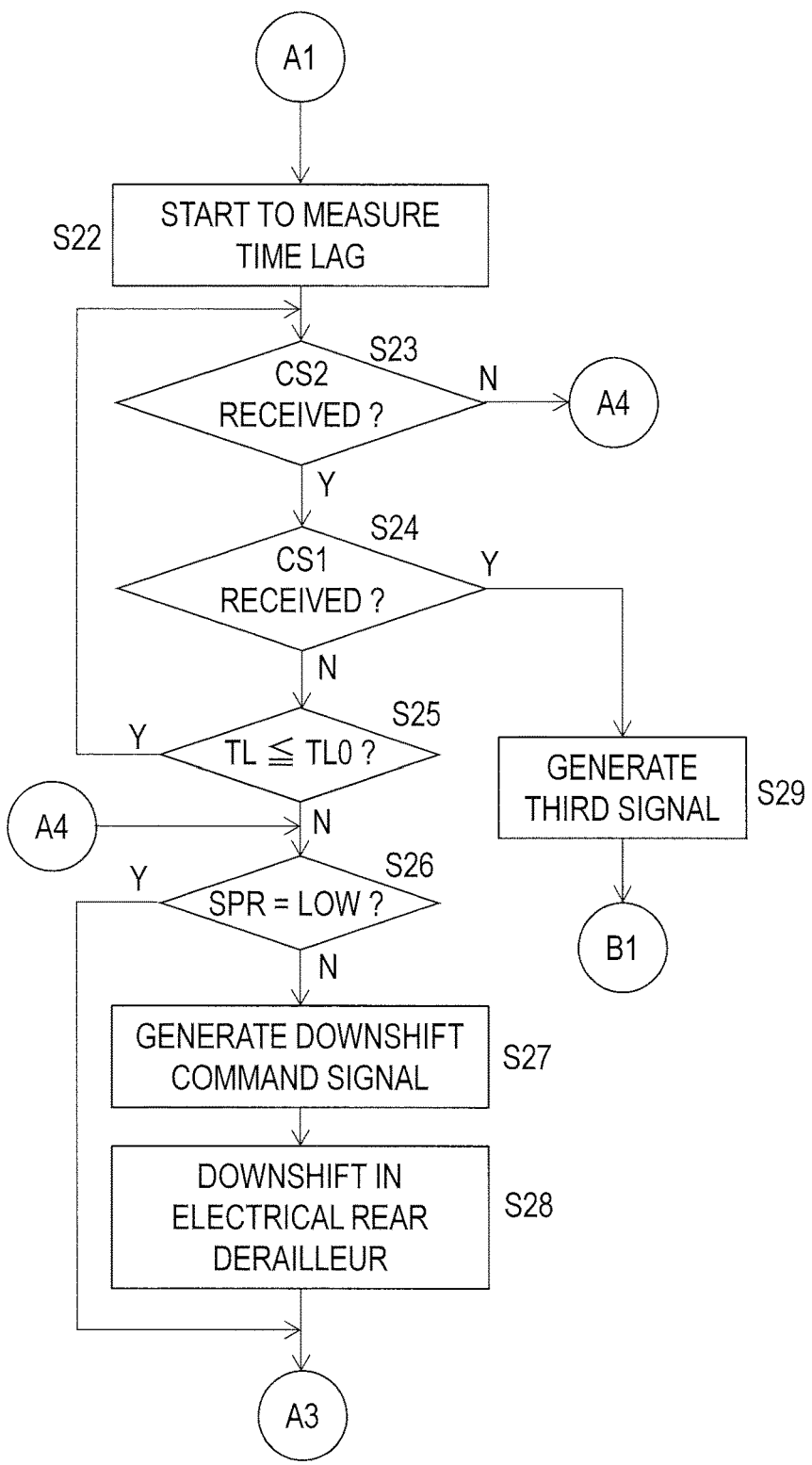

As seen in FIG. 20, when the controller 14 concludes that the second signal CS2 is received, the controller 14 (the timer 60) starts to measure the time lag TL occurring between receipt of the second signal CS2 and receipt of the first signal CS1 (steps S1 and S22).

Next, the controller 14 determines whether each of the first signal CS1 and the second signal CS2 is received by the controller 14 (steps S23 and S24). When the controller 14 concludes that the second signal CS2 has not been received by the controller 14, the controller 14 determines whether the shift position of the electrical rear derailleur 52 is the low gear position (steps S23 and S26).

The process returns to the step S1 when the controller 14 concludes that the shift position of the electrical rear derailleur 52 is the low gear position (step S26). The upshift command signal US is output from the controller 14 to the electrical rear derailleur 52 when the controller 14 concludes that the shift position is not the low gear position (steps S26 and S27). The electrical rear derailleur 52 downshifts in response to the upshift command signal US (step S28). The process returns to the step S1.

When the controller 14 concludes that the second signal CS2 is received by the controller 14, the controller 14 determines whether the first signal CS1 is received by the controller 14. When the controller 14 concludes that the first signal CS1 is not received by the controller 14, the controller 14 compares the time lag TL with the operation time lag TL0 (steps S24 and S25). When the time lag TL is equal to or shorter than the operation time lag TL0, the steps S13 and S14 are repeatedly executed.

When the time lag TL is longer than the operation time lag TL0, the controller 14 concludes that the first signal CS1 is not received by the controller 14 within the operation time lag TL0 from the receipt of the second signal CS2. Thus, the steps S26 to S28 are executed to perform downshifting in the electrical rear derailleur 52 (steps S26 to S28).

When the controller 14 concludes that the first signal CS1 is received by the controller 14 within the operation time lag TL0 from the receipt of the second signal CS2, the third signal CS3 is output from the controller 14 to the electrical height adjustable seatpost 16 (steps S24 and S29).

Figure 21:
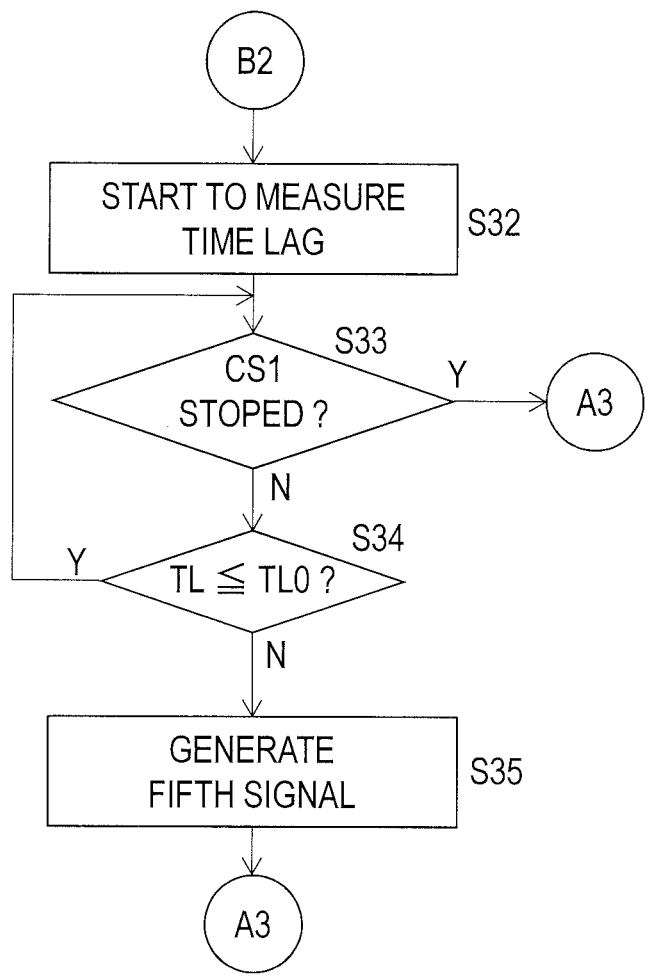

As seen in FIG. 21, when the controller 14 concludes that the second signal CS2 is stopped in the step S11 (FIG. 19), the controller 14 (the timer 60) starts to measure the time lag TL occurring between an end of the second signal CS2 and an end of the first signal CS1 (steps S11 and S32). The controller 14 determines whether the first signal CS1 is stopped by the first operating device OD1 after starting to measure the time lag TL (step S33). When the controller 14 concludes that the second signal CS2 has been stopped by the second operating device OD2, the process returns to the step S1 because the first and second switches SW1 and SW2 are concurrently released within the operation time lag TL0.

When the controller 14 concludes that the first signal CS1 is not stopped by the first operating device OD1, the controller 14 compares the time lag TL with the operation time lag TL0 (steps S33 and S34). When the time lag TL is equal to or shorter than the operation time lag TL0, the steps S33 and S34 are repeatedly executed.

When the time lag TL is longer than the operation time lag TL0, the controller 14 concludes that the first signal CS1 is not stopped by the first operating device OD1 within the operation time lag TL0 from the end of the second signal CS2 (steps S34 and S35). Thus, the controller 14 generates the fifth signal CS5 to change the state of the electrical suspension FS between the short-stroke state and the long-stroke state (FIGS. 10 and 11). The process returns to the step S1.

First Modification

Figure 22:
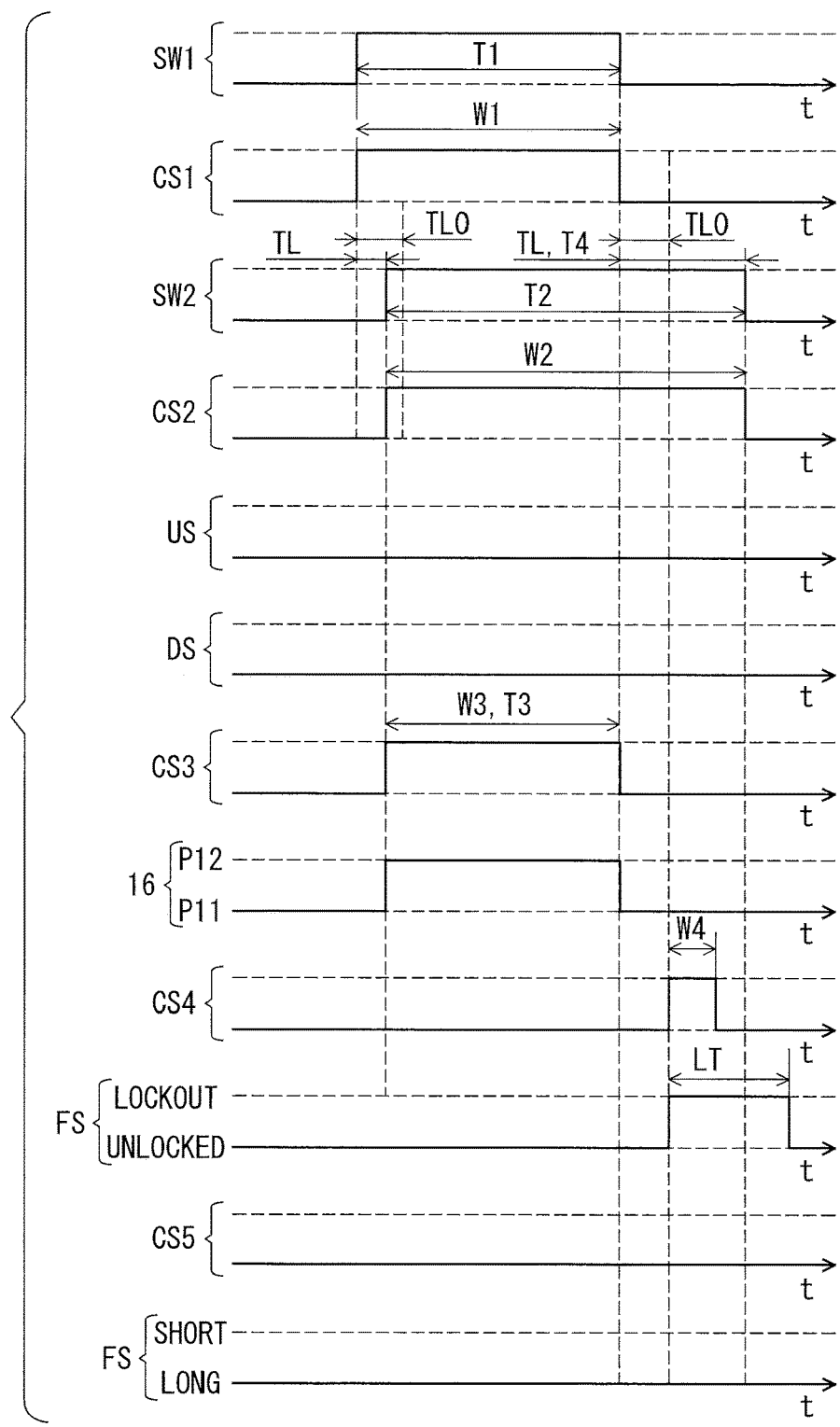
FIG. 22 is a timing chart of operation of the electrical bicycle operating system in accordance with a first modification of the first embodiment.

As seen in FIG. 22, the fourth signal CS4 can be indicative of changing a state of the electrical suspension FS from the unlocked state to the lockout state for a lockout time LT regardless of the pulse width of the fourth signal CS4. The lock actuator driver FS11 changes the state of the electrical suspension FS from the unlocked state to the lockout state in response to the fourth signal CS4 and keeps the lockout state for the lockout time LT. The lock actuator driver FS11 automatically returns the state of the electrical suspension FS from the lockout state to the unlocked state after a lapse of the lockout time LT. The lockout time LT is, for example, less than or equal to three seconds.

Second Modification

Figure 23:
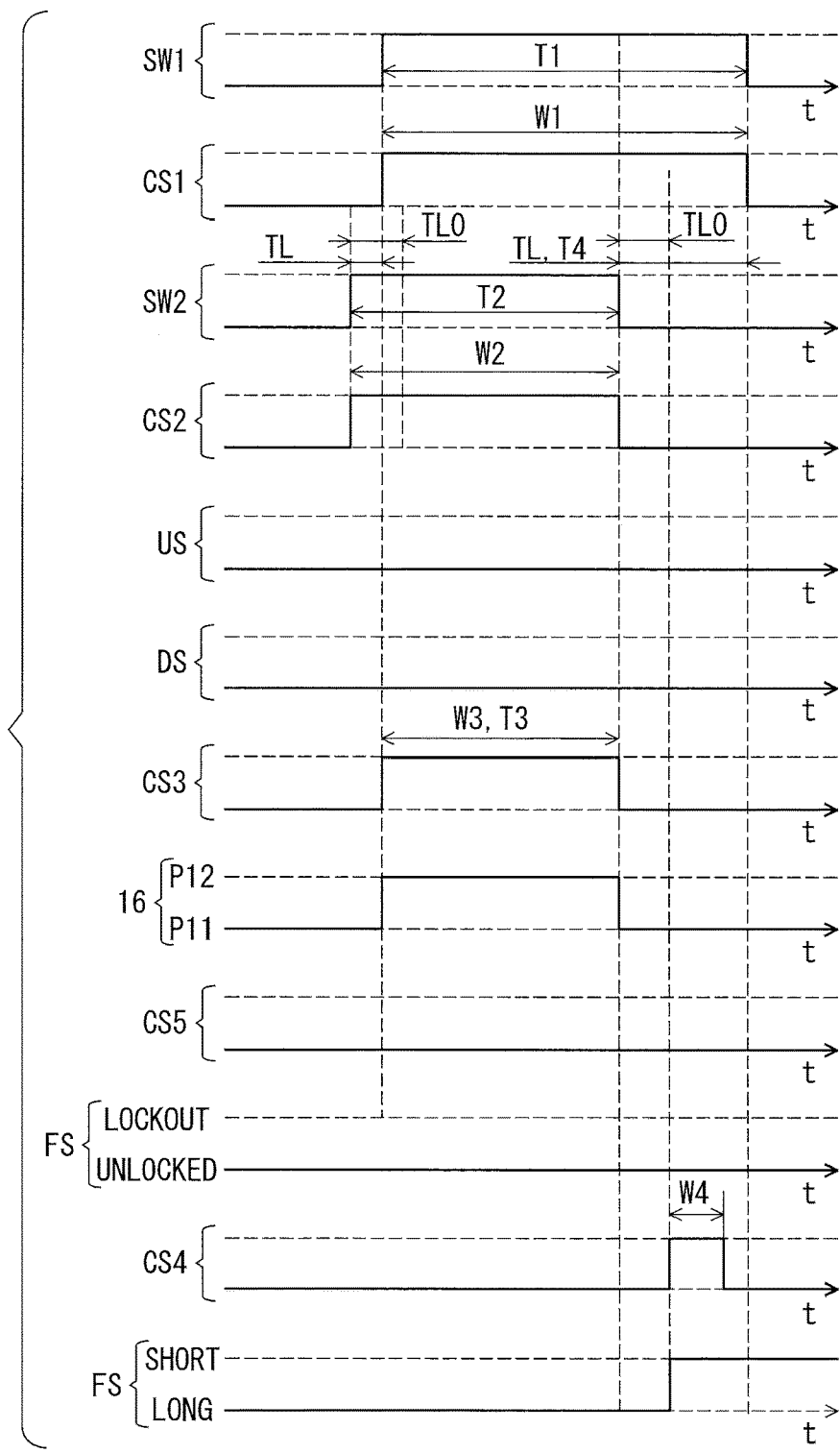
FIGS. 23 and 24 are timing charts of operation of the electrical bicycle operating system in accordance with a second modification of the first embodiment.

As seen in FIG. 23, the fourth signal CS4 can be indicative of changing the stroke of the electrical suspension FS between the long-stroke state and the short-stroke state. The stroke actuator driver FS15 alternately switches the state of the electrical suspension FS between the long-stroke state and the short-stroke state in response to the fourth signal CS4.

Figure 24:
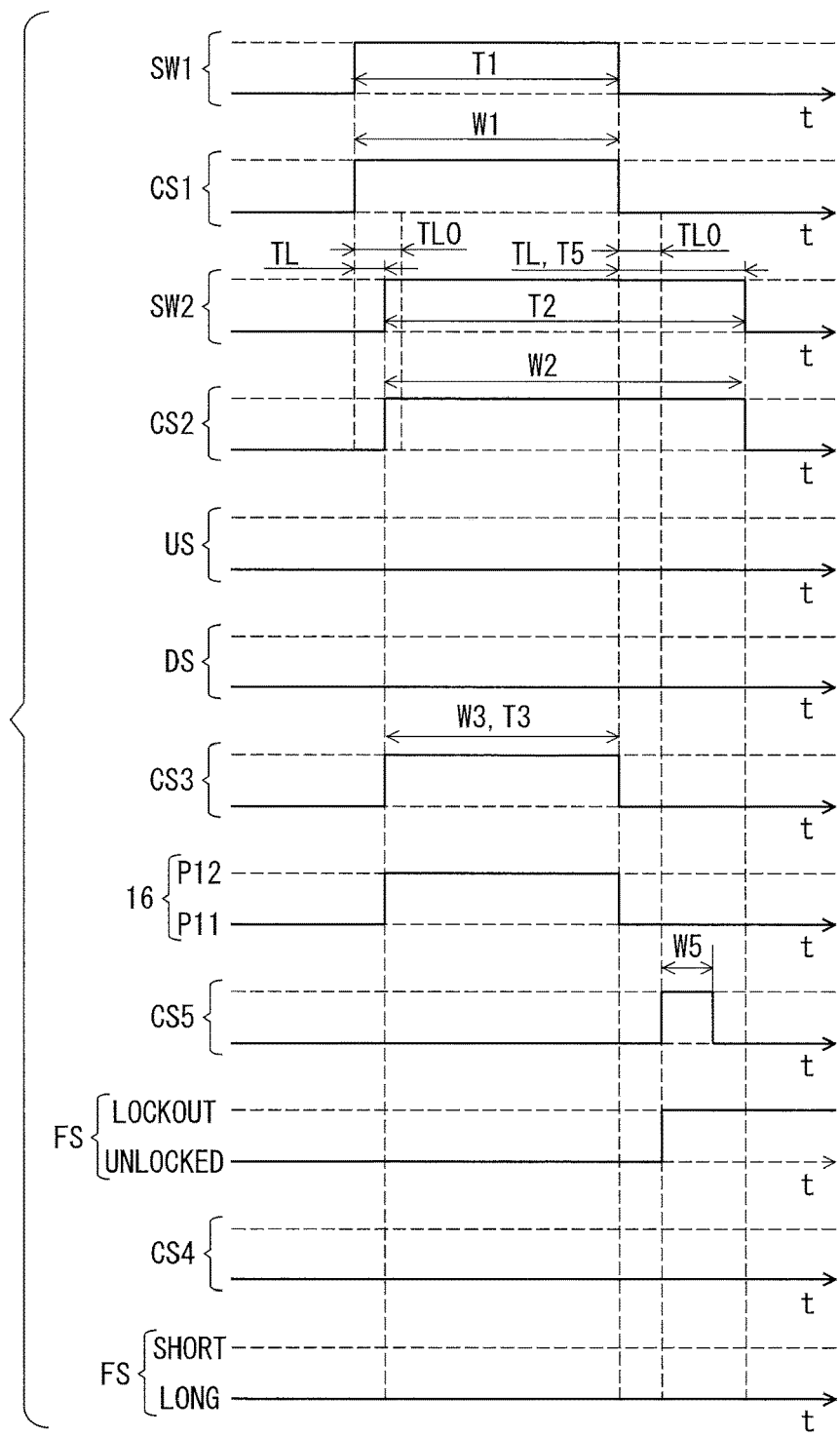

As seen in FIG. 24, the fifth signal CS5 can be indicative of changing the state of the electrical suspension FS between the lockout state and the unlocked state. The lock actuator driver FS11 alternately switches the unlocked state and the lockout state in response to the fifth signal CS5.

Second Embodiment

An electrical bicycle operating system 212 in accordance with a second embodiment will be described below referring to FIGS. 25 to 28. The electrical bicycle operating system 212 has the same structure and/or configuration as those of the electrical bicycle operating system 12 except for the controller. Thus, elements having substantially the same function as those in the first embodiment will be numbered the same here, and will not be described and/or illustrated again in detail here for the sake of brevity.

Figure 25:
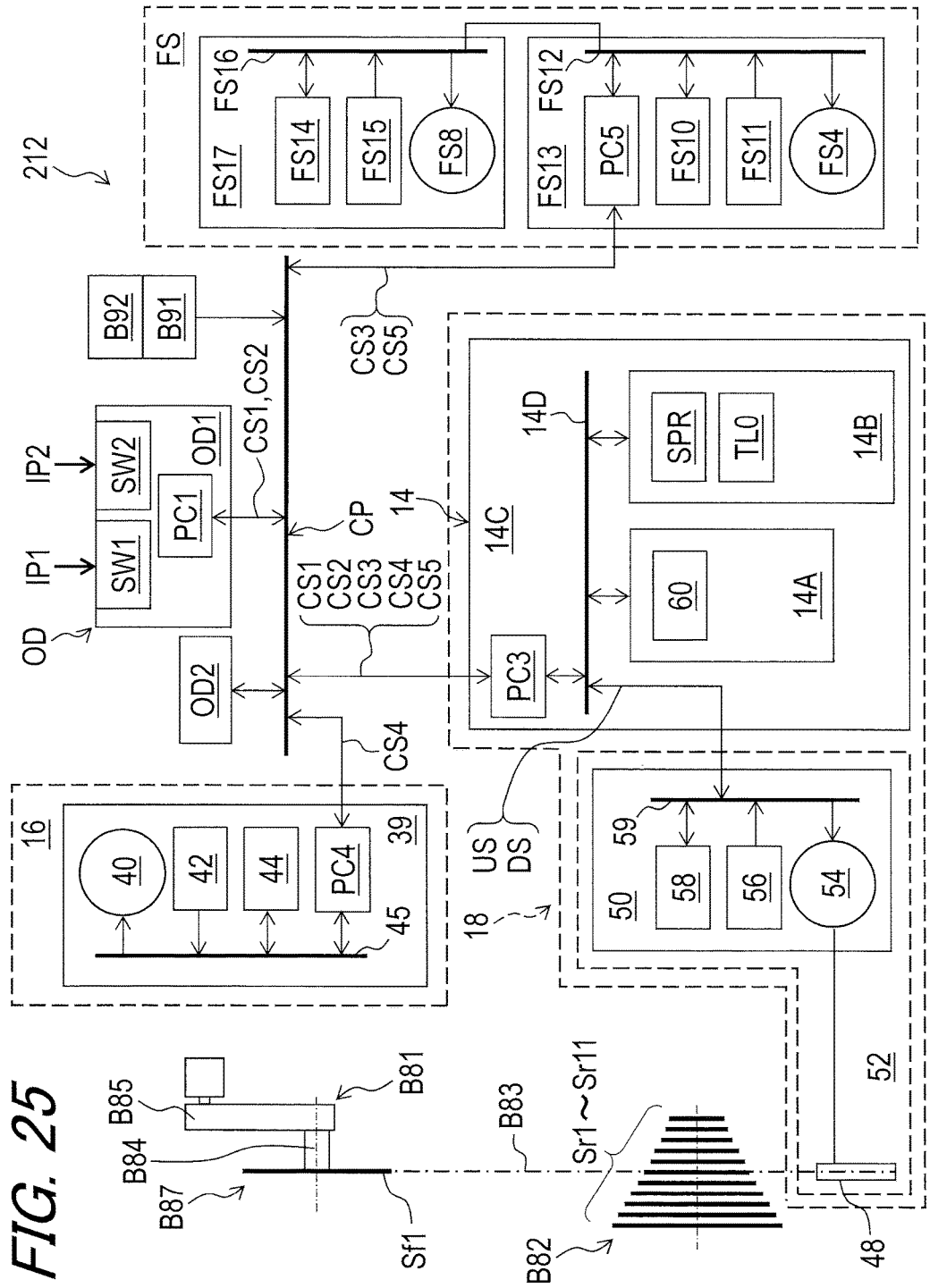
FIG. 25 is a block diagram of an electrical bicycle operating system in accordance with a second embodiment.

As seen in FIG. 25, the electrical bicycle operating system 212 has substantially the same structure and/or configuration as that of the first embodiment.

Figure 26:
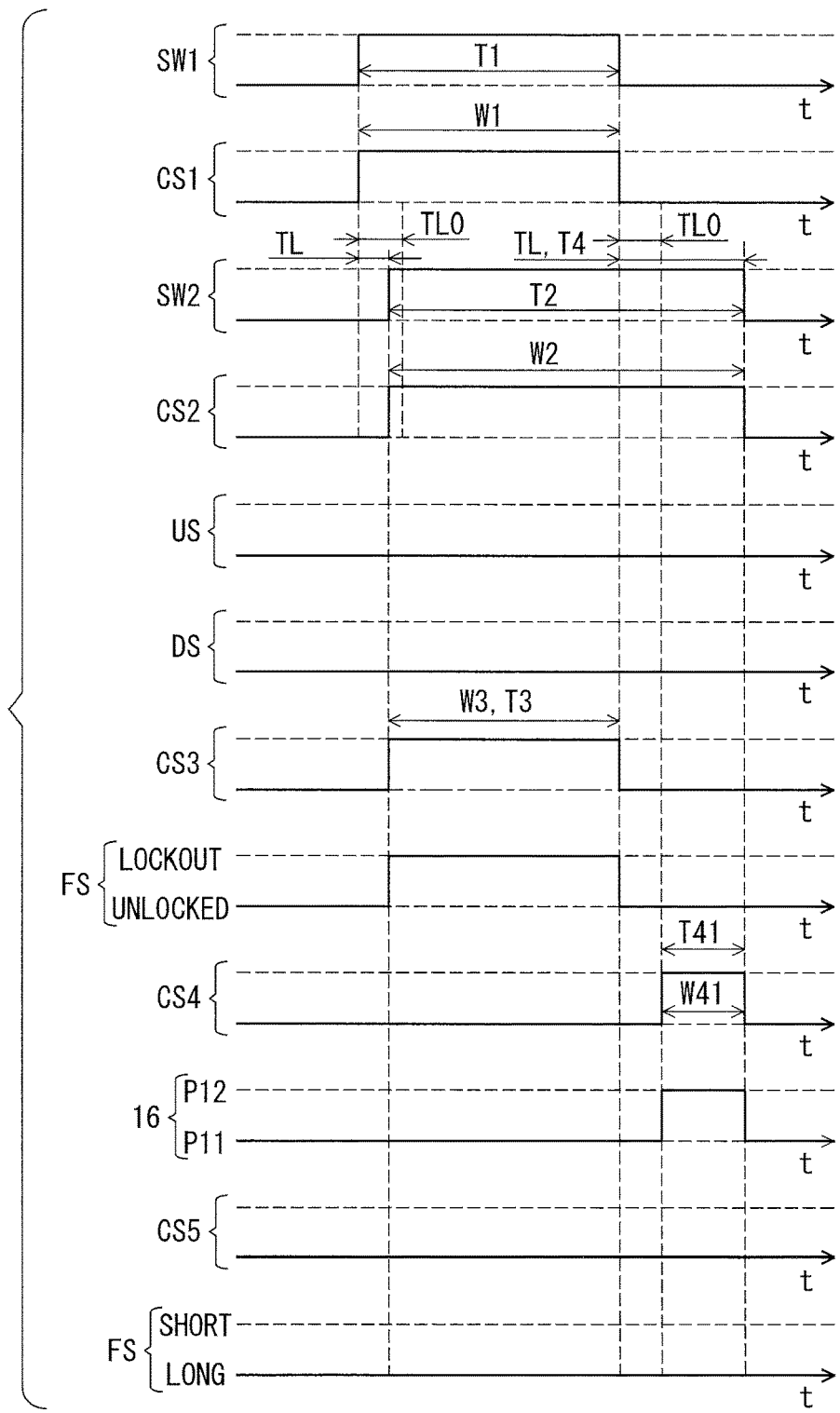
FIGS. 26 to 28 are a timing charts of operation of the electrical bicycle operating system illustrated in FIG. 25.
Figure 27:
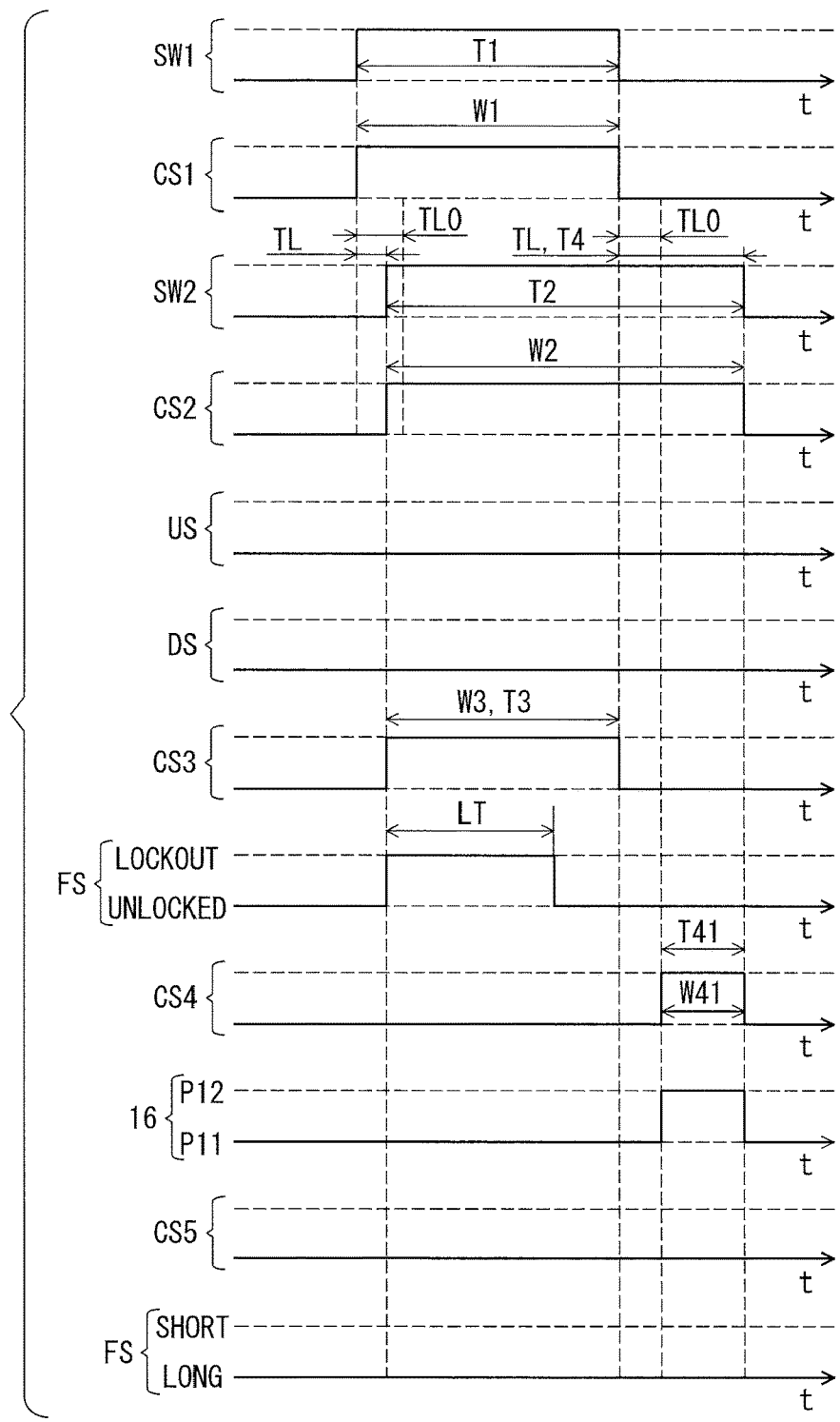

As seen in FIG. 26, the third signal CS3 is indicative of operating the electrical suspension FS. The third signal CS3 is indicative of changing the state of the electrical suspension FS between the unlocked state and the lockout state. The lock actuator driver FS11 alternately switches the state of the electrical suspension FS between the unlocked state and the lockout state in response to the third signal CS3. As seen in FIG. 27, however, the lock actuator driver FS11 can be configured to change the state of the electrical suspension FS from the unlocked state to the lockout state for the lockout time LT in response to the third signal CS3 regardless of the third width W3 of the third signal CS3. The lock actuator driver FS11 is configured to automatically return the state of the electrical suspension FS to the unlocked state after a lapse of the lockout time LT. The lockout time LT is, for example, less than or equal to three seconds. The third signal CS3 can be indicative of changing the state of the electrical suspension FS between the long-stroke state and the short-stroke state.

The controller 14 is configured to generate the fourth signal CS4 to operate the electrical height adjustable seatpost 16. The fourth signal CS4 is indicative of operating the electrical height adjustable seatpost 16. The fourth signal CS4 has a pulse width W41 relating to the time T4 from a release of the first switch SW1 to a release of the second switch SW2. The actuator driver 44 changes the state of the electrical height adjustable seatpost 16 from the positioning state to the adjustable state and keeps the adjustable state for a time T41 which is substantially the same as the time T4. The actuator driver 44 returns the state of the electrical height adjustable seatpost 16 from the adjustable state to the positioning state after a lapse of the time T41.

In this embodiment, the pulse width W41 corresponds to the time T41 from a timing at which the operation time lag TL0 elapses to the end of the second signal CS2. The operation time lag TL0 is a difference between the time T4 and the time T41. In a case where the operation time lag TL0 is zero, the time T41 is equal to the time T4. This allows the user to change a time during which the adjustable state is maintained in the electrical bicycle operating system 212.

For example, the actuator driver 44 controls the valve actuator 40 to keep the flow control part 30 at the closed position P11 (FIG. 5) while the actuator driver 44 does not receive the fourth signal CS4. The actuator driver 44 controls the valve actuator 40 to move the flow control part 30 from the closed position P11 (FIG. 5) to the open position P12 (FIG. 5) when the actuator driver 44 receives the fourth signal CS4. The actuator driver 44 controls the valve actuator 40 to keep the flow control part 30 at the open position P12 while the actuator driver 44 keeps receiving the fourth signal CS4. The actuator driver 44 controls the valve actuator 40 to return the flow control part 30 from the open position P12 to the closed position P11 when the actuator driver 44 detects an end of the fourth signal CS4.

Figure 28:
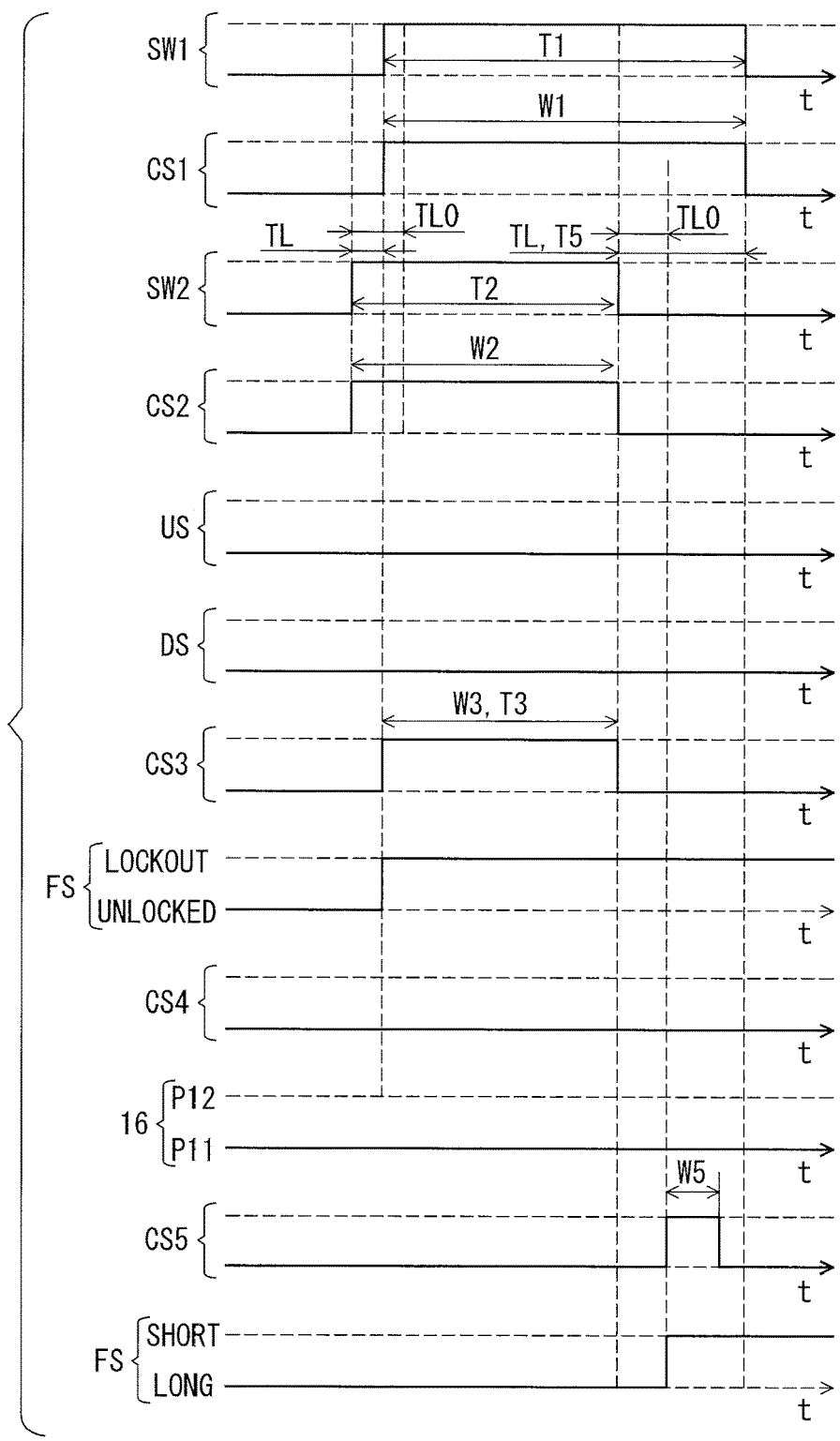

As seen in FIG. 28, the fifth signal CS5 is indicative of changing the state of the electrical suspension FS between the long-stroke state and the short-stroke state. The stroke actuator driver FS15 alternately switches the state of the electrical suspension FS between the long-stroke state and the short-stroke state in response to the fifth signal CS5. In this modification, the controller 14 can be configured not to generate at least one of the forth signal CS4 and the fifth signal CS5.

First Modification

Figure 29:
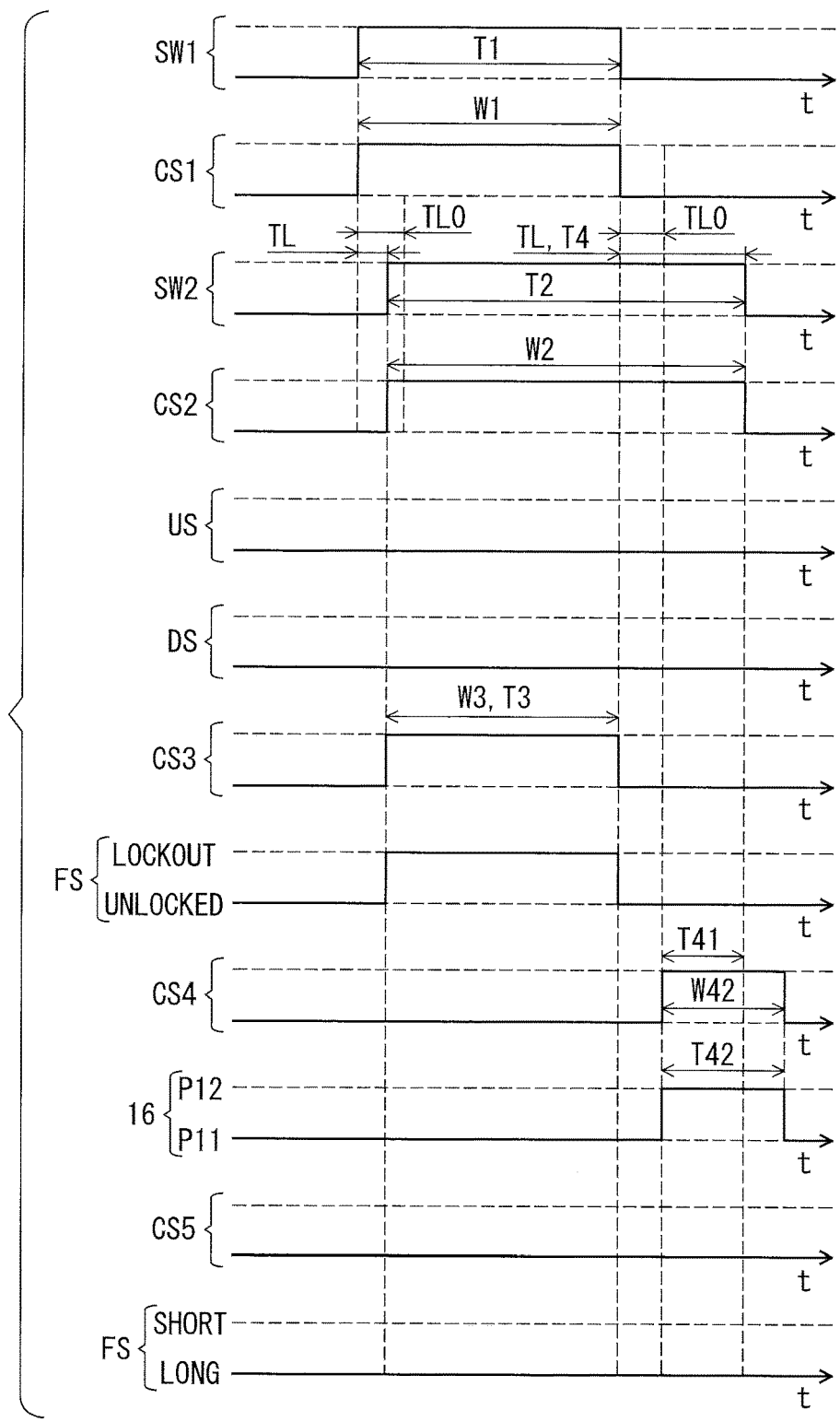
FIG. 29 is a timing chart of operation of the electrical bicycle operating system in accordance with a first modification of the second embodiment.

As seen in FIG. 29, the fourth signal CS4 can have a predetermined pulse width W42 regardless of the time T4 from a release of the first switch SW1 to a release of the second switch SW2. The actuator driver 44 changes the state of the electrical height adjustable seatpost 16 from the positioning state to the adjustable state and keeps the adjustable state for a specific time T42 regardless of the time T4 and the time T41. The specific time T42 has a duration depending on the predetermined pulse width W42. The actuator driver 44 automatically returns the state of the electrical height adjustable seatpost 16 from the adjustable state to the positioning state after a lapse of the specific time T42.

The actuator driver 44 controls the valve actuator 40 to keep the flow control part 30 at the closed position P11 while the actuator driver 44 does not receive the fourth signal CS4. The actuator driver 44 controls the valve actuator 40 to move the flow control part 30 from the closed position P11 to the open position P12 when the actuator driver 44 receives the fourth signal CS4. The actuator driver 44 controls the valve actuator 40 to keep the flow control part 30 at the open position P12 for a predetermined open time T42 from a timing at which the actuator driver 44 receives the fourth signal CS4. The actuator driver 44 controls the valve actuator 40 to return the flow control part 30 from the open position P12 to the closed position P11 when the predetermined open time T42 elapses (i.e., when the actuator driver 44 detects an end of the fourth signal CS4). In this modification of the second embodiment, the open time (T42) of the valve unit 32 is controlled in accordance with the predetermined pulse width W42. However, the actuator driver 44 can be configured to control the valve actuator 40 to open the valve unit 32 for a predetermined time regardless of the predetermined pulse width W42.

Third Embodiment

An electrical bicycle operating system 312 in accordance with a third embodiment will be described below referring to FIGS. 30 to 33. The electrical bicycle operating system 312 has the same structure and/or configuration as those of the electrical bicycle operating system 12 except for the controller. Thus, elements having substantially the same function as those in the second embodiment will be numbered the same here, and will not be described and/or illustrated again in detail here for the sake of brevity.

Figure 30:
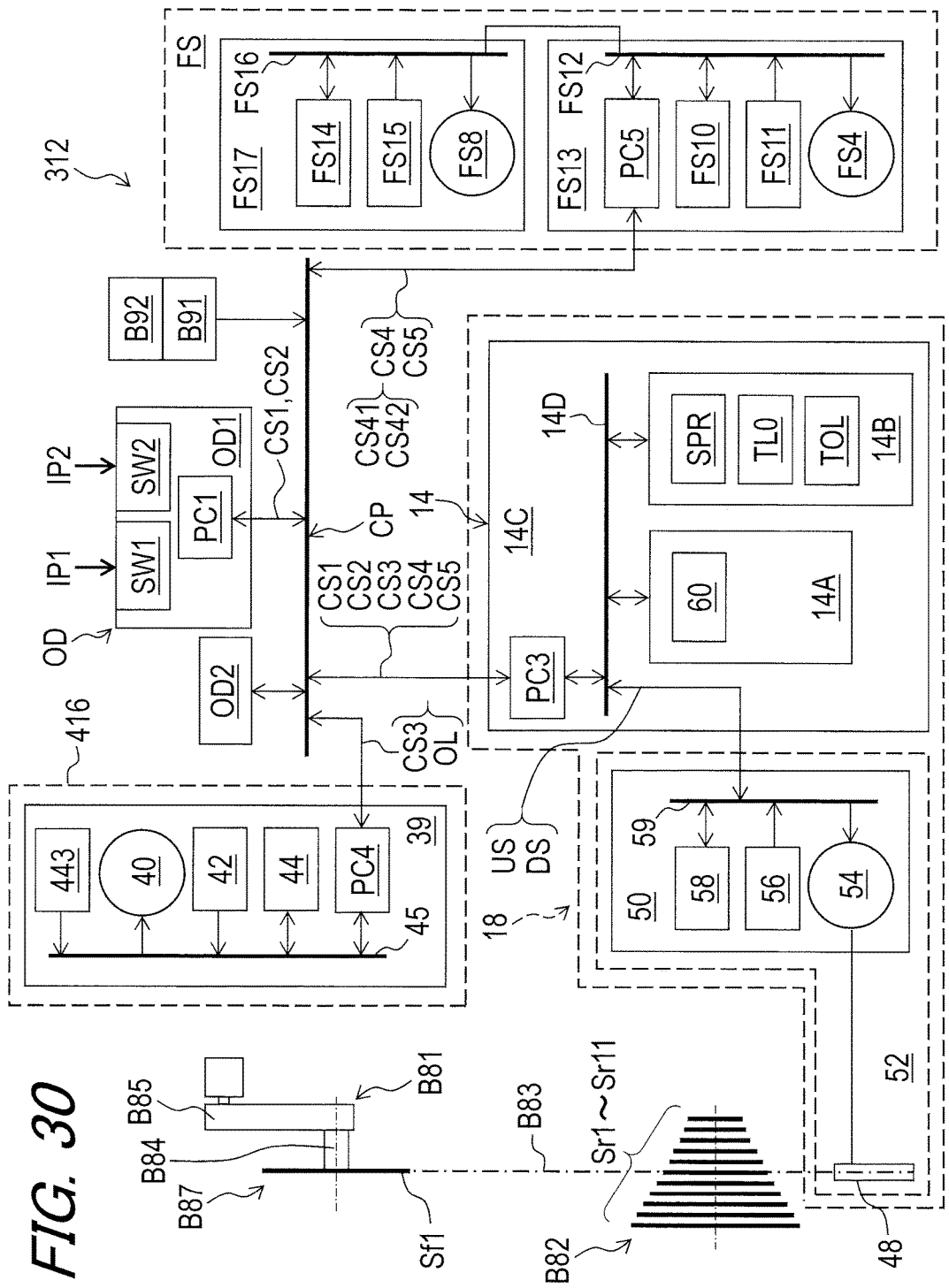
FIG. 30 is a block diagram of an electrical bicycle operating system in accordance with a third embodiment.

As seen in FIG. 30, the electrical bicycle operating system 312 comprises the first switch SW1 to generate the first signal CS1, the second switch SW2 to generate the second signal CS2, and a controller 314. The controller 314 has substantially the same configuration as that of the controller 14 of the first embodiment. The controller 314 is configured to generate the third signal CS3 different from the first signal CS1 and the second signal CS2 in response to the concurrent operation of the first switch SW1 and the second switch SW2. The controller 314 is configured to generate the fourth signal CS4 different from the third signal CS3 in response to a release of the first switch SW1 in a state where the second switch SW2 is operated continuously after the concurrent operation. The controller 314 is configured to generate the fifth signal CS5 in response to a release of the second switch SW2 in a state where the first switch SW1 is operated continuously after the concurrent operation.

In this embodiment, the third signal CS3 is indicative of changing an overall length of an electrical height adjustable seatpost 416. The fourth signal CS4 is indicative of operating the electrical suspension FS based on a changed overall length OL of the electrical height adjustable seatpost 416 in response to receipt of a seatpost length signal CS6 indicative of the changed overall length OL from the electrical height adjustable seatpost 416.

The electrical height adjustable seatpost 416 has substantially the same structure as that of the electrical height adjustable seatpost 16 of the first embodiment. The electrical height adjustable seatpost 416 includes a height sensor 443 configured to sense a relative position between the first tube 20 and the second tube 22 in the telescopic direction D3. Examples of the height sensor 443 include a magnetic position sensor. The height sensor 443 is electrically connected to the fourth PLC controller PC4 with the bus 45. An output of the height sensor 443 is transmitted to the controller 314 as the seatpost length signal CS6 indicative of the changed overall length OL of the electrical height adjustable seatpost 416.

Figure 31:
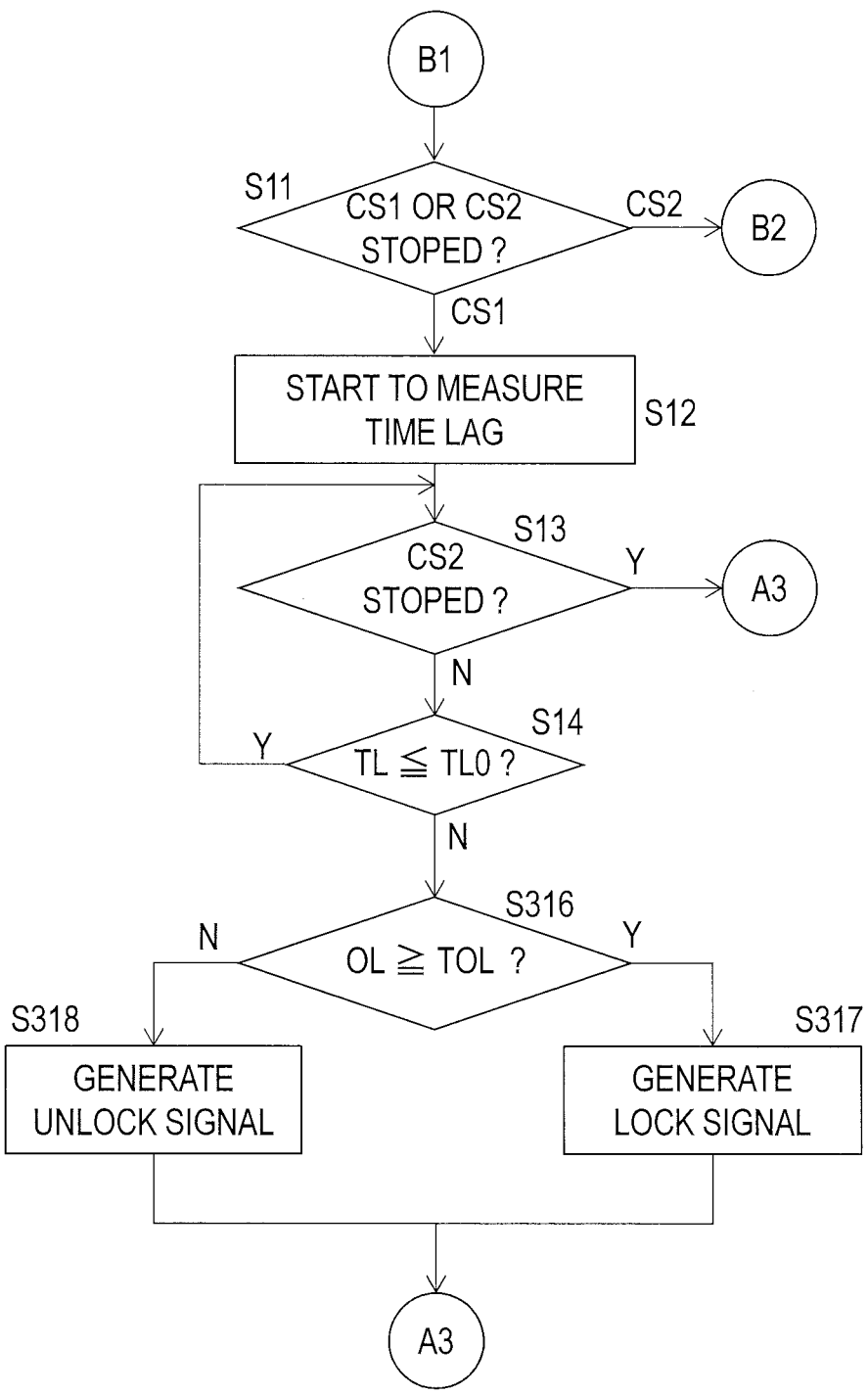
FIG. 31 is a flow chart of operation of the electrical bicycle operating system illustrated in FIG. 30.

The operation of the electrical bicycle operating system 312 will be described in detail below referring to FIGS. 30 to 33. The flow charts shown in FIGS. 18, 20, and 21 can be used for the operation of the electrical bicycle operating system 312, while the flow chart shown in FIG. 19 is replaced with the flow chart shown in FIG. 31. In FIG. 31, the step S15 of FIG. 19 is replaced with steps S316, S317, and S318.

As seen in FIG. 31, after the step S14, the controller 314 is configured to determine whether the changed overall length OL indicated with the seatpost length signal CS6 is equal to or larger than a length threshold TOL stored in the memory 14B. The controller 314 is configured to generate the fourth signal CS4 based on the first signal CS1, the second signal CS2, and the seatpost length signal CS6. The fourth signal CS4 includes a lock signal CS41 and an unlock signal CS42.

Figure 32:
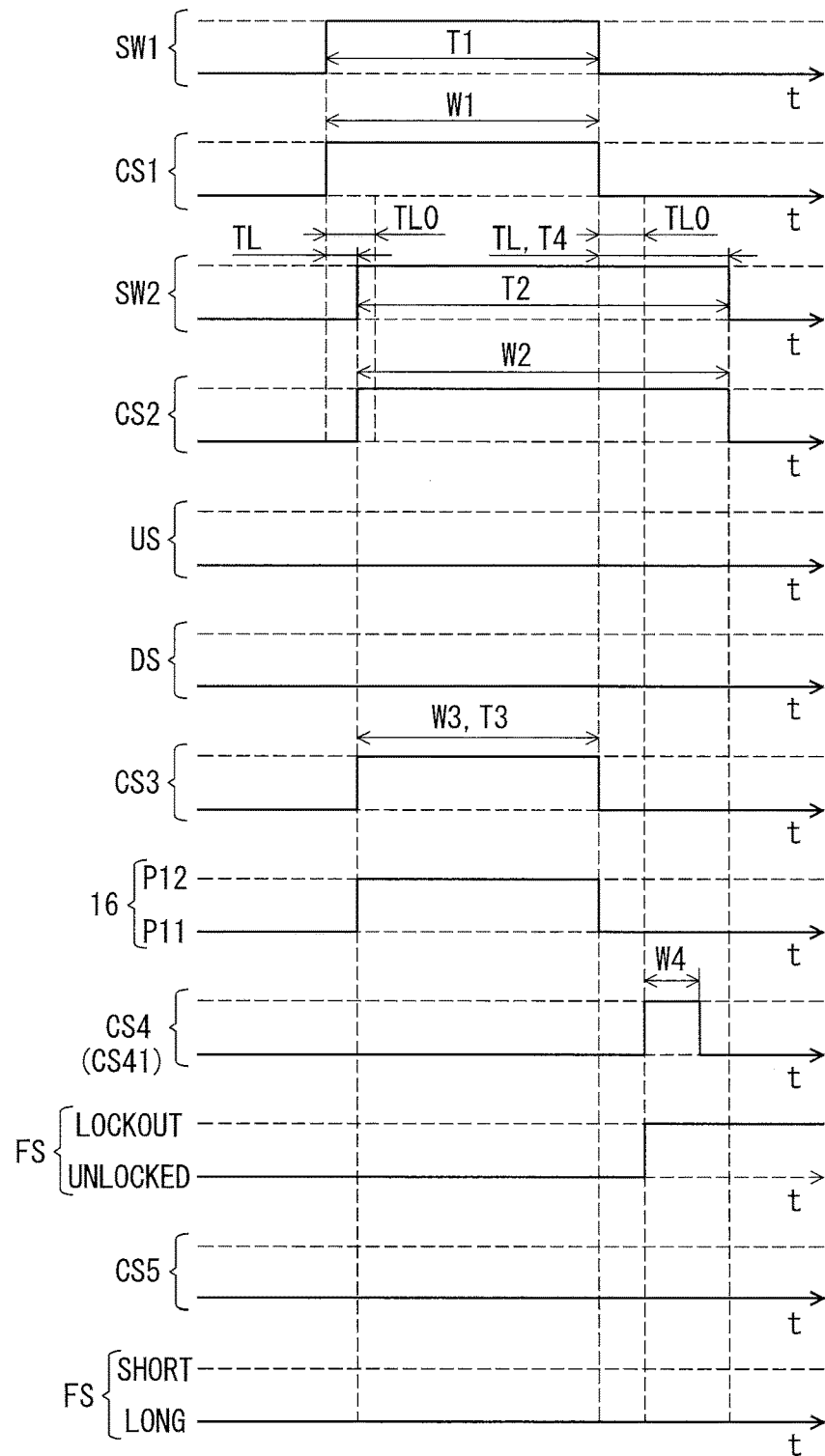
FIGS. 32 and 33 are a timing charts of operation of the electrical bicycle operating system illustrated in FIG. 30.

The controller 314 generates the lock signal CS41 in response to a release of the first switch SW1 in a state where the second switch SW2 is operated continuously after the concurrent operation in a case where the changed overall length OL indicated with the seatpost length signal CS6 is equal to or larger than the length threshold TOL (steps S316 and S317, and FIG. 32). The controller 314 generates the unlock signal CS42 in response to a release of the first switch SW1 in the state where the second switch SW2 is operated continuously after the concurrent operation in a case where the changed overall length OL indicated with the seatpost length signal CS6 is smaller than the length threshold TOL (steps S316 and S317, and FIG. 32).

Figure 33:
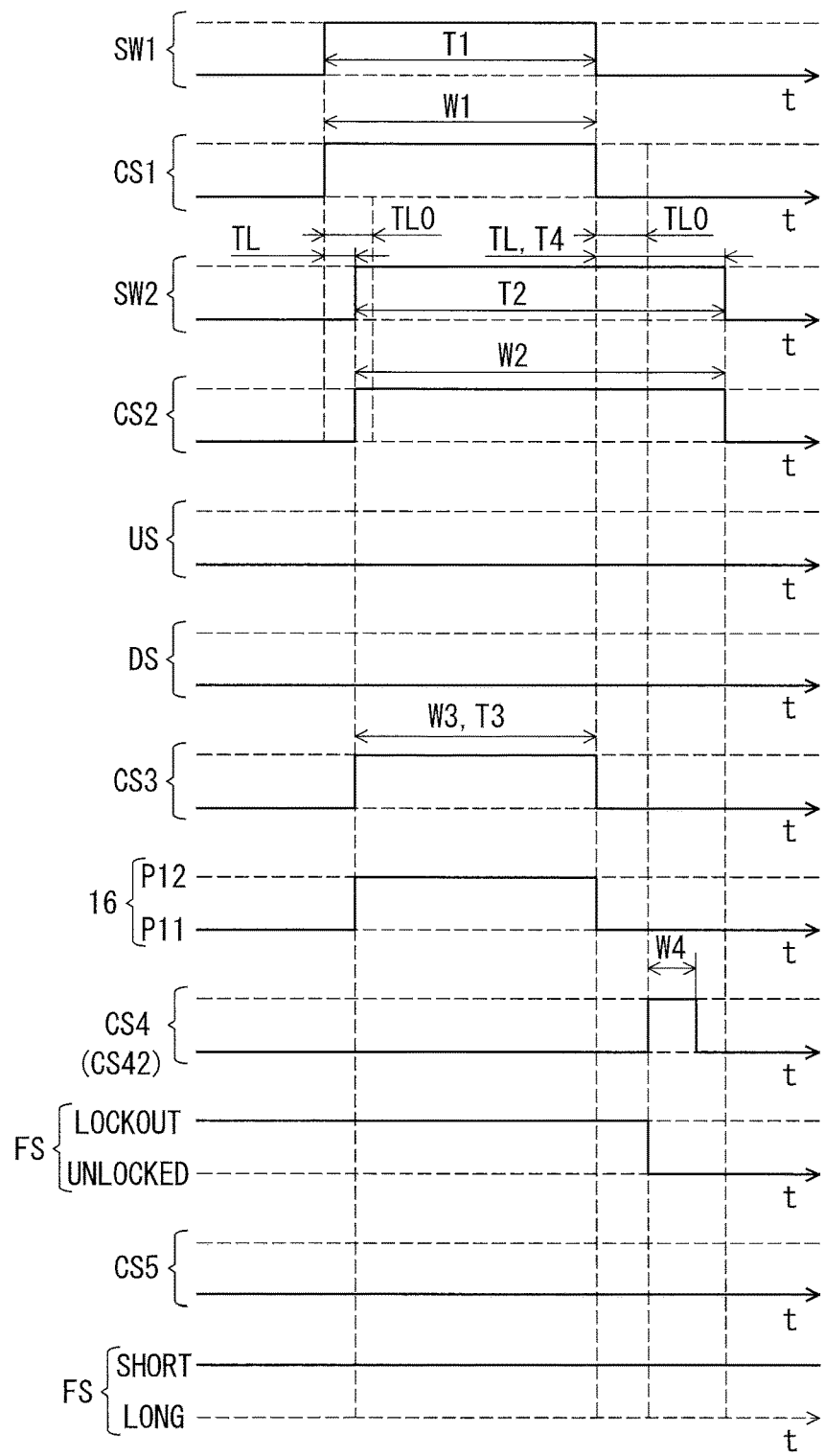

As seen in FIG. 32, the lock actuator driver FS11 controls the lock actuator FS4 to maintain the lockout state or to change the state of the electrical suspension FS to the lockout state in response to the lock signal CS41. As seen in FIG. 33, the lock actuator driver FS11 controls the lock actuator FS4 to maintain the unlocked state or to change the state of the electrical suspension FS to the unlocked state in response to the unlock signal CS42.

The electrical suspension FS (e.g., the lock actuator driver FS11) can be configured to determine whether the changed overall length OL indicated with the seatpost length signal CS6 is smaller than the length threshold TOL. In such an embodiment, the lock actuator driver FS11 controls the lock actuator FS4 when the fourth signal CS4 and the seatpost length signal CS6 are received.

Fourth Embodiment

An electrical bicycle operating system 412 in accordance with a fourth embodiment will be described below referring to FIGS. 34 to 36. The electrical bicycle operating system 412 has the same structure and/or configuration as those of the electrical bicycle operating system 12 except for the controller. Thus, elements having substantially the same function as those in the above embodiments will be numbered the same here, and will not be described and/or illustrated again in detail here for the sake of brevity.

Figure 34:
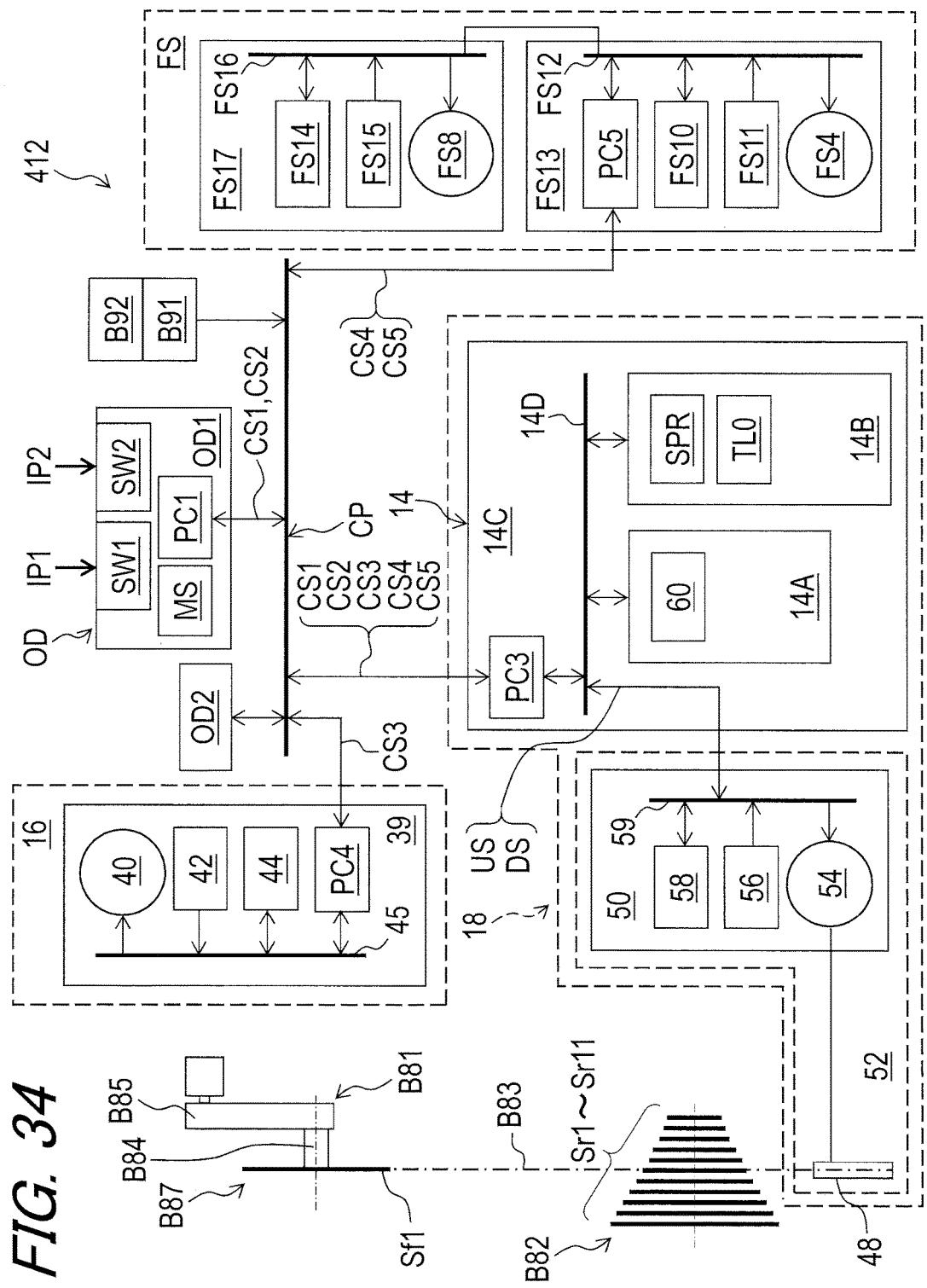
FIG. 34 is a block diagram of an electrical bicycle operating system in accordance with a fourth embodiment.

As seen in FIG. 34, the electrical bicycle operating system 412 comprises the first switch SW1, the second switch SW2, and a controller 414. The controller 414 has substantially the same configuration as that of the controller 14 of the first embodiment. The controller 414 is configured to generate the third signal CS3 different from the first signal CS1 and the second signal CS2 in response to the concurrent operation of the first switch SW1 and the second switch SW2. The controller 414 is configured to generate the fourth signal CS4 different from the third signal CS3 in response to a release of the first switch SW1 in a state where the second switch SW2 is operated continuously after the concurrent operation.

The controller 414 is configured to generate the operation signal CS3 to operate one of the electrical height adjustable seatpost 16 and the electrical suspension FS in response to the concurrent operation of the first switch SW1 and the second switch SW2. In this embodiment, the controller 414 is configured to generate the operation signal CS3 to operate the electrical height adjustable seatpost 16 in response to the concurrent operation of the first switch SW1 and the second switch SW2. However, the controller 414 can be configured to generate the operation signal CS3 to operate the electrical suspension FS in response to the concurrent operation of the first switch SW1 and the second switch SW2. In a case where the electrical bicycle operating system 412 comprise an electrical front derailleur and two front sprockets, the controller 14 can be configured to generate the third signal CS3 to operate the electrical front derailleur. In such a modification, the electrical front derailleur can be configured to alternately move a chain guide between two shift positions corresponding to the two front sprockets in response to the third signal CS3.

The first signal CS1 includes one of the upshift signal and the downshift signal. The second signal CS2 includes the other of the upshift signal and the downshift signal. The fourth signal CS4 includes the one of the upshift signal and the downshift signal. The fifth signal CS5 includes the other of the upshift signal and the downshift signal. However, the fourth signal CS4 can include the other of the upshift signal and the downshift signal, and the fifth signal CS5 can include the one of the upshift signal and the downshift signal.

In this embodiment, the first signal CS1 includes the upshift signal. The second signal CS2 includes the downshift signal. The first signal CS1 can also be referred to as the upshift signal CS1. The second signal CS2 can also be referred to as the downshift signal CS2.

The fourth signal CS4 includes the upshift signal. The fifth signal CS5 includes the downshift signal. However, the first signal CS1 can include the downshift signal, and the second signal CS2 can include the upshift signal. The fourth signal CS4 can include the downshift signal, and the fifth signal CS5 can include the upshift signal.

Specifically, the fourth signal CS4 is indicative of upshifting of the electrical rear derailleur 52 and includes the upshift command signal US. The fifth signal CS5 is indicative of downshifting of the electrical rear derailleur 52 and includes the downshift command signal DS.

Figure 35:
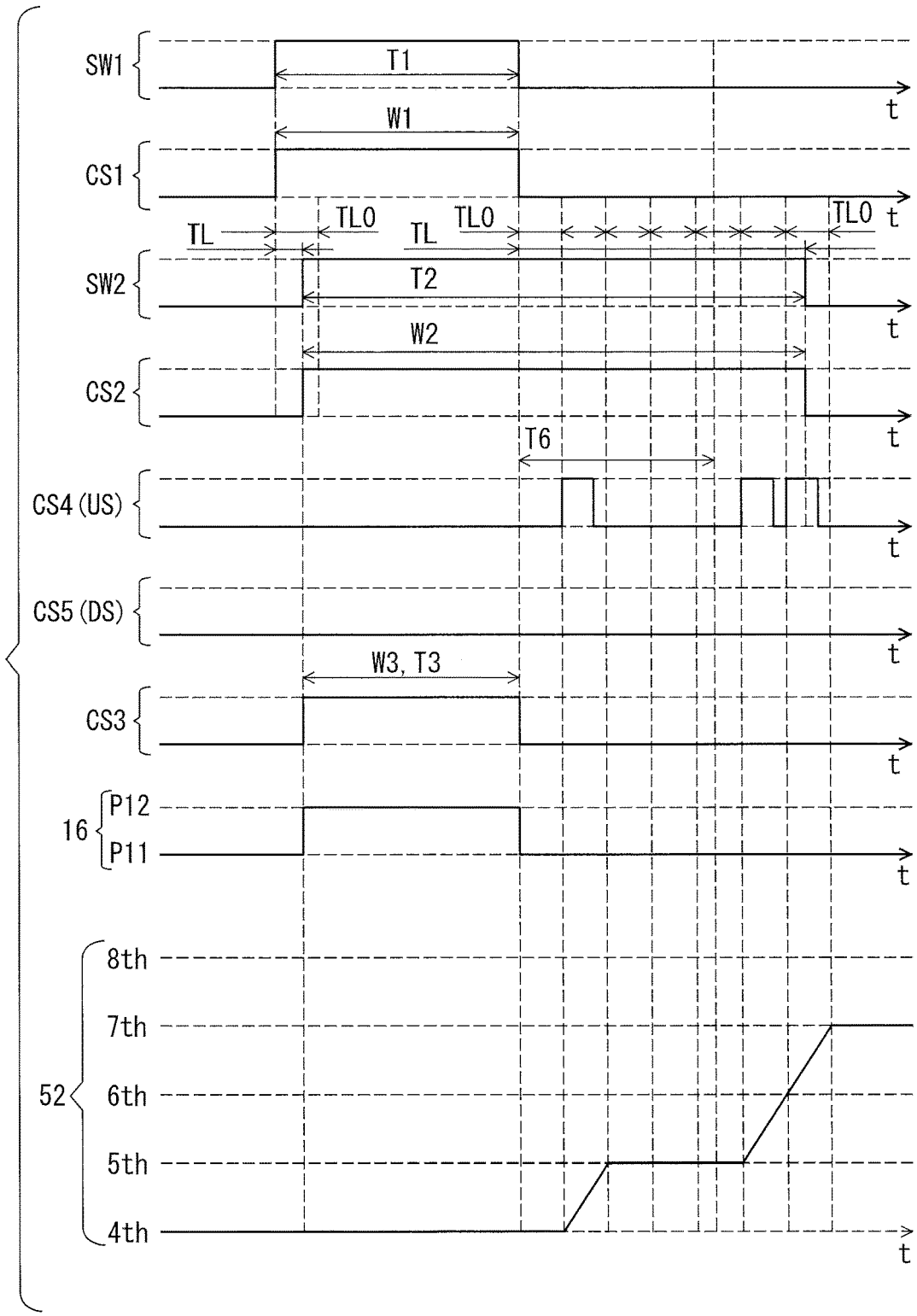
FIGS. 35 and 36 are a timing charts of operation of the electrical bicycle operating system illustrated in FIG. 34.
Figure 36:
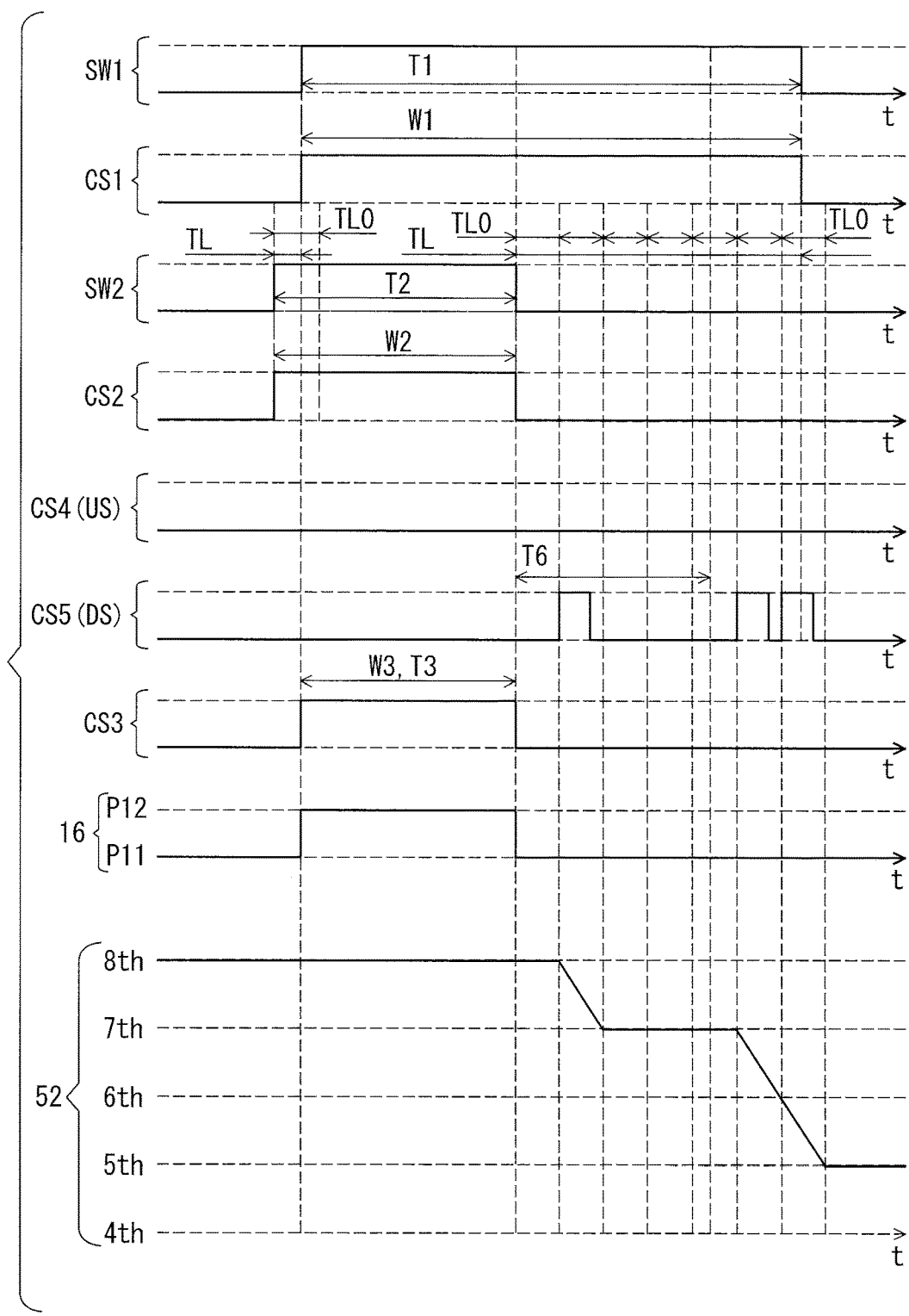

As seen in FIGS. 35 and 36, the controller 414 is configured to restrict generating a shift command signal to continuously change a speed stage of the electrical shifting device 18 by a plurality of speed stages within a predetermined time T6 after the concurrent operation regardless of the upshift signal CS1 and the downshift signal CS2.

As seen in FIG. 35, the controller 14 is configured to generate the fourth signal CS4 (the upshift command signal US) to change the speed stage of the electrical shifting device 18 by only one speed stage within the predetermined time T6 after the concurrent operation regardless of the upshift signal CS1 and the downshift signal CS2. The controller 14 is configured to generate a plurality of the fourth signals CS4 (a plurality of the upshift command signals US) to change the speed stage of the electrical shifting device 18 among a plurality of speed stages after a lapse of the predetermined time T6.

As seen in FIG. 36, the controller 14 is configured to generate the fifth signal CS5 (the downshift command signal DS) to change the speed stage of the electrical shifting device 18 by only one speed stage within the predetermined time T6 after the concurrent operation regardless of the upshift signal CS1 and the downshift signal CS2. The controller 14 is configured to generate a plurality of the fourth signals CS4 (a plurality of the upshift command signals US) to change the speed stage of the electrical shifting device 18 among a plurality of speed stages after a lapse of the predetermined time T6.

Fifth Embodiment

An electrical bicycle operating system 512 in accordance with a fifth embodiment will be described below referring to FIGS. 37 and 38. The electrical bicycle operating system 512 has the same structure and/or configuration as those of the electrical bicycle operating system 12 except for the controller. Thus, elements having substantially the same function as those in the above embodiments will be numbered the same here, and will not be described and/or illustrated again in detail here for the sake of brevity.

Figure 37:
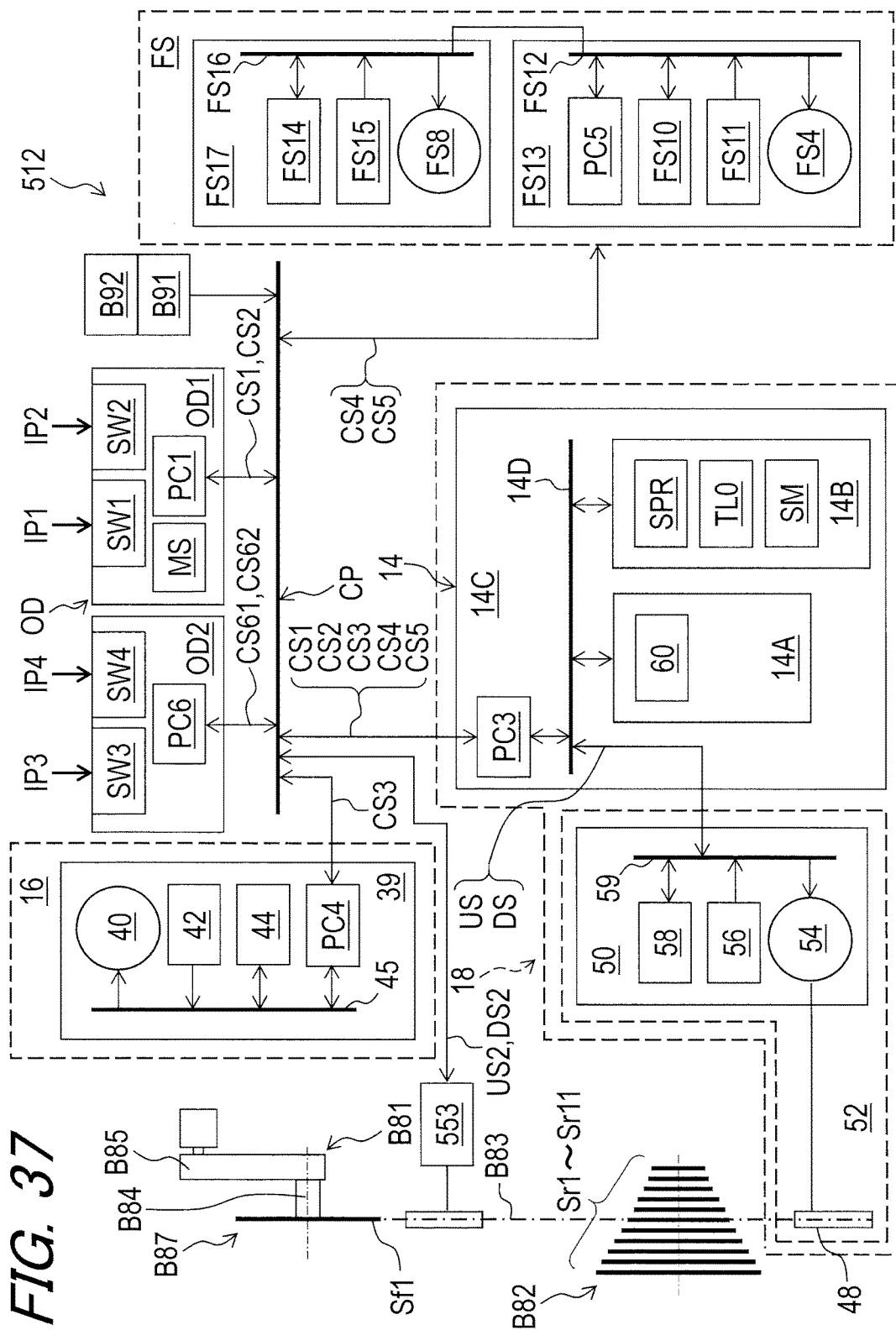
FIG. 37 is a block diagram of an electrical bicycle operating system in accordance with a fifth embodiment.

As seen in FIG. 37, the electrical bicycle operating system 512 comprises a controller 514 and an electrical front derailleur 553. The controller 514 has substantially the same configuration as that of the controller 14 of the first embodiment. The controller 514 has a first mode and a second mode. The memory 14B stores a program to perform the first mode and the second mode.

The operating device OD includes a mode selector MS, a third switch SW3, a fourth switch SW4, and a sixth PLC controller PC6. The mode selector More specifically, is provided in the first operating device OD1. The third switch SW3, the fourth switch SW4, and the sixth PLC controller PC6 are provided in the second operating device OD2.

The mode selector MS is configured to receive a user mode input to select a mode of the electrical bicycle operating system 512. The mode selector MS is electrically connected to the controller 514 via the electric communication path CP. The mode selector MS includes a two-position switch including a first mode position and a second mode position respectively corresponding to the first mode and the second mode. The mode selector MS allows the user to select the mode of the electrical bicycle operating system 12 between the first mode and the second mode. The controller 514 detects the mode selected via the mode selector MS.

The third switch SW3 is configured to generate an additional upshift signal CS61 in response to an additional upshift user input IP3. The fourth switch SW4 is configured to generate an additional downshift signal CS62 in response to an additional downshift user input IP4. The third switch SW3 and the fourth switch SW4 are electrically connected to the sixth PLC controller PC6. The sixth PLC controller PC6 is electrically connected to the controller 514 with the electric communication path CP. The third switch SW3 and the fourth switch SW4 has substantially the same structure as that of the first switch SW1 or the second switch SW2. The sixth PLC controller PC1 has substantially the same configuration as that of the first PLC controller PC1. Thus, they will not be described in detail here for the sake of brevity.

In the first mode, the electrical rear derailleur 52 is operated using the first switch SW1 and the second switch SW2, and the electrical front derailleur 553 is operated using the third switch SW3 and the fourth switch SW4. The electrical rear derailleur 52 and the electrical front derailleur 553 independently operate from each other.

In the second mode, the electrical rear derailleur 52 and the electrical front derailleur 553 are operated using only the first switch SW1 and the second switch SW2 without using the third switch SW3 and the fourth switch SW4. The electrical rear derailleur 52 and the electrical front derailleur 553 operate in accordance with shift-map information SM (FIG. 38) stored in the memory 14B.

In this embodiment, as seen in FIG. 38, the shift-map information includes a single route R1 defined by thirteen combinations of the front shift position and the rear shift position. Namely, the bicycle 10 has thirteen speed stages in the second mode. In the second mode, the controller 514 is configured to control the electrical rear derailleur 52 and the electrical front derailleur 553 based on the shift-map information in response to each of the upshift signal CS1 and the downshift signal CS2. The controller 514 generates the upshift command signal US or the downshift command signal DS to increase a gear ratio defined by the electrical rear derailleur 52 and the electrical front derailleur 553 in response to the upshift signal CS1. The controller 514 generates an additional upshift command signal US2 (FIG. 37) or an additional downshift command signal DS2 (FIG. 37) to decrease the gear ratio defined by the electrical rear derailleur 52 and the electrical front derailleur 553 in response to the downshift signal CS2. In the second mode, the controller 514 is unresponsive to the additional upshift signal CS61 and the additional downshift signal CS62.

Sixth Embodiment

An electrical bicycle operating system 612 in accordance with a sixth embodiment will be described below referring to FIG. 39. The electrical bicycle operating system 612 has the same structure and/or configuration as those of the electrical bicycle operating system 12 except for the controller. Thus, elements having substantially the same function as those in the above embodiments will be numbered the same here, and will not be described and/or illustrated again in detail here for the sake of brevity.

Figure 39:
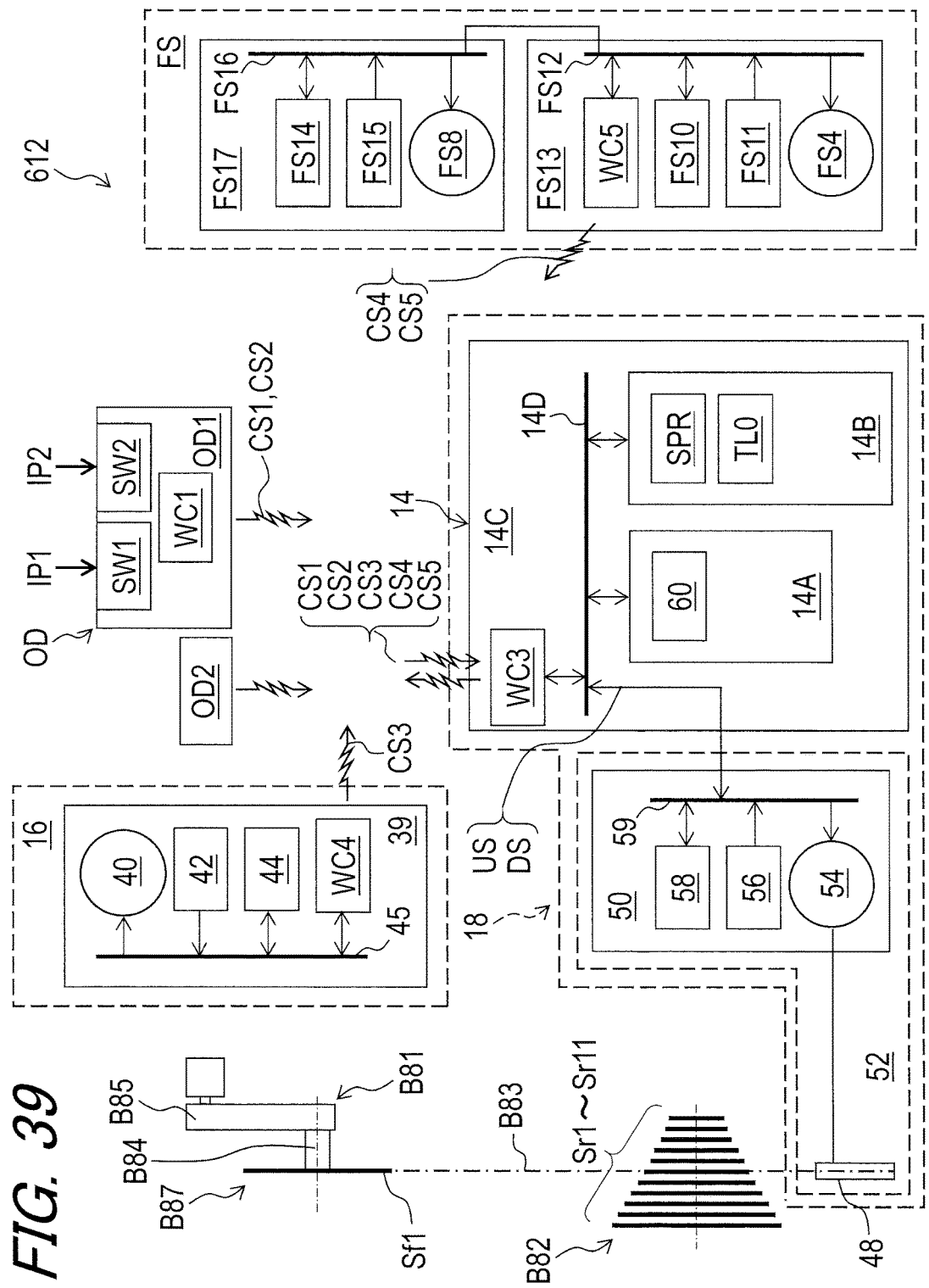
FIG. 39 is a block diagram of an electrical bicycle operating system in accordance with a sixth embodiment.

As seen in FIG. 39, the electrical bicycle operating system 612 further comprises a wireless communicator configured to wirelessly transmit at least one of the first signal CS1 and the second signal CS2. In this embodiment, the electrical bicycle operating system 612 further comprises a wireless communicator WC1 instead of the first PLC controller PC1. The wireless communicator WC1 can also be referred to as a first wireless communicator WC1. The wireless communicator WC1 is configured to wirelessly transmit the first signal CS1.

The controller 14 includes a third wireless communicator WC3 instead of the third PLC controller PC3. The electrical height adjustable seatpost 16 includes a fourth wireless communicator WC4 instead of the fourth PLC controller PC4. The electrical suspension FS includes a fifth wireless communicator WC5 instead of the fifth PLC controller PC5. The electric communication path CP is omitted from the electrical bicycle operating system 12A. Instead of the battery B92, batteries (not shown) are respectively provided in the first operating device OD1, the second operating device OD2, the electrical height adjustable seatpost 16, the electrical shifting device 18, and the electrical suspension FS.

The first wireless communicator WC1 and the third wireless communicator WC3 establish wireless communication therebetween by pairing. The third wireless communicator WC3 and the fourth wireless communicator WC4 establish wireless communication therebetween by pairing. The third wireless communicator WC3 and the fifth wireless communicator WC5 establish wireless communication therebetween by pairing.

Each of the first to fourth wireless communicators WC1 to WC4 includes a wireless transmitter and/or a wireless receiver. The first wireless communicator WC1 is configured to wirelessly transmit the first signal CS1 to the third wireless communicator WC3 of the controller 14. The second wireless communicator WC1 is configured to wirelessly transmit the second signal CS2 to the third wireless communicator WC3 of the controller 14. The third wireless communicator WC3 is configured to wirelessly receive the first signal CS1 and the second signal CS2 from the first wireless communicator WC1.

The third wireless communicator WC3 of the controller 14 is configured to wirelessly transmit the third signal CS3 to the fourth wireless communicator WC4 of the electrical height adjustable seatpost 16. The third wireless communicator WC3 of the controller 14 is configured to wirelessly transmit the fourth signal CS4 to the fifth wireless communicator WC5 of the electrical suspension FS. The fourth wireless communicator WC4 of the electrical height adjustable seatpost 16 is configured to wirelessly receive the third signal CS3 from the third wireless communicator WC3 of the controller 14. The fifth wireless communicator WC5 of the electrical suspension FS is configured to wirelessly receive the fourth signal CS4 from the third wireless communicator WC3 of the controller 14.

Other Modifications

Figure 40:
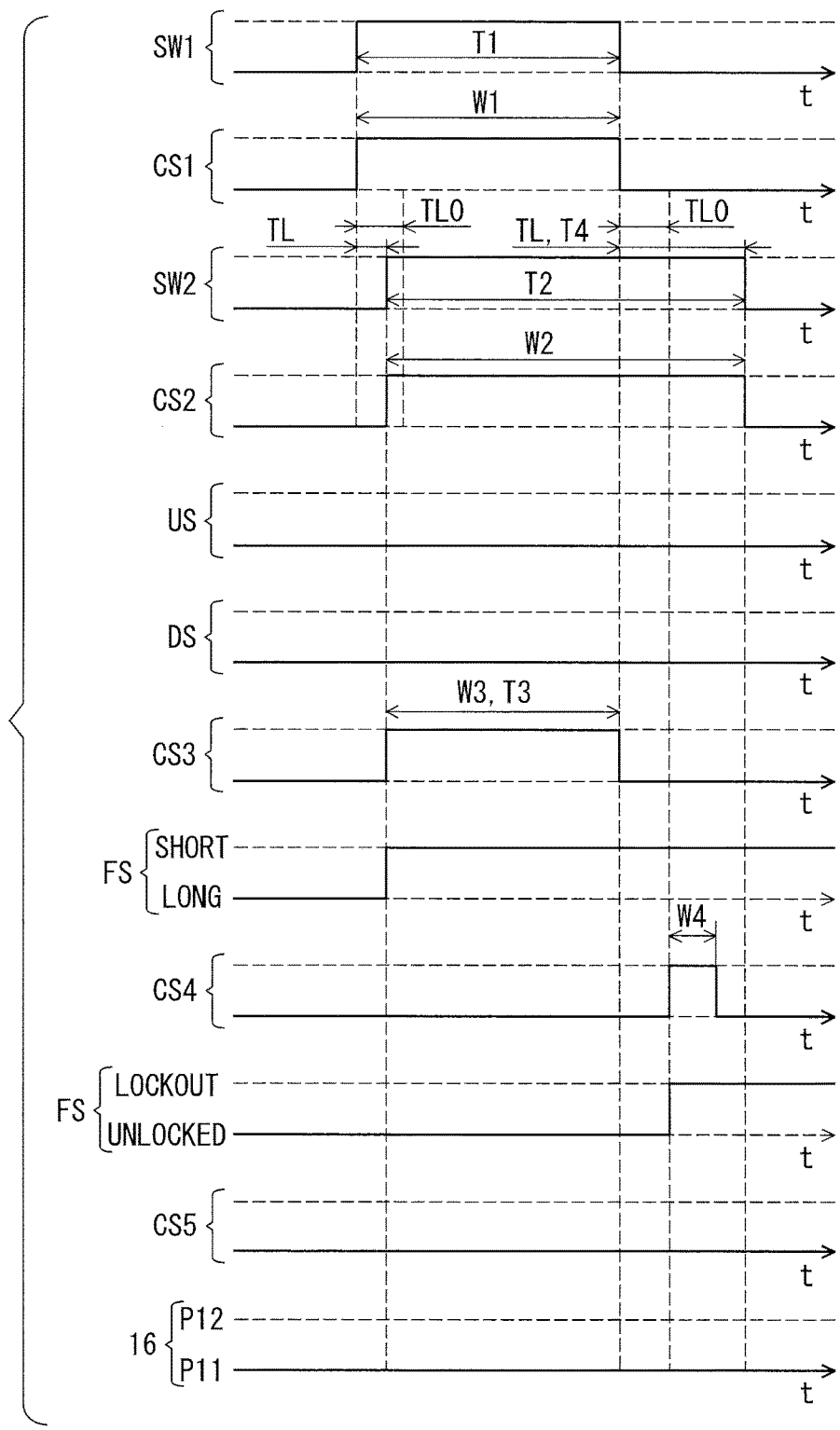
FIGS. 40 and 41 are a timing charts of operation of the electrical bicycle operating system illustrated in FIG. 39.

As seen in FIG. 40, in the electrical bicycle operating system 12, the controller 14 can be configured to generate the third signal CS3 to change the state of the electrical suspension FS between the long-stroke state and the short-stroke state. In this modification, the third signal CS3 is indicative of changing the state of the electrical suspension FS between the long-stroke state and the short-stroke state. The stroke actuator driver FS15 alternately switches the state of the electrical suspension FS between the long-stroke state and the short-stroke state in response to the third signal CS3.

Figure 41:
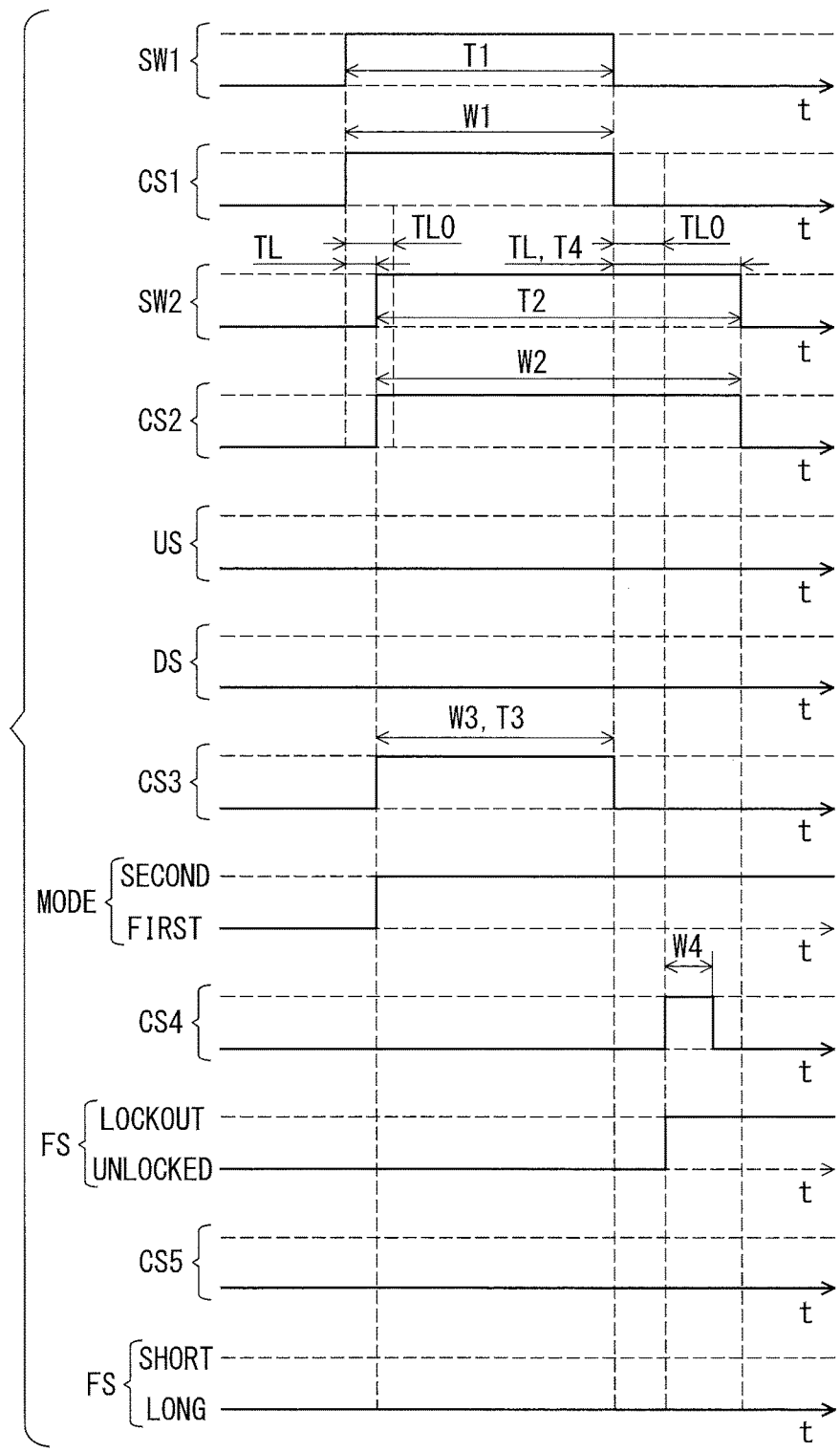

As seen in FIG. 41, in the electrical bicycle operating system 512, the controller 514 can be configured to generate the third signal CS3 to alternately switch the mode of the electrical bicycle operating system 512 between the first mode and the second mode. In this modification, the third signal CS3 is indicative of changing the mode of the electrical bicycle operating system 512 between the first mode and the second mode. The controller 513 alternately switches the mode of the electrical bicycle operating system 512 between the first mode and the second mode in response to the third signal CS3.

Figure 42:
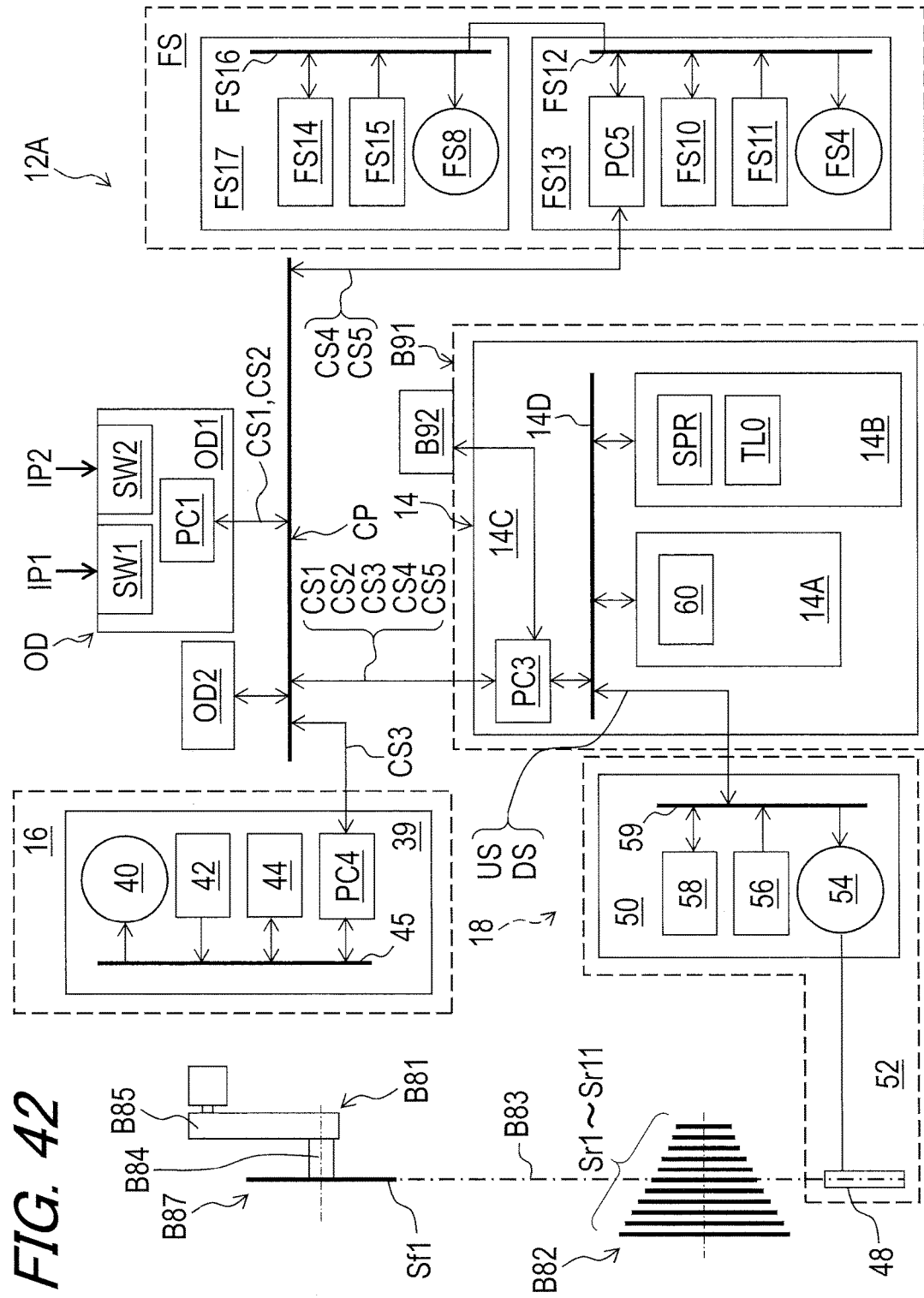
FIGS. 42 to 46 are block diagrams of electrical bicycle operating systems in accordance with other modifications.
Figure 43:
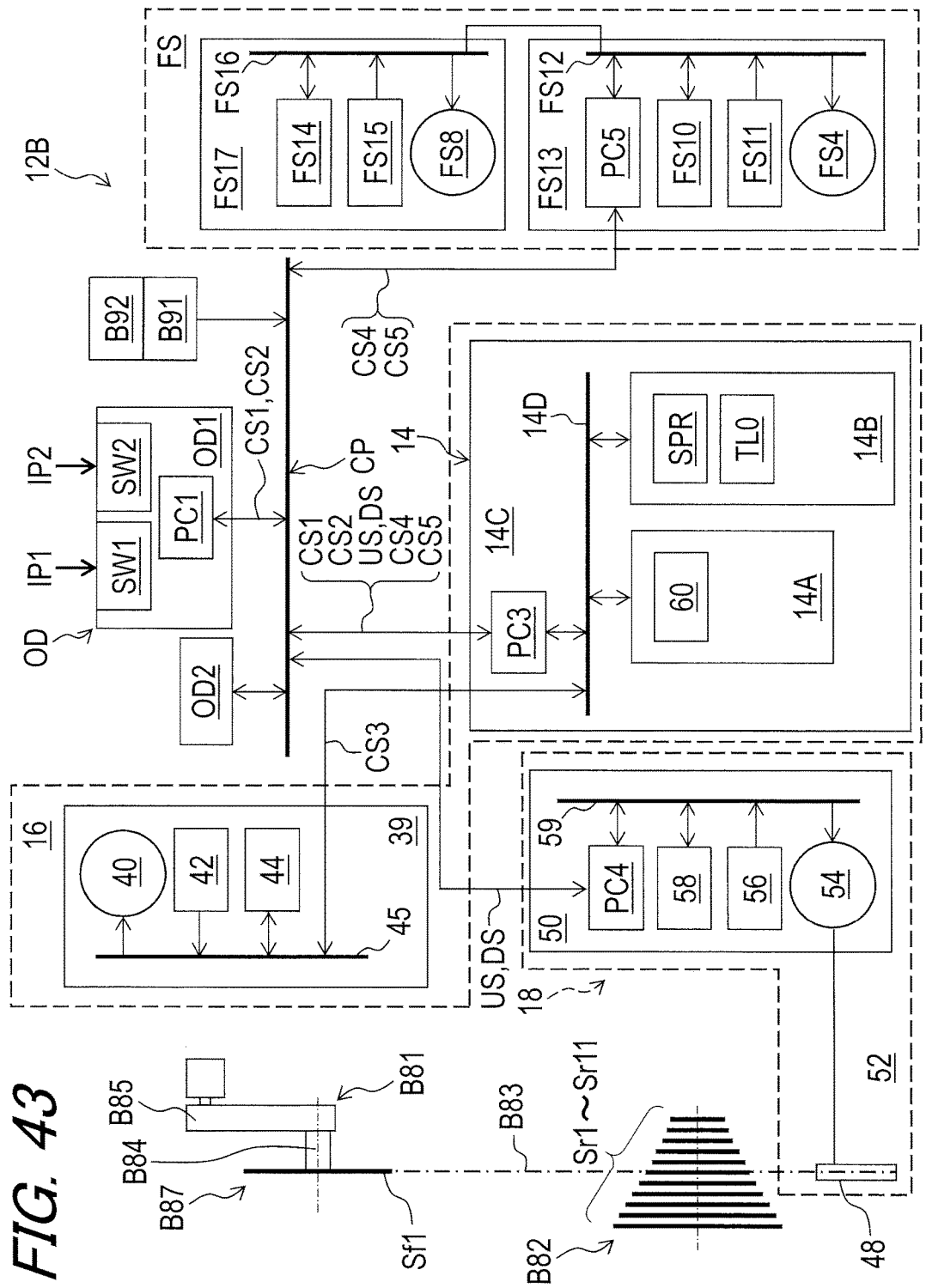
Figure 44:
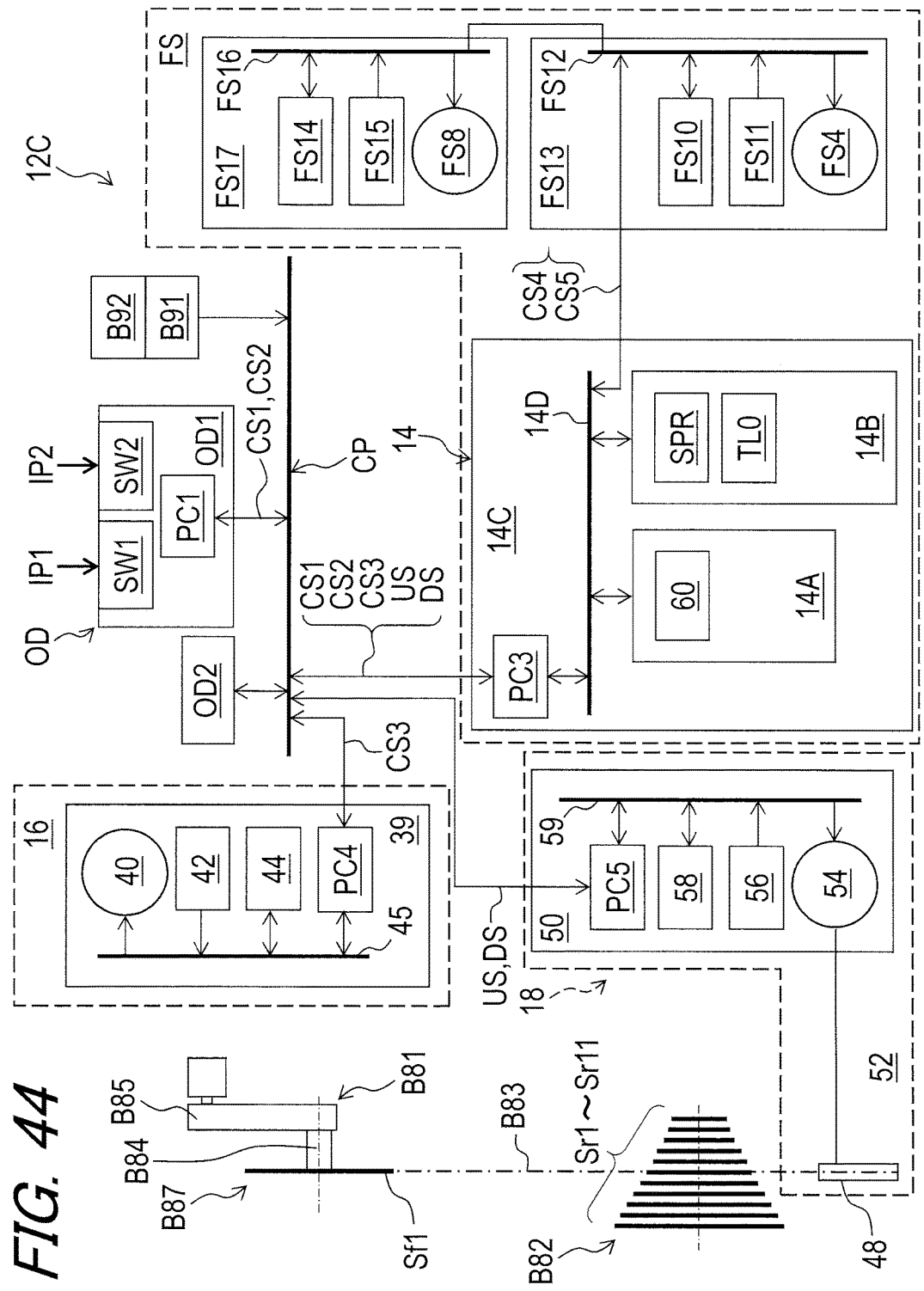
Figure 45:
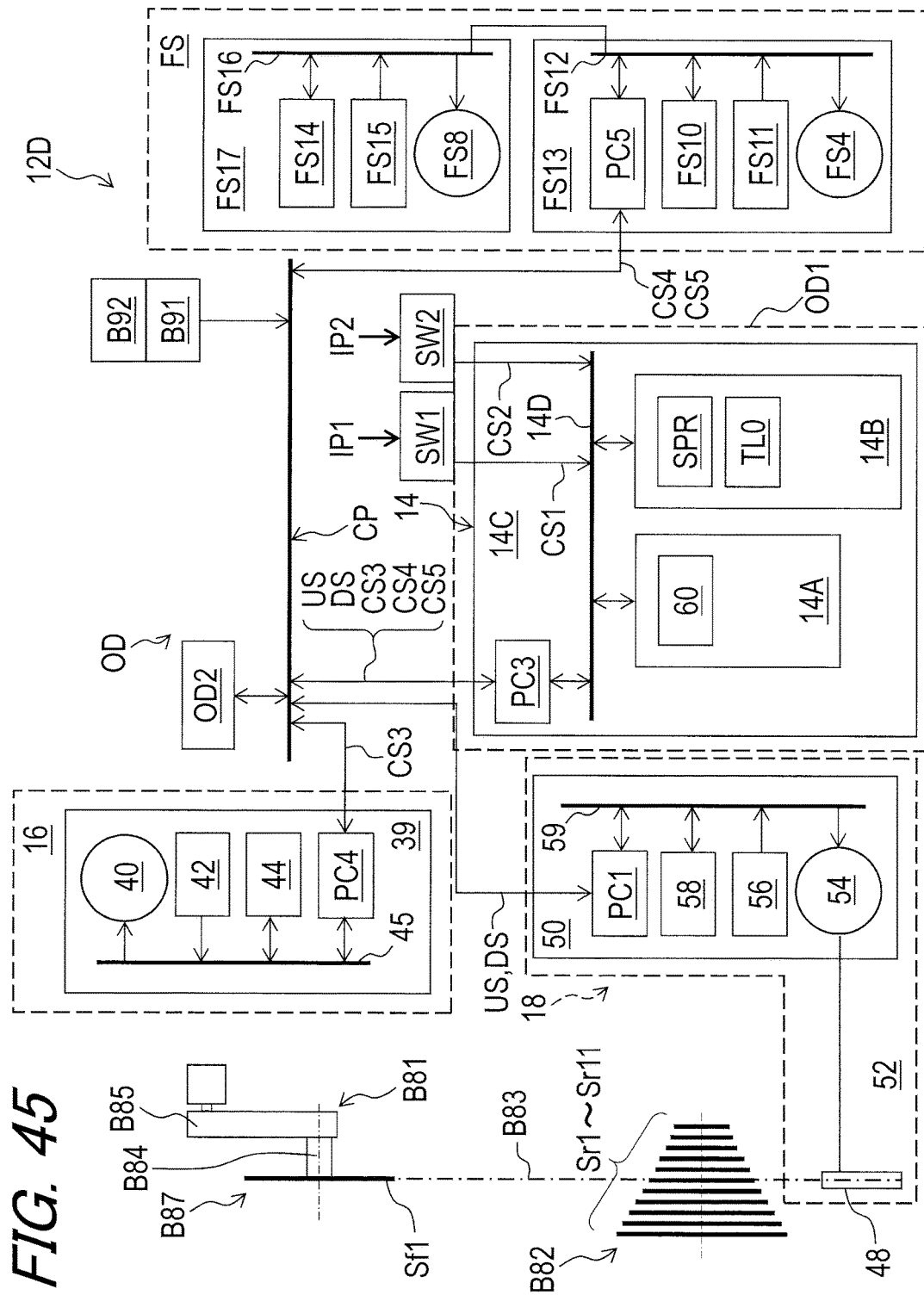

The controller 14 can be separately provided from the electrical rear derailleur 52. The controller 14 can be integrally provided with each of the battery holder B91, the electrical height adjustable seatpost 16, the electrical suspension FS, the first switch SW1, the second switch SW2, or other components as a single unit. In the electrical bicycle operating system 12A illustrated in FIG. 42, for example, the controller 14 can be integrally provided with the battery holder B91. In the electrical bicycle operating system 12B illustrated in FIG. 43, the controller 14 can be integrally provided with the electrical height adjustable seatpost 16. In the electrical bicycle operating system 12C illustrated in FIG. 44, the controller 14 can be integrally provided with the electrical suspension FS. In the electrical bicycle operating system 12D illustrated in FIG. 45, the controller 14 can be integrally provided with the first switch SW1 and the second switch SW2. The controller 14 can be integrally provided with at least one of the first switch SW1 and the second switch SW2. In this modification, for example, the first switch SW1 and the second switch SW2 can be electrically mounted on the circuit board 14C with the bus 14D. The controller 14 is configured to determine the concurrent operation of the first switch SW1 and the second switch SW2 based on the first operation of the first switch SW1 and the second operation of the second switch SW2 instead of the first and second signals CS1 and CS2. However, the controller 14 can be configured to determine the concurrent operation of the first switch SW1 and the second switch SW2 based on the first and second signals CS1 and CS2.

Figure 46:
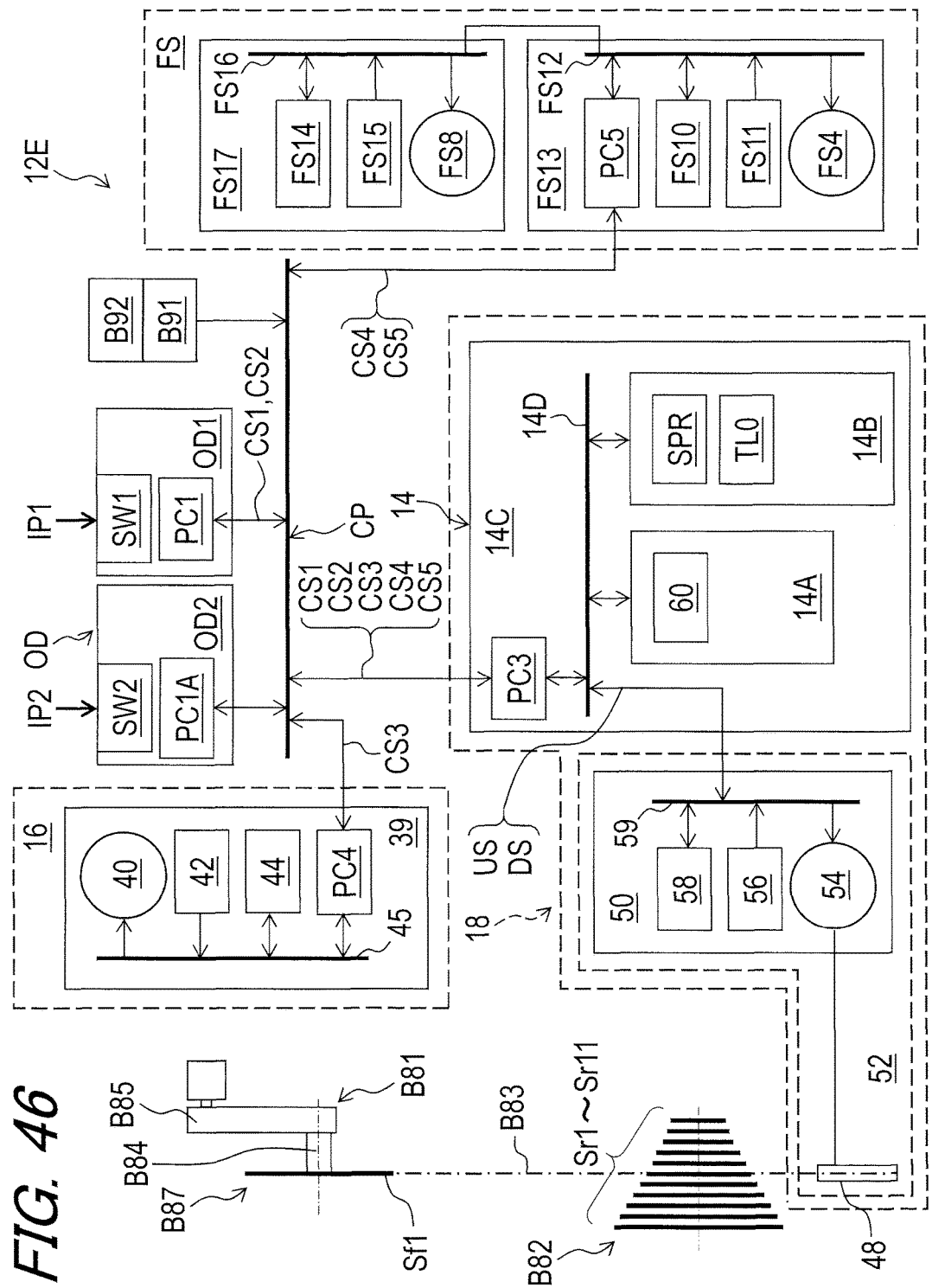

As seen in FIG. 46, in the electrical bicycle operating system 12E, the second switch SW2 is a separate unit from the first switch SW1. The first switch SW1 is provided on the first operating device OD1. The second switch SW2 is provided on the second operating device OD2. The second operating device OD2 includes a first additional PLC controller PC1A having substantially the same configuration as that of the first PLC controller PC1. The second switch SW2 is electrically connected to the first additional PLC controller PC1A. The first additional PLC controller PC1A is electrically connected to the controller 14 with the electric communication path CP.

In the above embodiments and the modifications, the controller is configured to generate the fifth signal CS5. However, the fifth signal CS5 can be omitted from the electrical bicycle operating system.

The above embodiments and/or the modifications include the following features (A) to (E).

(A) An electrical bicycle operating system comprising:

a first switch configured to generate one of an upshift signal and a downshift signal;

a second switch configured to generate the other of the upshift signal and the downshift signal; and a controller configured to generate a suspension operation signal to change a state of the electrical suspension between a lockout state and an unlocked state in response to a release of the first switch in the state where the second switch is operated continuously after a concurrent operation of the first switch and the second switch.

(B) An electrical bicycle operating system comprising:

a first switch configured to generate one of an upshift signal and a downshift signal;

a second switch configured to generate the other of the upshift signal and the downshift signal; and a controller configured to generate a suspension operation signal to change a state of the electrical suspension from an unlocked state to a lockout state for a lockout time in response to a concurrent operation of the first switch and the second switch.

(C) An electrical bicycle operating system comprising:

a first switch configured to generate one of an upshift signal and a downshift signal;

a second switch configured to generate the other of the upshift signal and the downshift signal; and a controller configured to generate a suspension operation signal to change a stroke of the electrical suspension in response to a concurrent operation of the first switch and the second switch.

(D) An electrical bicycle operating system comprising:

a first switch configured to generate one of an upshift signal and a downshift signal, the first switch being disposed to receive a first user input from one of a thumb and an index finger of a user;

a second switch configured to generate the other of the upshift signal and the downshift signal, the second switch being disposed to receive a second user input from the other of the thumb and the index finger of the user; and a controller configured to generate an operation signal to operate one of an electrical height adjustable seatpost and an electrical suspension in response to a concurrent operation of the first switch and the second switch.

(E) An electrical bicycle operating system comprising:

a first switch configured to generate one of an upshift signal and a downshift signal, the first switch being disposed to receive the first user input in a first operation direction a second switch configured to generate the other of the upshift signal and the downshift signal, the second switch being disposed to receive the second user input in a second operation direction opposite to the first operation direction; and a controller configured to generate an operation signal to operate one of an electrical height adjustable seatpost and an electrical suspension in response to a concurrent operation of the first switch and the second switch.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical bicycle operating system comprising:
a first switch configured to generate a first signal;
a second switch configured to generate a second signal; and
a controller configured to generate a third signal different from the first signal and the second signal in response to a concurrent operation of the first switch and the second switch, the controller being configured to generate a fourth signal different from the third signal in response to a release of the first switch in a state where the second switch is operated continuously after the concurrent operation.

2. The electrical bicycle operating system according to claim 1, wherein
the first signal includes one of an upshift signal and a downshift signal,
the second signal includes the other of the upshift signal and the downshift signal, and
the third signal is indicative of operating one of an electrical height adjustable seatpost and an electrical suspension.

3. The electrical bicycle operating system according to claim 2, wherein
the fourth signal is indicative of operating the other of the electrical height adjustable seatpost and the electrical suspension.

4. The electrical bicycle operating system according to claim 2, wherein
the fourth signal is indicative of changing a state of the electrical suspension between a lockout state and an unlocked state.

5. The electrical bicycle operating system according to claim 2, wherein
the fourth signal is indicative of changing a state of the electrical suspension from an unlocked state to a lockout state for a lockout time.

6. The electrical bicycle operating system according to claim 2, wherein
the fourth signal is indicative of changing a stroke of the electrical suspension.

7. The electrical bicycle operating system according to claim 2, wherein
the third signal is indicative of changing an overall length of the electrical height adjustable seatpost, and
the fourth signal is indicative of operating the electrical suspension based on a changed overall length of the electrical height adjustable seatpost in response to receipt of a seatpost length signal indicative of the changed overall length from the electrical height adjustable seatpost.

8. The electrical bicycle operating system according to claim 2, wherein
the third signal is indicative of operating the electrical suspension, and
the fourth signal is indicative of operating the electrical height adjustable seatpost.

9. The electrical bicycle operating system according to claim 1, wherein
the controller is configured to generate the fourth signal to operate the electrical height adjustable seatpost, and
the fourth signal has a pulse width relating to a time from a release of the first switch to a release of the second switch.

10. The electrical bicycle operating system according to claim 1, wherein
the fourth signal is indicative of operating the electrical height adjustable seatpost, and
the fourth signal has a predetermined pulse width regardless of a time from a release of the first switch to a release of the second switch.

11. The electrical bicycle operating system according to claim 1, wherein
the first signal includes one of an upshift signal and a downshift signal,
the second signal includes the other of the upshift signal and the downshift signal, and
the fourth signal includes the one of the upshift signal and the downshift signal.

12. The electrical bicycle operating system according to claim 11, wherein
the controller is configured to generate a fifth signal in response to a release of the second switch in a state where the first switch is operated continuously after the concurrent operation, and
the fifth signal includes the other of the upshift signal and the downshift signal.

13. The electrical bicycle operating system according to claim 2, wherein
the controller is configured to generate a fifth signal in response to a release of the second switch in a state where the first switch is operated continuously after the concurrent operation,
the fourth signal is indicative of one of a lock switch operation and a stroke adjustment operation of the electrical suspension, and
the fifth signal is indicative of the other of the lock switch operation and the stroke adjustment operation of the electrical suspension.

14. The electrical bicycle operating system according to claim 1, wherein
the second switch is a separate unit from the first switch.

15. The electrical bicycle operating system according to claim 1, wherein
the first switch and the second switch are integrally provided as a single switch unit.

16. The electrical bicycle operating system according to claim 1, wherein
the first switch is disposed to receive a first user input from one of a thumb and an index finger of a user, and
the second switch is disposed to receive a second user input from the other of the thumb and the index finger of the user.

17. The electrical bicycle operating system according to claim 1, wherein
the first switch is disposed to receive a first user input in a first operation direction, and
the second switch is disposed to receive a second user input in a second operation direction opposite to the first operation direction.

18. The electrical bicycle operating system according to claim 1, further comprising
a wireless communicator configured to wirelessly transmit at least one of the first signal and the second signal.

19. A bicycle comprising:
the electrical height adjustable seatpost and/or the electrical suspension; and
the electrical bicycle operating system according to claim 2.

20. An electrical bicycle operating system comprising:
a first switch configured to generate a first signal in response to a first user input, the first signal including one of an upshift signal and a downshift signal;

a second switch configured to generate a second signal in response to a second user input, the second signal including the other of the upshift signal and the downshift signal; and a controller configured to generate an operation signal to operate one of an electrical height adjustable seatpost and an electrical suspension in response to a concurrent operation of the first switch and the second switch, the controller being configured to restrict generating a shift command signal to continuously change a speed stage of an electrical shifting device by a plurality of speed stages within a predetermined time after the concurrent operation regardless of the upshift signal and the downshift signal.

* * * * *